(12) United States Patent
Onaka et al.

(10) Patent No.: US 10,383,051 B2
(45) Date of Patent: Aug. 13, 2019

(54) COMMUNICATION SYSTEM

(71) Applicant: MITSUBISHI ELECTRIC CORPORATION, Chiyoda-ku (JP)

(72) Inventors: Yasuhiro Onaka, Tokyo (JP); Miho Maeda, Tokyo (JP); Mitsuru Mochizuki, Tokyo (JP); Taisei Suemitsu, Tokyo (JP); Noriyuki Fukui, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/902,667

(22) Filed: Feb. 22, 2018

(65) Prior Publication Data

US 2018/0184369 A1 Jun. 28, 2018

Related U.S. Application Data

(62) Division of application No. 15/032,271, filed as application No. PCT/JP2014/078847 on Oct. 30, 2014, now Pat. No. 9,936,450.

(30) Foreign Application Priority Data

Nov. 1, 2013 (JP) .................. 2013-228377

(51) Int. Cl.
*H04L 12/24* (2006.01)
*H04L 5/14* (2006.01)
(Continued)

(52) U.S. Cl.
CPC ....... *H04W 52/0206* (2013.01); *H04W 24/02* (2013.01); *H04W 36/165* (2013.01);
(Continued)

(58) Field of Classification Search
CPC ... H04W 36/165; H04W 24/02; H04W 92/20; Y02D 70/24
See application file for complete search history.

(56) References Cited

U.S. PATENT DOCUMENTS 8,433,330 B2 4/2013 Hegge
2009/0180414 A1* 7/2009 Maeda ................. H04B 7/2643
370/311
(Continued)

FOREIGN PATENT DOCUMENTS

CN 102065448 A 5/2011
CN 102187731 A 9/2011
(Continued)

OTHER PUBLICATIONS

3GPP TSG-RAN WG3 Meeting #74, (R3-112933), Publication date Nov. 14-18, 2011 (Year: 2011).*
(Continued)

*Primary Examiner* — Faruk Hamza
*Assistant Examiner* — Abusayeed M Haque
(74) *Attorney, Agent, or Firm* — Oblon, McClelland, Maier & Neustadt, L.L.P.

(57) ABSTRACT

A communication system includes a base station configuring an energy saving cell (ES cell) and a base station configuring a compensation cell (Comp cell). The ES cell is switchable between a switch-on state and a switch-off state. The Comp cell compensates for the coverage of the ES cell when the ES cell is in the switch-off state. Before the Comp cell starts compensating for the coverage, for example, before the ES cell decides to switch itself off in Step ST2101, in Step ST2201 for example, the base station configuring the ES cell notifies the UE being connected with the ES cell of the information about a Comp cell, for example, a Comp cell list.

3 Claims, 35 Drawing Sheets

(51) Int. Cl.
| | | |
|---|---|---|
| H04W 84/18 | (2009.01) | |
| H04L 12/28 | (2006.01) | |
| H04W 52/02 | (2009.01) | |
| H04W 92/20 | (2009.01) | |
| H04W 48/00 | (2009.01) | |
| H04W 24/02 | (2009.01) | |
| H04W 52/04 | (2009.01) | |
| H04W 72/04 | (2009.01) | |
| H04W 36/16 | (2009.01) | |
| H04W 16/08 | (2009.01) | |
| H04W 88/08 | (2009.01) | |
| H04W 36/22 | (2009.01) | |

(52) U.S. Cl.
CPC ........... *H04W 48/00* (2013.01); *H04W 52/04* (2013.01); *H04W 72/0446* (2013.01); *H04W 92/20* (2013.01); *H04W 16/08* (2013.01); *H04W 36/22* (2013.01); *H04W 88/08* (2013.01); *Y02D 70/00* (2018.01); *Y02D 70/1222* (2018.01); *Y02D 70/1226* (2018.01); *Y02D 70/1242* (2018.01); *Y02D 70/1262* (2018.01); *Y02D 70/1264* (2018.01); *Y02D 70/21* (2018.01); *Y02D 70/24* (2018.01)

(56) References Cited

U.S. PATENT DOCUMENTS

| | | | | |
|---|---|---|---|---|
| 2010/0056166 | A1* | 3/2010 | Tenny | H04H 20/42 455/450 |
| 2010/0159991 | A1 | 6/2010 | Fu et al. | |
| 2011/0207466 | A1 | 8/2011 | Hegge | |
| 2013/0016649 | A1* | 1/2013 | Damnjanovic | H04W 88/04 370/315 |
| 2013/0170414 | A1* | 7/2013 | Kwon | H04W 72/042 370/311 |
| 2013/0176951 | A1* | 7/2013 | Dhanda | H04W 4/06 370/329 |
| 2013/0229964 | A1 | 9/2013 | Chakravarthy | |
| 2013/0235738 | A1 | 9/2013 | Siomina | |
| 2013/0242720 | A1* | 9/2013 | Chou | H04W 72/0413 370/221 |
| 2013/0286917 | A1 | 10/2013 | Jia et al. | |
| 2014/0010204 | A1* | 1/2014 | Xu | H04W 36/0033 370/331 |
| 2014/0051446 | A1* | 2/2014 | Rose | H04W 36/165 455/436 |
| 2014/0112291 | A1* | 4/2014 | Hahn | H04W 16/10 370/329 |
| 2014/0135030 | A1 | 5/2014 | Wang et al. | |
| 2014/0162650 | A1 | 6/2014 | Islam | |
| 2014/0248883 | A1 | 9/2014 | Aoyagi et al. | |
| 2014/0286282 | A1 | 9/2014 | Jamadagni | |
| 2014/0349694 | A1* | 11/2014 | Raghothaman | H04W 36/00 455/509 |
| 2015/0215830 | A1 | 7/2015 | Dalsgaard | |
| 2015/0312769 | A1 | 10/2015 | Shindo | |
| 2015/0319703 | A1 | 11/2015 | Kwon | |
| 2016/0044554 | A1 | 2/2016 | Comstock | |
| 2016/0066236 | A1 | 3/2016 | Comstock | |

FOREIGN PATENT DOCUMENTS

| | | |
|---|---|---|
| JP | 2011-176738 A | 9/2011 |
| WO | WO 2013/013388 A1 | 1/2013 |
| WO | WO 2013/065590 A1 | 5/2013 |
| WO | WO 2014/165809 A1 | 10/2014 |

OTHER PUBLICATIONS

Office Action dated Jun. 5, 2018 in Japanese Patent Application No. 2017-092762 with unedited computer generated English translation, 6 pages.

"Consideration on the IDLE UE handling on Energy Saving Cell", NTT DOCOMO, 3GPP TSG-RAN WG3 Meeting #74, R3-112933, Nov. 2011 , (2 pages).

"3rd Generation Partnership Project; Technical Specification Group Radio Access Network; Evolved Universal Terrestrial Radio Access (E-UTRA) and Evolved Universal Terrestrial Radio Access Network (E-UTRAN)", 3GPP TS 36.300, V11.5.0, Mar. 2013, Release 11, (209 pages).

"3rd Generation Partnership Project; Technical Specification Group Radio Access Network; Evolved Universal Terrestrial Radio Access (E-UTRA); User Equipment (UE) procedures in idle mode", 3GPP TS 36.304, V11.1.0, Sep. 2012, Release 11, (33 pages).

"LS on HNB/HeNB Open Access Mode", 3GPP SA WG1. 3GPP TSG-SA1 #42, S1-083461, Oct. 2008. (2 pages).

"LS on CSG cell identification". RAN2, 3GPP TSG-RAN WG 2 meeting #62, R2-082899, May 2008, (2 pages).

"3rd Generation Partnership Project; Technical Specification Group Radio Access Network; Evolved Universal Terrestrial Radio Access (E-UTRA); Further advancements for E-UTRA physical layer aspects", 3GPP TR 36.814, V9.0.0, Mar. 2010, Release 9, (104 pages).

"3rd Generation Partnership Project; Technical Specification Group Radio Access Network; Feasibility study for Further Advancements for E-UTRA (LTE-Advanced)", 3GPP TR 36.912, V10.0.0, Mar. 2011, Release 10, (263 pages).

"3rd Generation Partnership Project; Technical Specification Group Radio Access Network; Coordinated multi-point operation for LTE physical layer aspects", 3GPP TR 36.819, V11.1.0, Dec. 2011, Release 11, (69 pages).

"3rd Generation Partnership Project; Technical Specification Group Radio Access Network; Evolved Universal Terrestrial Radio Access (E-UTRA); Base Station (BS) conformance testing", 3GPP TS 36.141, V11.1.0, Jun. 2012, Release 11, (224 pages).

"Procedures for efficient discovery of small cells", CMCC, 3GPP TSG-RAN WG1 #72bis, R1-131530, Apr. 2013, (5 pages).

"3rd Generation Partnership Project; Technical Specification Group Radio Access Network; Evolved Universal Terrestrial Radio Access (E-UTRA); Radio Resource Control (RRC); Protocol specification", 3GPP TS 36.331, V11.3.0. Mar. 2013, Release 11, (344 pages).

"3rd Generation Partnership Project; Technical Specification Group Radio Access Network; Evolved Universal Terrestrial Radio Access (E-UTRA); Study on Small Cell Enhancements for E-UTRA and E-UTRAN-Higher layer aspects", 3GPP TR 36.842, V0.2.0, May 2013, Release 12, (38 pages).

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2", 3GPP TS 37.320, V11.3.0, Mar. 2013, Release 11, (23 pages).

"3rd Generation Partnership Project; Technical Specification Group Radio Access Network; Evolved Universal Terrestrial Radio Access (E-UTRA); Study on Energy Saving Enhancement for E-UTRAN", 3GPP TR 36.887, V0.2.0, Aug. 2013, Release 12, (15 pages).

"3rd Generation Partnership Project; Technical Specification Group Radio Access Network; Evolved Universal Terrestrial Radio Access (E-UTRA); Medium Access Control (MAC) protocol specification", 3GPP TS 36.321,V11.2.0, Mar. 2013, Release 11, (56 pages).

"3rd Generation Partnership Project; Technical Specification Group Radio Access Network; Small cell enhancements for E-UTRA and E-UTRAN-Physical layer aspects", 3GPP TR 36.872, V12.0.0, Sep. 2013, Release 12, (78 pages).

International Search Report dated Jan. 27, 2015 for PCT/JP2014/078847 filed on Oct. 30, 2014.

Extended European Search Report dated May 30, 2017, in Patent Application No. 14857756.2.

International Preliminary Report on Patentability and Written Opinion dated May 12, 2016 in PCT/JP2014/078847 filed Oct. 30, 2014 (with English language translation).

Japanese Office Action dated Jan. 10, 2017 in patent application No. 2015-545285 with partial English translation.

3GPP TSG-RAN WG3 Meeting #74, R3-112933.

(56) References Cited

OTHER PUBLICATIONS

Office Action dated Oct. 31, 2018 in Chinese Patent Application No. 201480059889.9, with English translation, 15 pages.
Office Action dated Feb. 19, 2019, in European Patent Application No. 14 857 756.2.
Office Action dated May 17, 2019, in Chinese Patent Application No. 201480059889.9, w/English-language Translation.

* cited by examiner

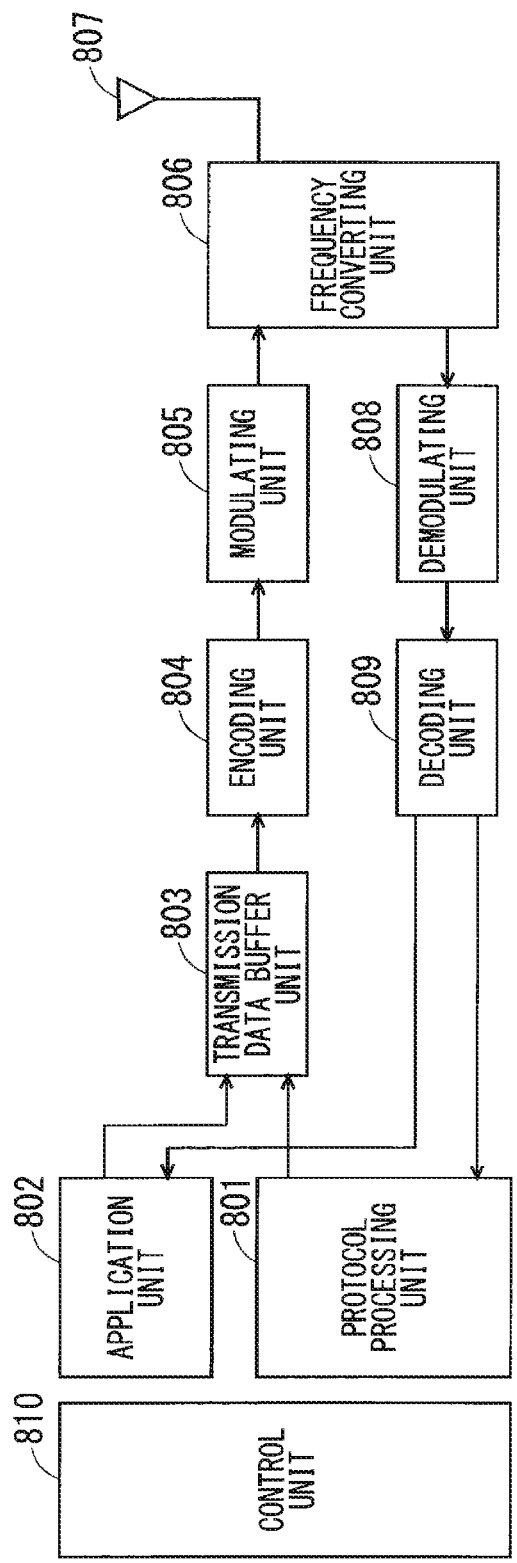

F I G. 5
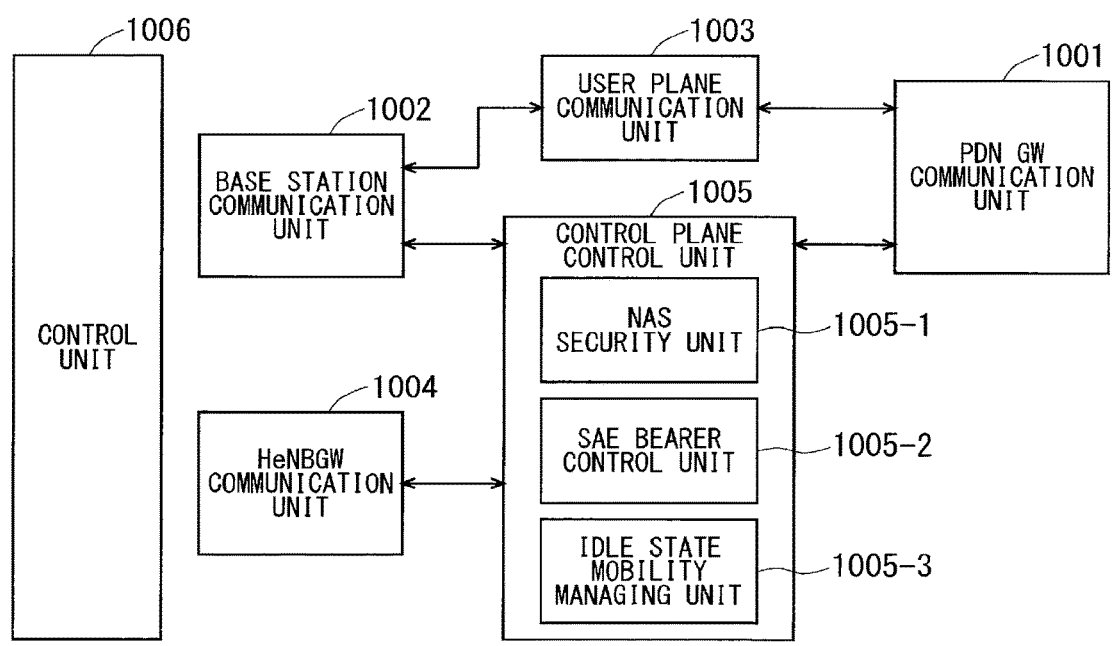

F I G . 6
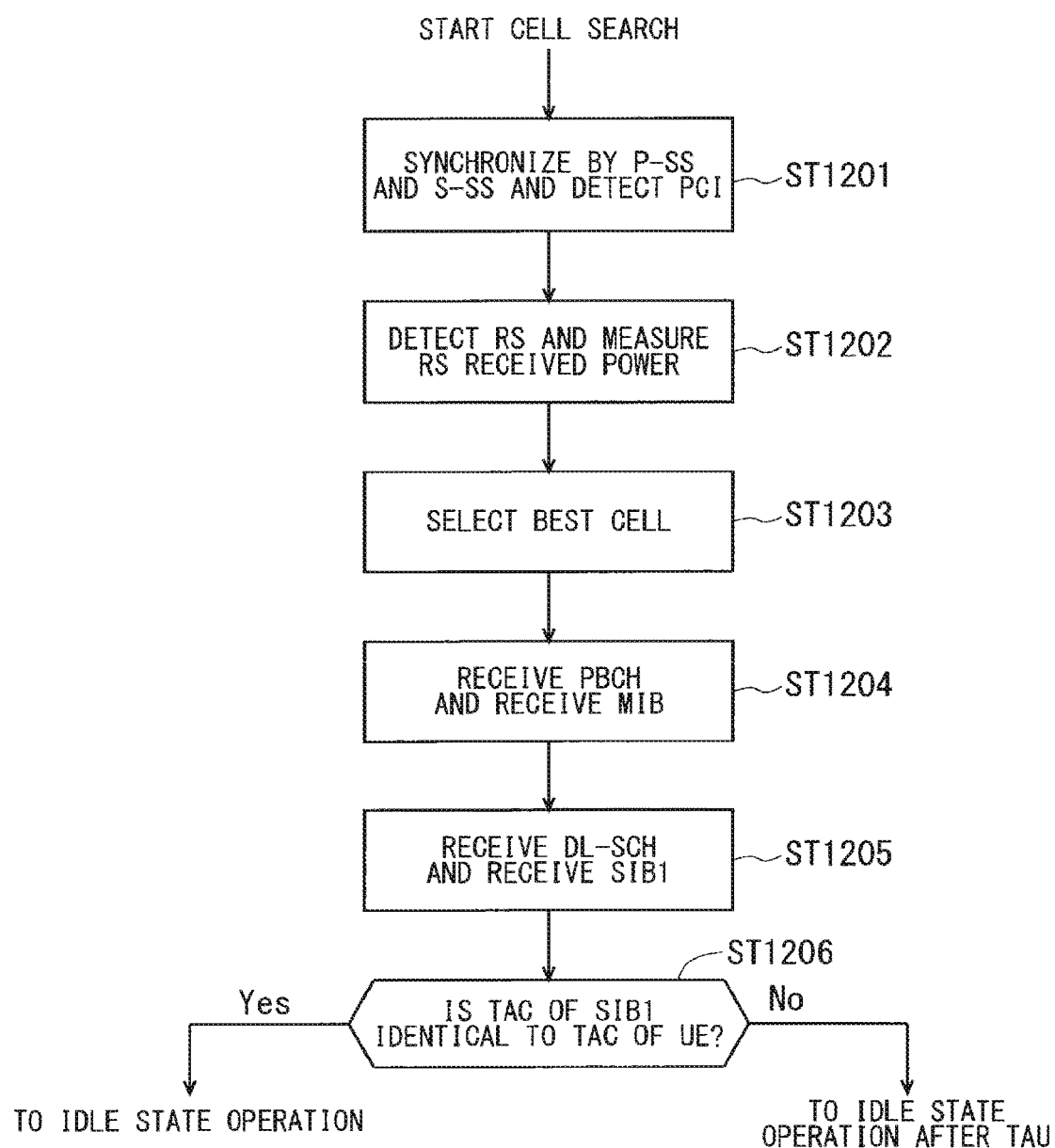

FIG. 8
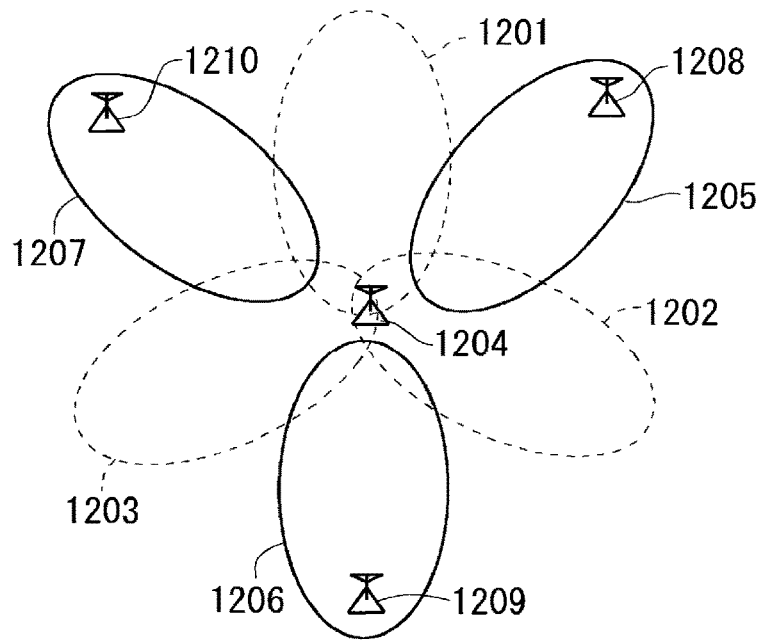
(a)
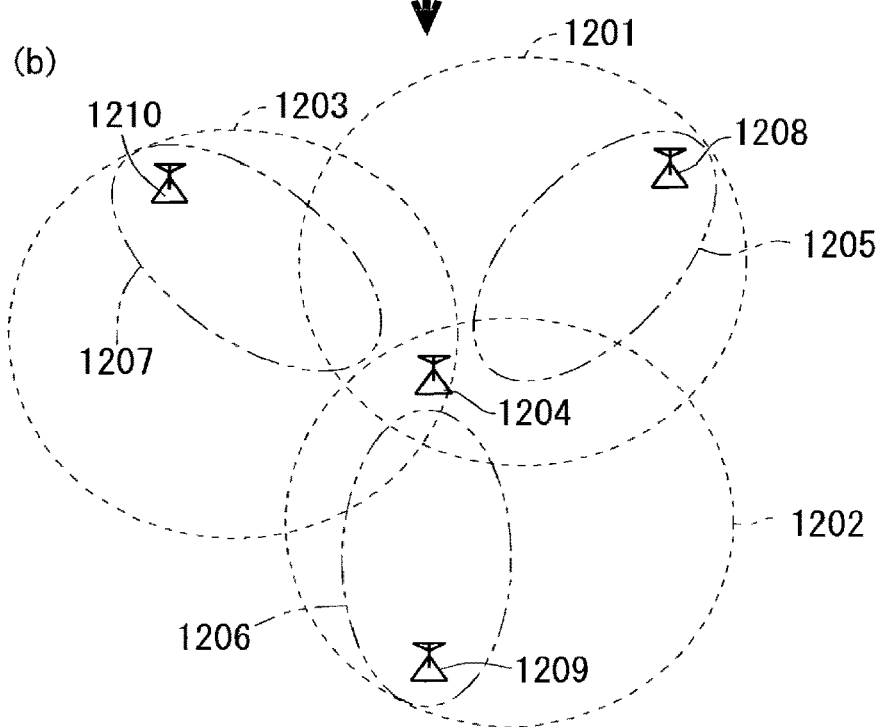
(b)

F I G . 9
(a)
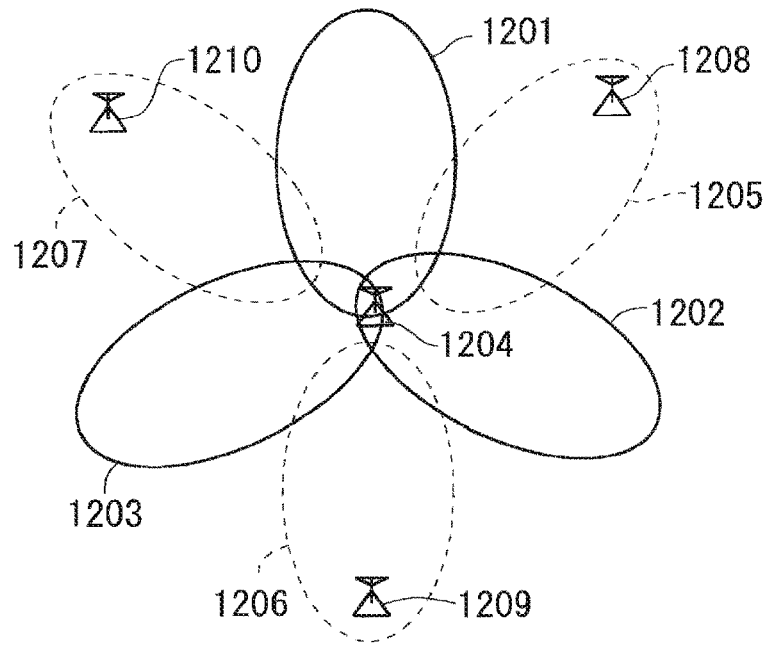
(b)
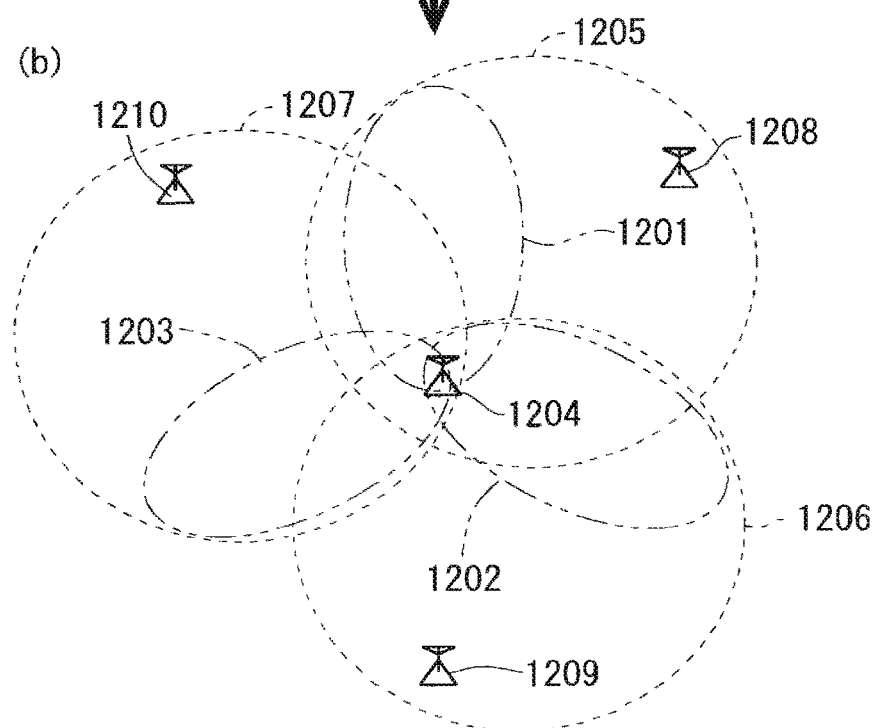

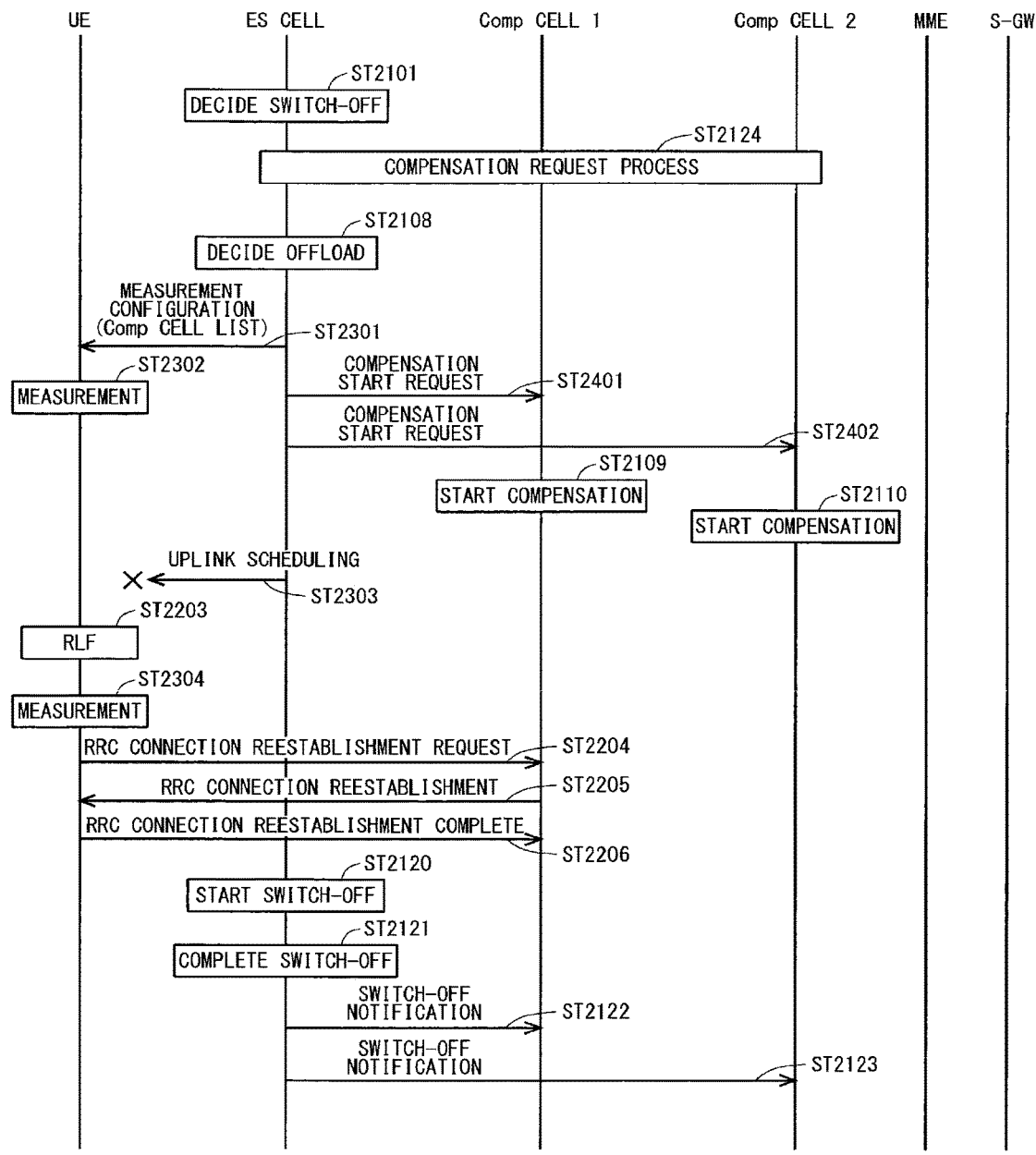
F I G . 1 3

F I G . 1 4
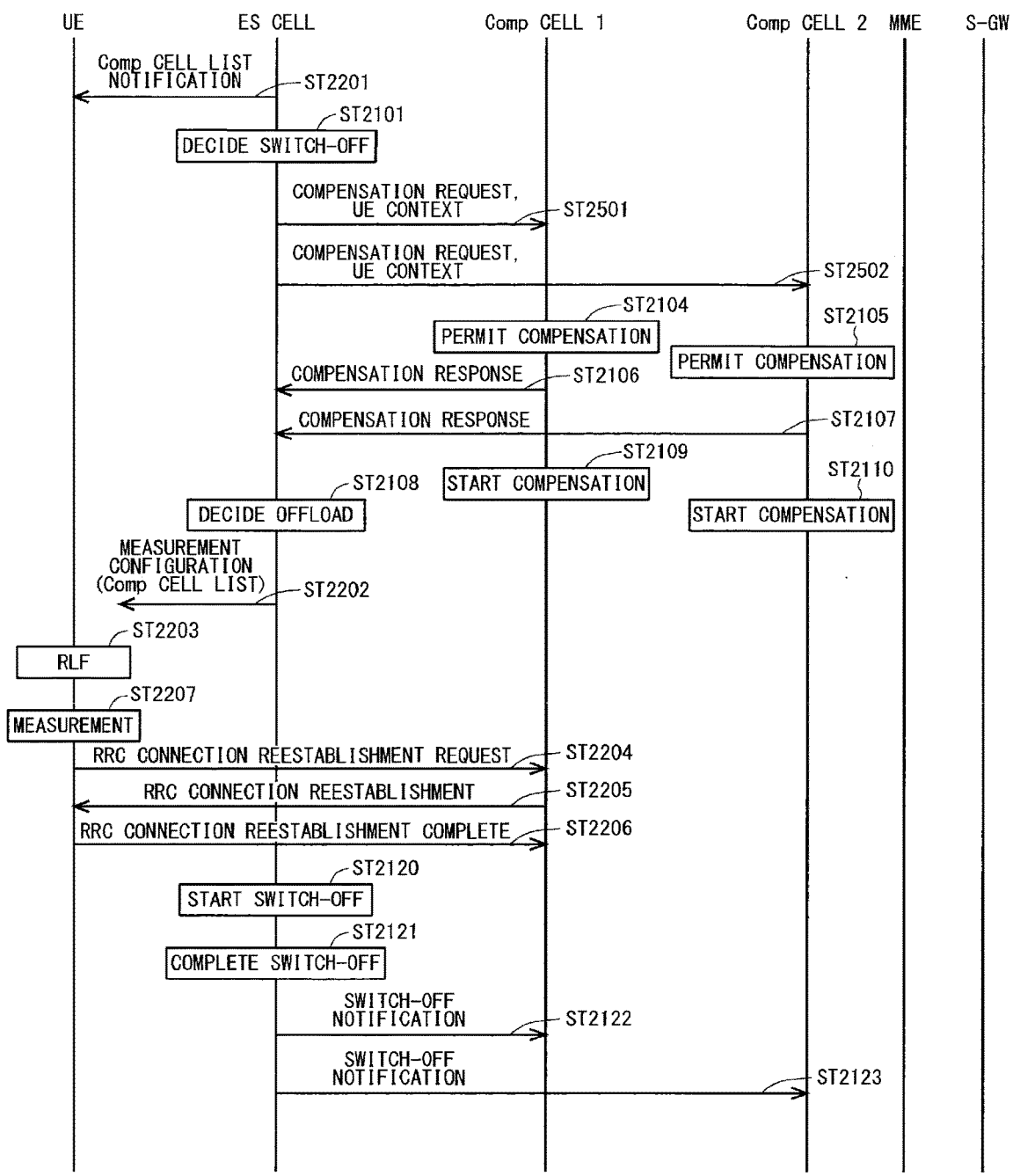

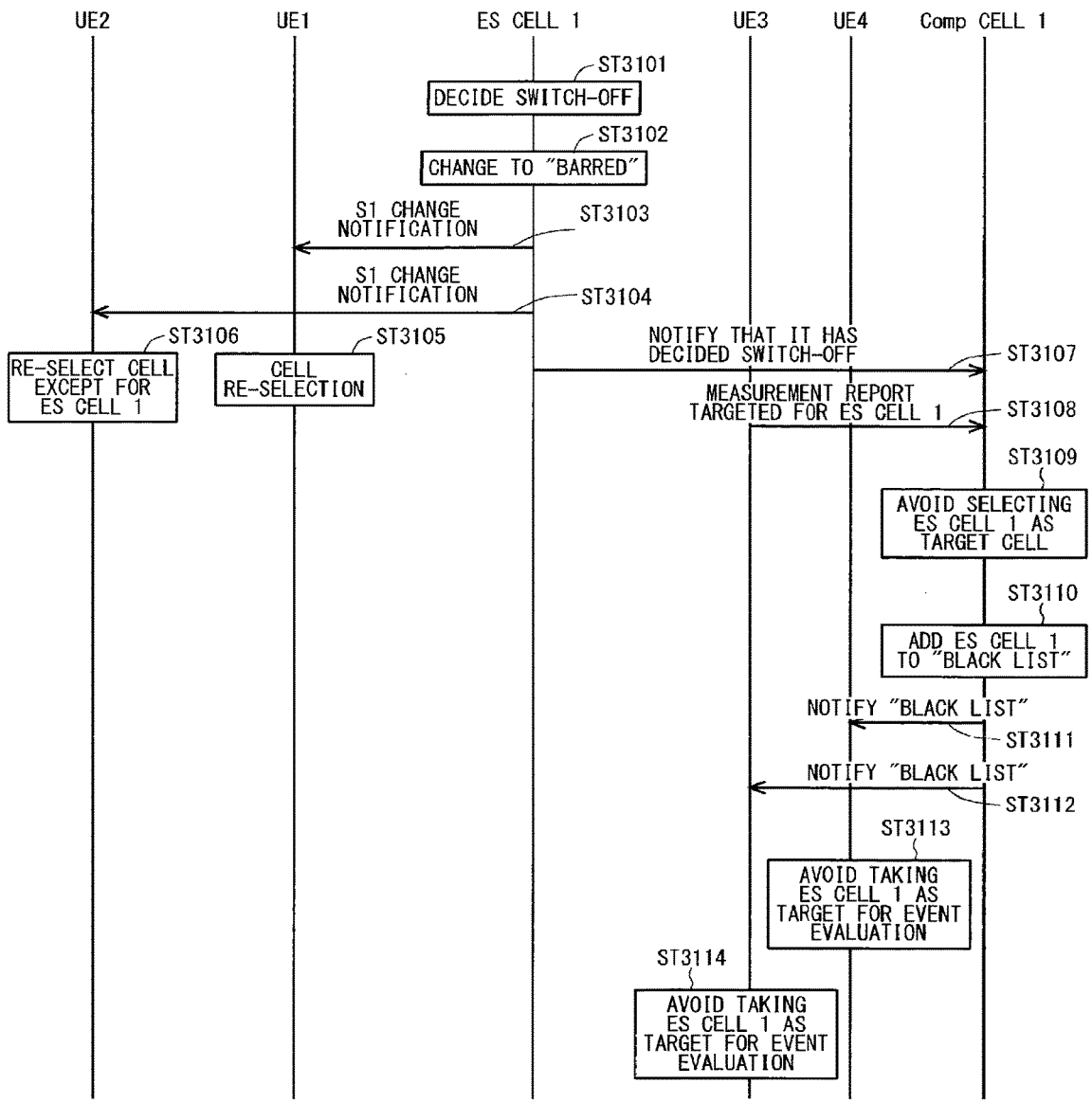

F I G . 1 8
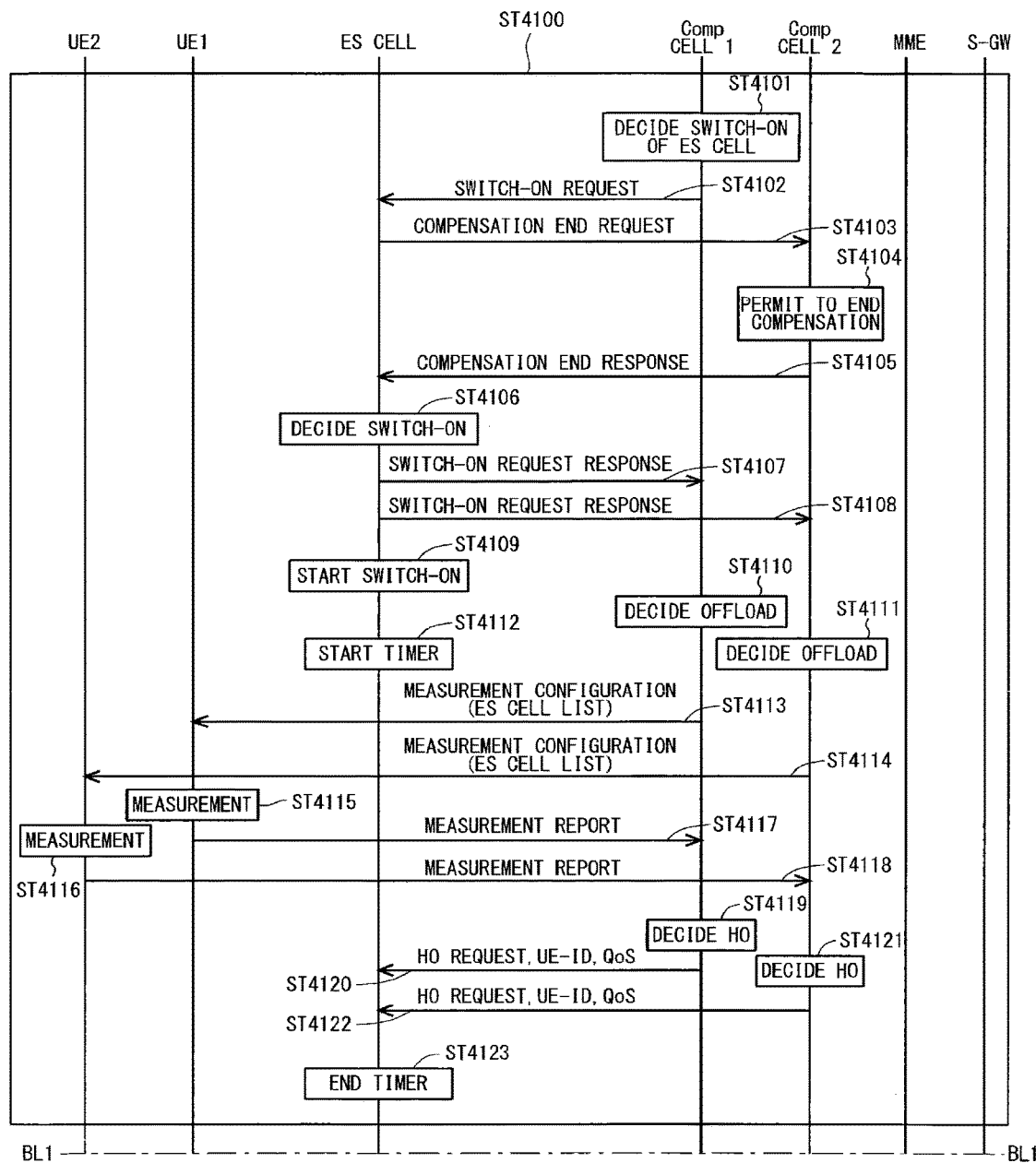

F I G. 1 9
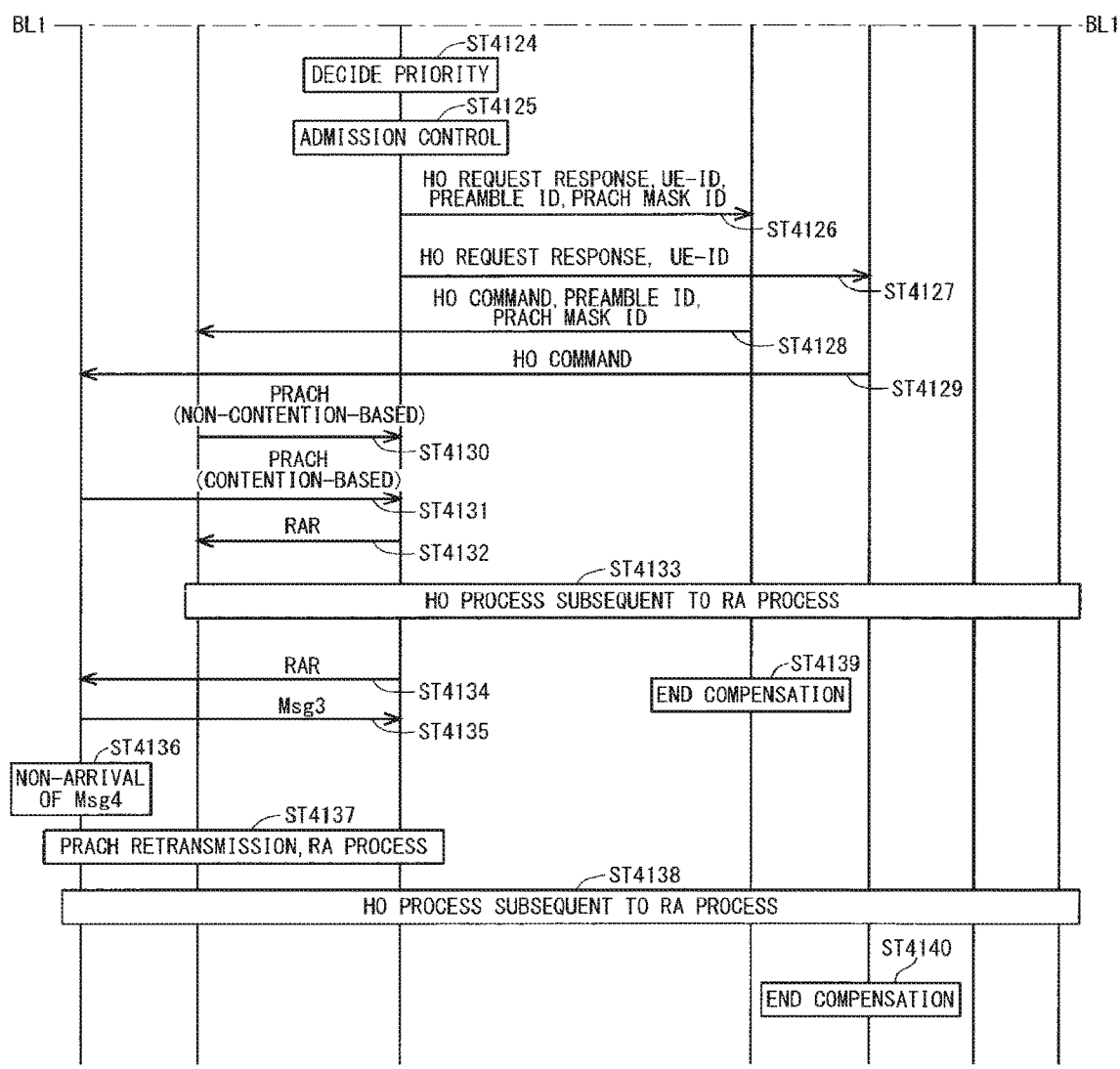

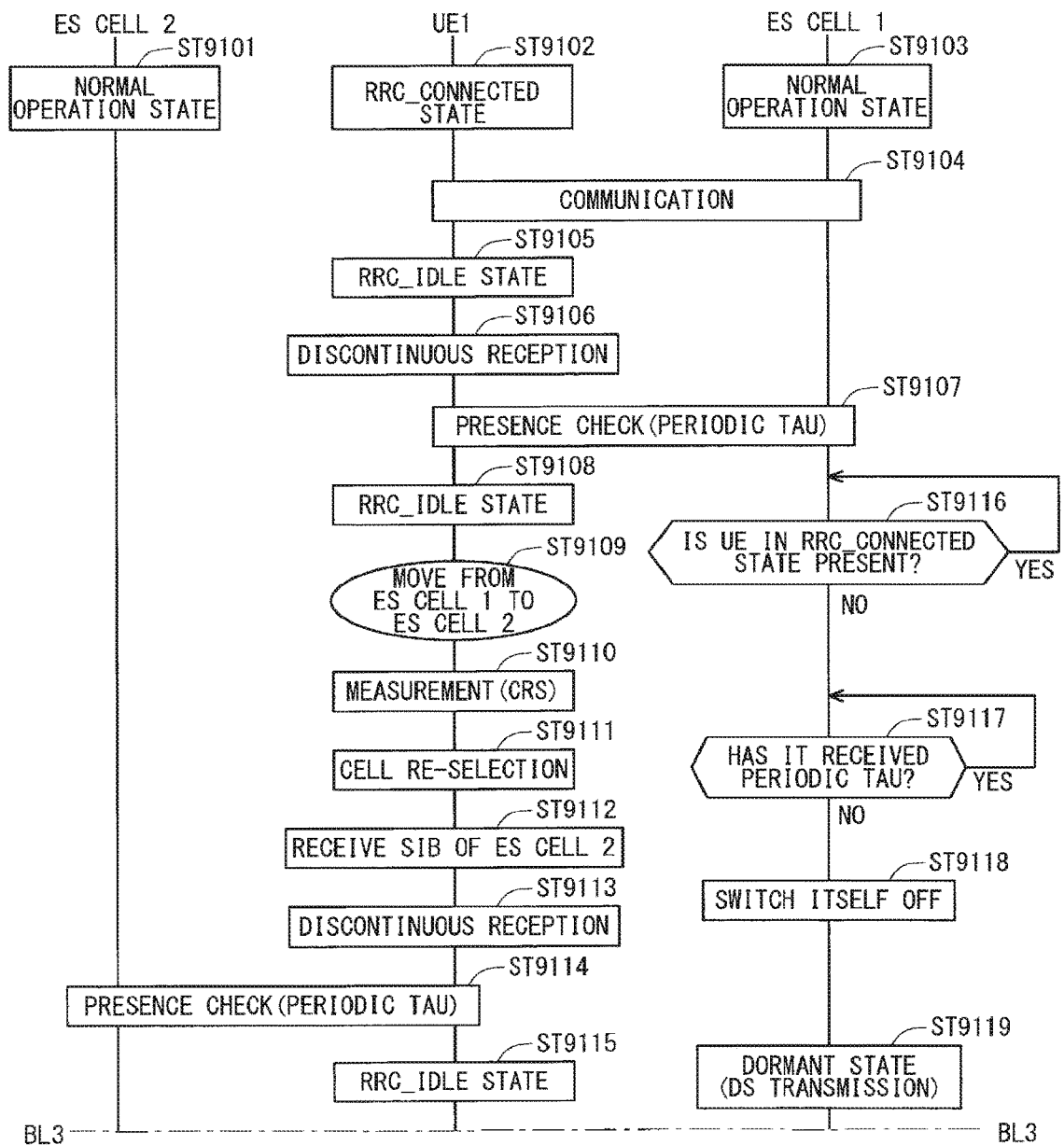
F I G . 3 4

COMMUNICATION SYSTEM

CROSS-REFERENCE TO RELATED APPLICATIONS

The present application is a Divisional of co-pending U.S. application Ser. No. 15/032,271 filed Apr. 26, 2016, and which is based on PCT filing PCT/JP2014/078847 filed Oct. 30, 2014, and claims priority to JP 2013-228377 filed Nov. 1, 2013, the entire contents of each of which are incorporated herein by reference.

TECHNICAL FIELD

The present invention relates to a communication system in which radio communication is performed between a communication terminal device and a base station device.

BACKGROUND ART

The 3rd generation partnership project (3GPP), the standard organization regarding the mobile communication system, is studying new communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 15). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration as that of a non-CSG cell is used in a closed subscriber group (CSG) cell.

A physical broadcast channel (PBCH) is a channel for downlink transmission from a base station device (hereinafter, merely referred to as a "base station" as well) to a user equipment device (hereinafter, merely referred to as a "user equipment" as well) that is a communication terminal device. A BCH transport block is mapped to four subframes within a 40 ms interval. There is no explicit signaling indicating 40 ms timing.

A physical control format indicator channel (PCFICH) is a channel for downlink transmission from a base station to a user equipment. The PCFICH notifies of the number of orthogonal frequency division multiplexing (OFDM) symbols used for PDCCHs from the base station to the user equipment. The PCFICH is transmitted per subframe.

A physical downlink control channel (PDCCH) is a channel for downlink transmission from a base station to a user equipment. The PDCCH notifies of the resource allocation information for downlink shared channel (DL-SCH) being one of the transport channels described below, resource allocation information for paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a user equipment. A downlink shared channel (DL-SCH) that is a transport channel and a PCH that is a transport channel are mapped to the PDSCH.

A physical multicast channel (PMCH) is a channel for downlink transmission from a base station to a user equipment. A multicast channel (MCH) that is a transport channel is mapped to the PMCH.

A physical uplink control channel (PUCCH) is a channel for uplink transmission from a user equipment to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a user equipment to a base station. An uplink shared channel (UL-SCH) that is one of the transport channels is mapped to the PUSCH.

A physical hybrid ARQ indicator channel (PHICH) is a channel for downlink transmission from a base station to a user equipment. The PHICH carries Ack/Nack that is a response signal to uplink transmission. A physical random access channel (PRACH) is a channel for uplink transmission from the user equipment to the base station. The PRACH carries a random access preamble.

A downlink reference signal (RS) is a known symbol in the LTE communication system. The following five types of downlink reference signals are defined: cell-specific reference signals (CRSs), MBSFN reference signals, data demodulation reference signals (DM-RSs) being UE-specific reference signals, positioning reference signals (PRSs), and channel-state information reference signals (CSI-RSs). The physical layer measurement objects of a user equipment include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in the case where the user equipments have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a channel that transmits dedicated control information between a user equipment and a network on a point-to-point basis. The DCCH is used when the user equipment has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed to use are specified by an operator (hereinafter, also referred to as a "cell for specific subscribers"). The specified subscribers are permitted to access one or more cells of a public land mobile network (PLMN). One or more cells in which the specified subscribers are permitted access are referred to as "CSG cell(s)." Note that access is limited in the PLMN.

The CSG cell is part of the PLMN that broadcasts a specific CSG identity (CSG ID; CSG-ID) and broadcasts "TRUE" in a CSG indication. The authorized members of the subscriber group who have registered in advance access the CSG cells using the CSG-ID that is the access permission information.

The CSG-ID is broadcast by the CSG cell or cells. A plurality of CSG-IDs exist in the LTE communication system. The CSG-IDs are used by a user equipment (UE) for making access from CSG-related members easier.

The locations of user equipments are tracked based on an area composed of one or more cells. The locations are tracked for enabling tracking the locations of user equipments and calling user equipments, in other words, incoming calling to user equipments, even in an idle state. An area for tracking locations of user equipments is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 3 discloses three different modes of the access to the HeNB and HNB. Specifically, an open access mode, a closed access mode, and a hybrid access mode are disclosed.

The individual modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are permitted access at the same time. In other words, a cell in the hybrid access mode (also referred to as a hybrid cell) is a cell that supports both the open access mode and the closed access mode.

In 3GPP, among all physical cell identities (PCIs), there is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to user equipments being served thereby. Being served by a base station means taking the base station as a serving cell.

Non-Patent Document 4 discloses the basic operation of a user equipment using PCI split. The user equipment that does not have the PCI split information needs to perform cell search using all PCIs, for example, using all 504 codes. On the other hand, the user equipment that has the PCI split information is capable of cell search using the PCI split information.

Further, 3GPP is pursuing specifications standard of long term evolution advanced (LTE-A) as Release 10 (see Non-Patent Documents 5 and 6). The LTE-A is based on the LTE radio communication system and is configured by adding several new techniques to the system.

Carrier aggregation (CA) is studied for the LTE-A system, in which two or more component carriers (CCs) are aggregated to support wider transmission bandwidths up to 100 MHz.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a pair of a PCell and a serving cell, in accordance with the UE capability. In downlink, a carrier corresponding to SCell is a downlink secondary component carrier (DL SCC). In uplink, a carrier corresponding to SCell is an uplink secondary component carrier (UL SCC).

A pair of one PCell and a serving cell configured by one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 7.

3GPP is pursuing specifications standard of Release 12, where the use of small eNBs configuring a small cell is studied to satisfy a tremendous volume of traffic in the future. For example, the following technique is studied: spectral efficiency is increased through installation of a large number of small eNBs to configure a large number of small cells, thereby increasing communication capacity.

The traffic flow of a mobile network is on the rise, and the communication rate is also increasing. It is expected that the communication rate will be further increased when the operations of the LTE and the LTE-A are fully initiated, leading to an increase in traffic flow.

For a sustainable society, a reduction in power consumption is required also in a mobile communication system. To reduce power consumption as the entire mobile communication system, a reduction in power consumption is required for base stations as well as for mobile terminals for which a reduction in power consumption has been required.

3GPP is pursuing specifications standard of Release 12, where the approaches of reducing the power consumption of base stations are studied (see Non-Patent Document 13). Examples of the approaches include overlaid scenarios and compensating eNB(s) deployment scenarios.

In these scenarios, consumption power is reduced, that is, energy saving (ES) is achieved by switching a cell configured by a base station from a normal operation state to an energy saving state with low power consumption compared with the normal operation state, specifically, by switching off the cell configured by a base station.

The cell that is switched on or off for energy saving may be referred to as an energy saving cell (abbreviated as an ES cell) in the description below.

PRIOR ART DOCUMENTS

Non-Patent Documents

Non-Patent Document 1: 3GPP TS36.300 V11.5.0
Non-Patent Document 2: 3GPP TS36.304 V11.1.0
Non-Patent Document 3: 3GPP S1-083461
Non-Patent Document 4: 3GPP R2-082899
Non-Patent Document 5: 3GPP TR36.814 V9.0.0
Non-Patent Document 6: 3GPP TR36.912 V10.0.0
Non-Patent Document 7: 3GPP TR36.819 V11.1.0
Non-Patent Document 8: 3GPP TS36.141 V11.1.0
Non-Patent Document 9: 3GPP R1-131530
Non-Patent Document 10: 3GPP TS36.331 V11.3.0
Non-Patent Document 11: 3GPP TR36.842 V0.2.0
Non-Patent Document 12: 3GPP TS37.320 V11.3.0
Non-Patent Document 13: 3GPP TS36.887 V0.2.0
Non-Patent Document 14: 3GPP TS36.321 V11.2.0
Non-Patent Document 15: 3GPP TR36.872 V12.0.0

SUMMARY OF INVENTION

Problem to be Solved by the Invention

When an ES cell transitions from a switch-on state to a switch-off state or from the switch-off state to the switch-on state, a UE in a connected state (RRC_Connected state) which is connected with the ES cell or a Comp cell is desired to keep that state. This, however, involves the following problem.

For example, in the compensating eNB(s) deployment scenario, if there is a discrepancy between the timing at which the ES cell switches itself on or off and the timing at which the coverage of the Comp cell increases or decreases in the cells, interference between the cells and a coverage hole may occur.

To avoid the occurrence of such interference between cells and a coverage hole, it is proposed to gradually increase or decrease the transmission power of each cell in switching on or off the ES cell or increasing or decreasing the coverage of the Comp cell (see Non-Patent Document 13).

When synchronization is not achieved between the cells, however, the timings at which the transmission power is increased or decreased cannot be made perfectly identical between the cells. Therefore, when the ES cell is switched on or off and the coverage of the Comp cell is increased or decreased, the occurrence of interference between the ES cell and the Comp cell and coverage hole cannot be completely avoided. The UE in the RRC_Connected state may accordingly fail to keep that state.

When the Comp cell increases its transmission power to compensate for the coverage of the ES cell, interference with the ES cell occurs. A UE located closer to the coverage edge of the ES cell has higher interference due to an increase in transmission power of the Comp cell.

This interference reduces the reception quality of the UE connected with the ES cell, which may cause a failure in radio connection of the UE, that is, a radio link failure (RLF). This leads to such a problem that during the transition of the ES cell from the switch-on state to the switch-off state, the UE in the connected state fails to establish a new connection and can no longer keep the connected state.

The present invention has an object to provide a communication system in which a communication terminal device in a connected state can keep that state when an energy saving cell transitions from a normal operation state to an energy saving state.

Means to Solve the Problem

A communication system according to the present invention is a communication system including base station devices and a communication terminal device capable of radio communication with the base station devices. The base station devices include an energy saving base station device and a compensating base station device. The energy saving base station device configures an energy saving cell capable of switching between a normal operation state and an energy saving state with power consumption lower than that of the normal operation state. The compensating base station device configures, when the energy saving cell is in the energy saving state, a compensation cell that compensates for a coverage being a range in which the energy saving cell is capable of communication. The energy saving base station device notifies the communication terminal device being connected with the energy saving cell of information about the compensation cell before the compensation cell starts compensating for the coverage.

Effects of the Invention

According to the present invention, a communication system is provided that includes base station devices and a communication terminal device capable of radio communication with the base station devices. The base station devices include an energy saving base station device configuring an energy saving cell capable of switching between a normal operation state and an energy saving state, and a compensating base station device configuring a compensation cell. The energy saving base station device notifies, before the compensation cell starts compensating for a coverage, the communication terminal device being connected with the energy saving cell of information about a compensation cell that compensates for the coverage of the energy saving cell when the energy saving cell is in the energy saving state. This enables the communication terminal device to establish communication with the compensation cell using the information about a compensation cell, which has been notified in advance, even when the communication terminal device that has been connected with the energy saving cell fails to communicate with the energy saving cell during the transition of the energy saving cell from the normal operation state to the energy saving state. When the energy saving cell transitions from the normal operation state to the energy saving state, therefore, the communication terminal device in the connected state can keep that state.

The object, features, aspects and advantages of the present invention will become more apparent from the following detailed description and the attached drawings.

BRIEF DESCRIPTION OF DRAWINGS

FIG. 3 is a block diagram showing the configuration of a user equipment 71 shown in FIG. 2, which is a user equipment according to the present invention.

FIG. 5 is a block diagram showing the configuration of an MME according to the present invention.

FIG. 6 is a flowchart showing an outline from a cell search to an idle state operation performed by a user equipment (UE) in the LTE communication system.

FIG. 8 is a diagram for explaining a compensating eNB(s) deployment scenario.

FIG. 9 is another diagram for explaining the compensating eNB(s) deployment scenario.

FIG. 13 shows another example of the sequence of the ES process in the communication system according to the first modification of the first embodiment of the present invention.

FIG. 14 shows an example of the sequence of an ES process in a communication system according to a second modification of the first embodiment of the present invention.

FIG. 17 shows an example of the sequence of an ES process in a communication system according to a second embodiment of the present invention.

FIG. 18 shows an example of the sequence of an ES process in a communication system according to a third embodiment of the present invention.

FIG. 19 shows the example of the sequence of the ES process in the communication system according to the third embodiment of the present invention.

FIG. 34 shows an example of the sequence of an ES process in a communication system according to an eighth embodiment of the present invention.

DESCRIPTION OF EMBODIMENTS

First Embodiment

Figure 1:
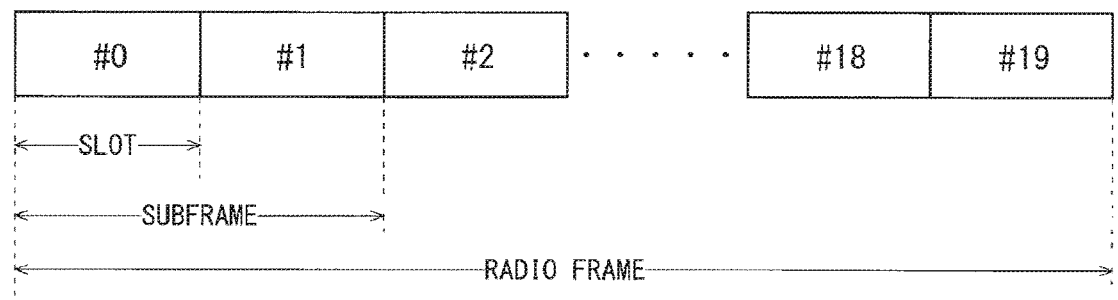
FIG. 1 is a diagram illustrating the configuration of a radio frame for use in an LTE communication system.
Figure 2:
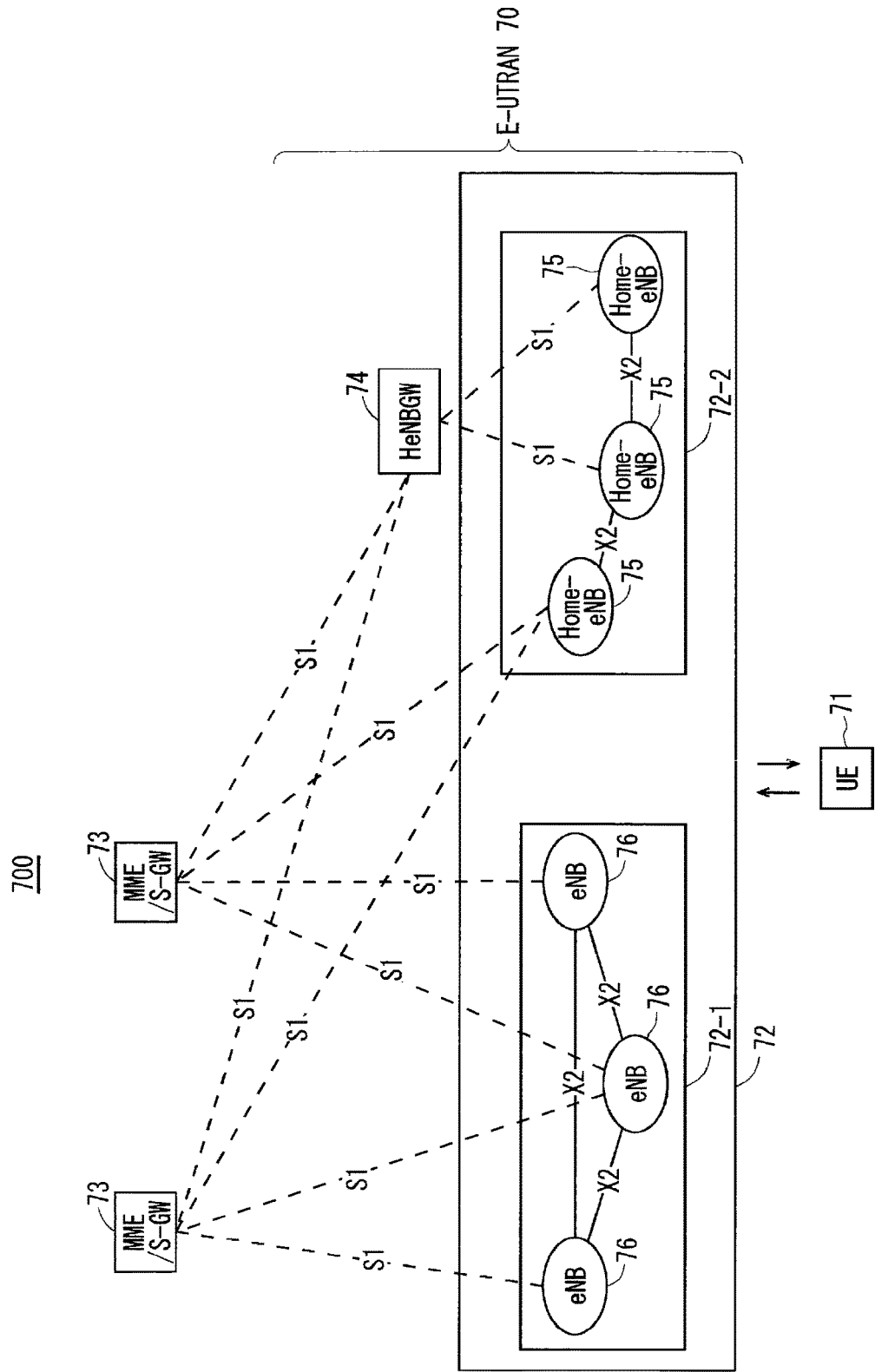
FIG. 2 is a block diagram showing the overall configuration of an LTE communication system 700 under discussion of 3GPP.

FIG. 2 is a block diagram showing an overall configuration of an LTE communication system 700, which is under discussion of 3GPP. FIG. 2 will be described. A radio access network is referred to as an evolved universal terrestrial radio access network (E-UTRAN) 70. A user equipment device (hereinafter, referred to as a "user equipment (UE)") 71 being a communication terminal device is capable of radio communication with a base station device (hereinafter, referred to as a "base station (E-UTRAN Node B: eNB)") 72 and transmits and receives signals through radio communication.

The E-UTRAN is composed of one or a plurality of base stations 72, provided that a control protocol for a user equipment 71 such as a radio resource control (RRC), and user planes such as a packet data convergence protocol (PDCP), radio link control (RLC), medium access control (MAC), and physical layer (PHY) are terminated in the base station 72.

The control protocol radio resource control (RRC) between the user equipment 71 and the base station 72 performs broadcast, paging, RRC connection management, and the like. The states of the base station 72 and the user equipment 71 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbour cell are performed.

The base stations 72 are classified into eNBs 76 and Home-eNBs 75. The communication system 700 includes a eNB group 72-1 including a plurality of eNBs 76 and a Home-eNB group 72-2 including a plurality of Home-eNBs 75. A system, composed of an evolved packet core (EPC) being a core network and an E-UTRAN 70 being a radio access network, is referred to as an evolved packet system (EPS). The EPC being a core network and the E-UTRAN 70 being a radio access network may be collectively referred to as a "network."

The eNB 76 is connected to an MME/S-GW unit (hereinafter, also referred to as an "MME unit") 73 including a mobility management entity (MME), a serving gateway (S-GW), or an MME and an S-GW by means of an S1 interface, and control information is communicated between the eNB 76 and the MME unit 73. A plurality of MME units 73 may be connected to one eNB 76. The eNBs 76 are connected to each other by means of an X2 interface, and control information is communicated between the eNBs 76.

The Home-eNB 75 is connected to the MME unit 73 by means of an S1 interface, and control information is communicated between the Home-eNB 75 and the MME unit 73. A plurality of Home-eNBs 75 are connected to one MME unit 73. Or, the Home-eNBs 75 are connected to the MME units 73 through a Home-eNB gateway (HeNBGW) 74. The Home-eNB 75 is connected to the HeNBGW 74 by means of an S1 interface, and the HeNBGW 74 is connected to the MME unit 73 through an S1 interface.

One or a plurality of Home-eNBs 75 are connected to one HeNBGW 74, and information is communicated therebetween through an S1 interface. The HeNBGW 74 is connected to one or a plurality of MME units 73, and information is communicated therebetween through an S1 interface.

The MME units 73 and HeNBGW 74 are entities of higher layer, specifically, higher nodes, and control the connections between the user equipment (UE) 71 and the eNB 76 and the Home-eNB 75 being base stations. The MME units 73 configure an EPC being a core network. The base station 72 and the HeNBGW 74 configure an E-UTRAN 70.

Further, 3GPP is studying the configuration below. The X2 interface between the Home-eNBs 75 is supported. In other words, the Home-eNBs 75 are connected to each other by means of an X2 interface, and control information is communicated between the Home-eNBs 75. The HeNBGW 74 appears to the MME unit 73 as the Home-eNB 75. The HeNBGW 74 appears to the Home-eNB 75 as the MME unit 73.

The interfaces between the Home-eNBs 75 and the MME units 73 are the same, which are the S1 interfaces, in both cases where the Home-eNB 75 is connected to the MME unit 73 through the HeNBGW 74 and it is directly connected to the MME unit 73.

The base station device 72 may configure a single cell or a plurality of cells. Each cell has a range predetermined as a coverage in which the cell can communicate with a communication terminal device and performs radio communication with the communication terminal device within the coverage. In the case where one base station device configures a plurality of cells, every cell is configured to communicate with a user equipment.

FIG. 3 is a block diagram showing the configuration of the user equipment 71 of FIG. 2, which is a user equipment according to the present invention. The transmission process of the user equipment 71 shown in FIG. 3 will be described. First, a transmission data buffer unit 803 stores the control data from a protocol processing unit 801 and the user data from an application unit 802. The data stored in the transmission data buffer unit 803 is passed to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is converted into a baseband signal, and the baseband signal is output to a frequency converting unit 806 to be converted into a radio transmission frequency. After that, a transmission signal is transmitted from an antenna 807 to the base station 72.

The user equipment 71 executes the reception process as follows. A radio signal from the base station 72 is received through the antenna 807. The received signal is converted from a radio reception frequency into a baseband signal by the frequency converting unit 806 and is then demodulated by a demodulating unit 808. The demodulated data is passed to a decoding unit 809 and is subjected to a decoding process such as error correction. Among the pieces of decoded data, the control data is passed to the protocol processing unit 801, while the user data is passed to the application unit 802. A series of processes of the user equipment 71 is controlled by a control unit 810. This means that, though not shown in FIG. 3, the control unit 810 is connected to the individual units 801 to 809.

Figure 4:
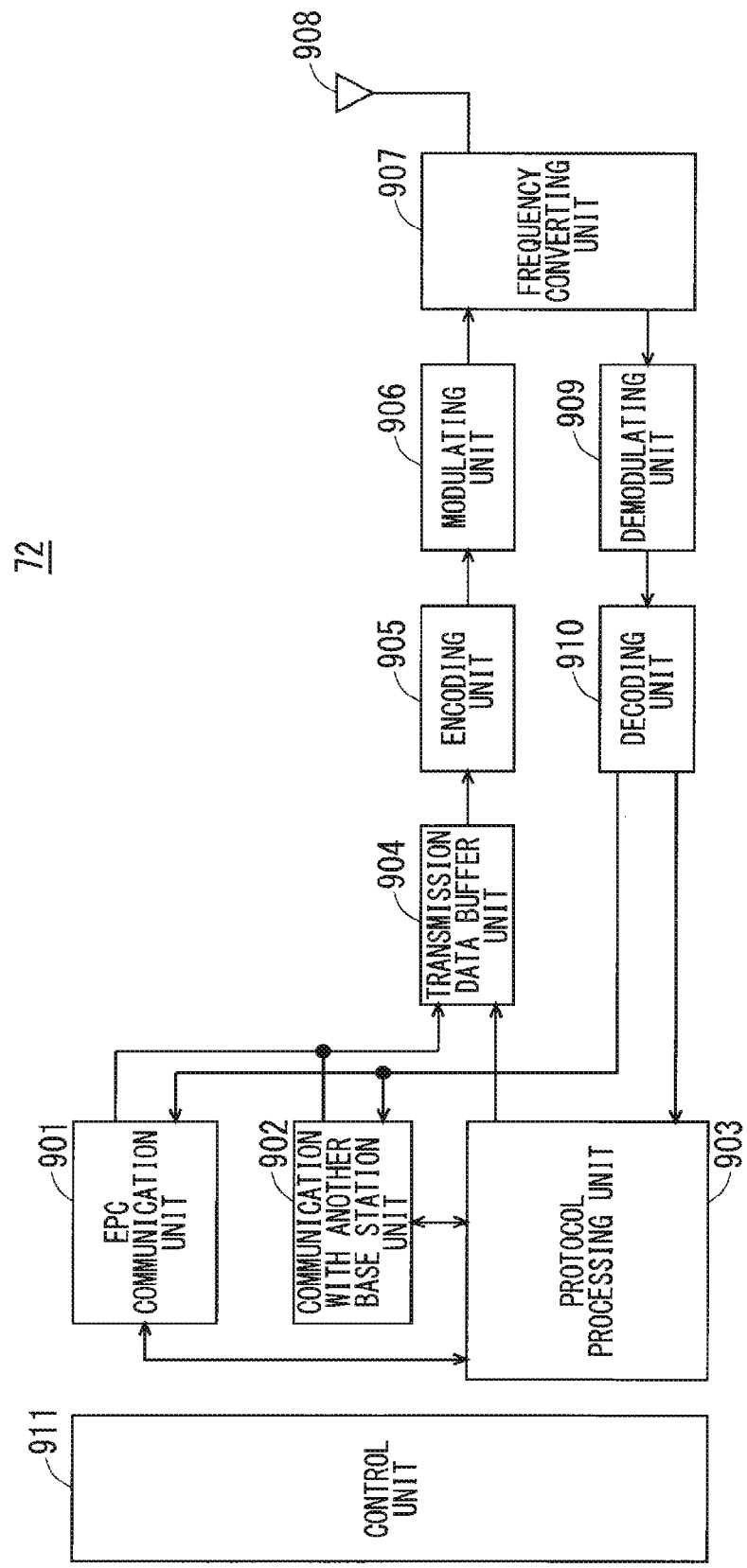
FIG. 4 is a block diagram showing the configuration of a base station 72 shown in FIG. 2, which is a base station according to the present invention.

FIG. 4 is a block diagram showing the configuration of the base station 72 of FIG. 2, which is a base station according to the present invention. The transmission process of the base station 72 shown in FIG. 4 will be described. An EPC communication unit 901 performs data transmission and reception between the base station 72 and the EPC (such as the MME unit 73), HeNBGW 74, and the like. A communication with another base station unit 902 performs data transmission and reception to and from another base station. The EPC communication unit 901 and the communication with another base station unit 902 each transmit and receive information to and from a protocol processing unit 903. The control data from the protocol processing unit 903, and the user data and the control data from the EPC communication unit 901 and the communication with another base station unit 902 are stored in a transmission data buffer unit 904.

The data stored in the transmission data buffer unit 904 is passed to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is converted into a baseband signal, and the baseband signal is output to a frequency converting unit 907 to be converted into a radio transmission frequency. After that, a transmission signal is transmitted from an antenna 908 to one or a plurality of user equipments 71.

The reception process of the base station 72 is executed as follows. A radio signal from one or a plurality of user equipments 71 is received through the antenna 908. The received signal is converted from a radio reception frequency into a baseband signal by the frequency converting unit 907, and is then demodulated by a demodulating unit 909. The demodulated data is passed to a decoding unit 910 and is then subjected to a decoding process such as error correction. Among the pieces of decoded data, the control data is passed to the protocol processing unit 903, the EPC communication unit 901, or the communication with another base station unit 902, while the user data is passed to the EPC communication unit 901 and the communication with another base station unit 902. A series of processes by the base station 72 is controlled by a control unit 911. This means that, though not shown in FIG. 4, the control unit 911 is connected to the individual units 901 to 910.

FIG. 5 is a block diagram showing the configuration of the MME according to the present invention. FIG. 5 shows the configuration of an MME 73*a* included in the MME unit 73 shown in FIG. 2 described above. A PDN GW communication unit 1001 performs data transmission and reception between the MME 73*a* and the PDN GW. A base station communication unit 1002 performs data transmission and reception between the MME 73*a* and the base station 72 by means of the S1 interface. In the case where the data received from the PDN GW is user data, the user data is passed from the PDN GW communication unit 1001 to the base station communication unit 1002 via a user plane communication unit 1003 and is then transmitted to one or a plurality of base stations 72. In the case where the data received from the base station 72 is user data, the user data is passed from the base station communication unit 1002 to the PDN GW communication unit 1001 via the user plane communication unit 1003 and is then transmitted to the PDN GW.

In the case where the data received from the PDN GW is control data, the control data is passed from the PDN GW communication unit 1001 to a control plane control unit 1005. In the case where the data received from the base station 72 is control data, the control data is passed from the base station communication unit 1002 to the control plane control unit 1005.

A HeNBGW communication unit 1004 is provided in the case where the HeNBGW 74 is provided, which performs data transmission and reception between the MME 73*a* and the HeNBGW 74 by means of the interface (IF) according to an information type. The control data received from the HeNBGW communication unit 1004 is passed from the HeNBGW communication unit 1004 to the control plane control unit 1005. The processing results of the control plane control unit 1005 are transmitted to the PDN GW via the PDN GW communication unit 1001. The processing results of the control plane control unit 1005 are transmitted to one or a plurality of base stations 72 by means of the S1 interface via the base station communication unit 1002, and are transmitted to one or a plurality of HeNBGWs 74 via the HeNBGW communication unit 1004.

The control plane control unit 1005 includes a NAS security unit 1005-1, an SAE bearer control unit 1005-2, and an idle state mobility managing unit 1005-3, and performs an overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of a paging signal in the idle state, addition, deletion, update, and search of a tracking area of one or a plurality of user equipments 71 being served thereby, and tracking area list management.

The MME 73a distributes paging signals to one or a plurality of base stations 72. In addition, the MME 73a performs mobility control of an idle state. When the user equipment is in the idle state and an active state, the MME 73a manages a list of tracking areas. The MME 73a begins a paging protocol by transmitting a paging message to the cell belonging to a tracking area with which the UE is registered. The idle state mobility managing unit 1005-3 may manage the CSG of Home-eNBs 75 to be connected to the MME 73a, CSG-IDs, and a whitelist.

An example of a cell search method in a mobile communication system will be described next. FIG. 6 is a flowchart showing an outline from a cell search to an idle state operation performed by a user equipment (UE) in the LTE communication system. When starting a cell search, in Step ST1201, the user equipment synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to physical cell identities (PCIs) assigned per cell, are assigned to the synchronization signal (SS). The number of PCIs is currently studied in 504 ways. The 504 ways of PCIs are used for synchronization, and the PCIs of the synchronized cells are detected (specified).

In Step ST1202, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST1201, which makes it possible to detect the RS and measure the RS received power.

In Step ST1203, next, the user equipment selects the cell having the best RS reception quality, for example, the cell having the highest RS received power, that is, the best cell, from one or more cells that have been detected up to Step ST1202.

In Step ST1204, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), the number of transmission antennas, and system frame number (SFN).

In Step ST1205, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer greater than or equal to two). In addition, the SIB1 contains a tracking area code (TAC).

In Step ST1206, next, the user equipment compares the TAC of the SIB1 received in Step ST1205 with the TAC portion of a tracking area identity (TAI) in the tracking area list that has already been possessed by the user equipment. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST1206 shows that the TAC received in Step ST1205 is identical to the TAC included in the tracking area list, the user equipment enters an idle state operation in the cell. If the comparison shows that the TAC received in Step ST1205 is not included in the tracking area list, the user equipment requires a core network (EPC) including the MME to change a tracking area through the cell for performing tracking area update (TAU).

The device configuring a core network (hereinafter, also referred to as a "core-network-side device") updates the tracking area list based on an identification number of a user equipment (such as UE-ID) transmitted from the user equipment together with a TAU request signal. The core-network-side device transmits the updated tracking area list to the user equipment. The user equipment rewrites (updates) the TAC list of the user equipment based on the received tracking area list. After that, the user equipment enters the idle state operation in the cell.

Widespread use of smartphones and tablet terminals explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell configuring a relatively-wide-range coverage, that is, a cell having a relatively wide coverage area, similarly to a cell configured by a conventional eNB. A "small cell" refers to a cell configuring a relatively-narrow-range coverage, that is, a cell having a relatively narrow coverage area, and a "small eNB" refers to an eNB configuring a small cell.

The macro eNB may be, for example, a "wide area base station" described in Non-Patent Document 8.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 8.

For a sustainable society, a reduction in power consumption is required also in a mobile communication system. To reduce power consumption as the entire mobile communication system, a reduction in power consumption is required for base stations as well as for mobile terminals for which a reduction in power consumption has been required.

3GPP is pursuing specifications standard of Release 12, where the methods of reducing the power consumption of base stations are studied (see Non-Patent Document 13). Examples of the methods include overlaid scenarios and compensating eNB(s) deployment scenarios.

Figure 7:
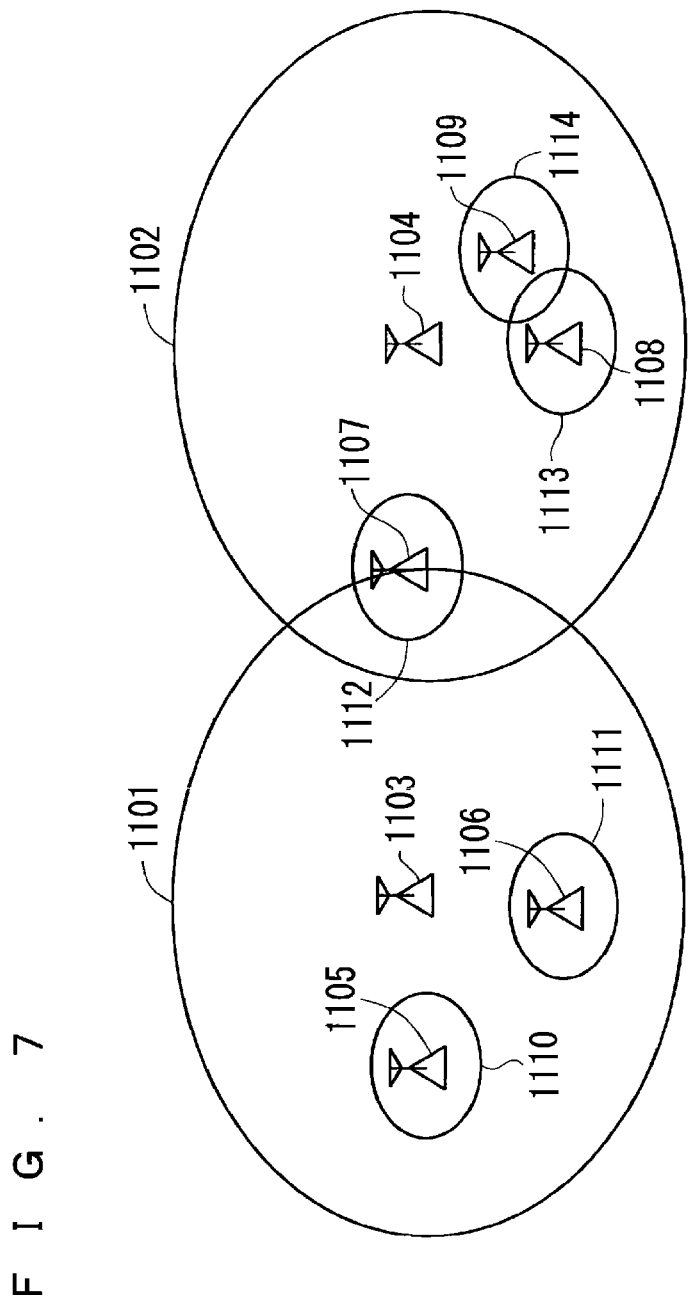
FIG. 7 is a diagram for explaining an overlaid scenario.

FIG. 7 is a diagram for explaining an overlaid scenario. In the overlaid scenario, a communication system is configured by a cell having a relatively-wide-range coverage (hereinafter, also referred to as a "coverage cell") and a cell having a relatively-narrow-range coverage (hereinafter, also referred to as a "capacity cell") which is installed to increase capacity.

For example, in the example shown in FIG. 7, first and second eNBs 1103 and 1104 each configure a coverage cell. The coverage cell configured by the first eNB 1103 has a first coverage 1101. The coverage cell configured by the second eNB 1104 has a second coverage 1102.

Third to seventh eNBs 1105, 1106, 1107, 1108, and 1109 each configure a capacity cell. The capacity cell configured by the third eNB 1105 has a third coverage 1110. The capacity cell configured by the fourth eNB 1106 has a fourth coverage Ill 1. The capacity cell configured by the fifth eNB 1107 has a fifth coverage 1112. The capacity cell configured by the sixth eNB 1108 has a sixth coverage 1113. The capacity cell configured by the seventh eNB 1109 has a seventh coverage 1114.

As shown in FIG. 7, the respective cells configured by the first to seventh eNBs 1103 to 1109 are placed such that the coverages 1110 to 1114 of the capacity cells respectively configured by the third to seventh eNBs 1105 to 1109 are located within the coverages 1101 and 1102 of the coverage cells respectively configured by the first and second eNBs 1103 and 1104.

In the overlaid scenario, power consumption is reduced, that is, energy saving (ES) is achieved by switching off the capacity cells configured by the third to seventh eNBs 1105 to 1109. The cell that is switched on or off for energy saving may be referred to as an energy saving cell (abbreviated as ES cell) in the description below.

Herein, "switching off an ES cell" refers to stopping at least part of the operations of the ES cell, and "the state in which an ES cell is switched off (hereinafter, also referred to as a "switch-off state") refers to the state in which at least part of the operations of the ES cell is stopped. Therefore, the switch-off state of the ES cell refers to the state in which all the operations of the ES cell are stopped and the state in which part of the operations of the ES cell are stopped and the other operations are continued.

One example of the state in which part of the operations of the ES cell is stopped and the other operations are continued is the state in which the operations of the radio access network (RAN) side are stopped and the operations of the interface with the network side are continued. Another example is the state in which the ES cell transmits only predetermined radio signals, and continues the operations of the interface with the network side, and stops the other operations. These states are referred to as "dormant states."

The switch-off state, such as the dormant state, corresponds to the energy saving state. The energy saving state refers to the state in which power consumption is lower than in the normal operation state. The normal operation state refers to the state in which each operation of the ES cell is performed, that is, the state in which each operation of the ES cell is not stopped. The switch-on state in which the ES cell is switched on corresponds to the normal operation state. The ES cell can thus switch between the normal operation state and the energy saving state.

In the overlaid scenario, if the respective capacity cells configured by the third to seventh eNBs 1105 to 1109 are switched off, the UEs that have been located in the coverages 1110 to 1114 of the capacity cells can be located in the coverages 1101 and 1102 of the coverage cells respectively configured by the first and second eNBs 1103 and 1104.

FIGS. 8 and 9 are diagrams for explaining the compensating eNB(s) deployment scenario. The compensating eNB(s) deployment scenario is the method in which the ES cell is switched off to reduce power consumption and a neighbor cell increases the coverage to compensate for the coverage of the switched-off ES cell. The cell that compensates for the coverage of the ES cell is referred to as a "compensation cell (abbreviated as a Comp cell)."

FIG. 8 shows the case where the cell configured by a first macro eNB 1204 is a Comp cell, and the cells configured by second to fourth macro eNBs 1208 to 1210 are ES cells. In the example shown in FIG. 8, the first macro eNB 1204 configures three cells, each of which is a Comp cell. Each of the second to fourth macro eNBs 1208 to 1210 configures one cell, each of which is an ES cell.

The base station devices each configuring an ES cell, for example, the second to fourth macro eNBs 1208 to 1210 in the example shown in FIG. 8 correspond to energy saving base station devices. The base station device configuring a Comp cell, for example, the first macro eNB 1204 in the example shown in FIG. 8 corresponds to a compensating base station device.

FIG. 8(*a*) shows the case where the respective ES cells configured by the second to fourth macro eNBs 1208 to 1210 are in the switch-on state. FIG. 8(*b*) shows the case in which the ES cells configured by the second to fourth macro eNBs 1208 to 1210 are in the switch-off state, specifically, are in the dormant state.

As shown in FIG. 8(*a*), when the ES cells configured by the second to fourth macro eNBs 1208 to 1210 are in the switch-on state, the Comp cells configured by the first macro eNB 1204 respectively have coverages 1201 to 1203 of, for example, an oval shape. The ES cells configured by the second to fourth macro eNBs 1208 to 1210 respectively have coverages 1205 to 1207 of, for example, an oval shape. The coverages 1201 to 1203 of the Comp cells are formed while partially overlapping the coverages 1205 to 1207 of the ES cells.

In the compensating eNB(s) deployment scenario, the respective ES cells configured by the second to fourth macro eNBs 1208 to 1210 transition from the switch-on state shown in FIG. 8(*a*) to the switch-off state shown in FIG. 8(*b*), specifically, the dormant state. The ES cell in the dormant state may be referred to as a "dormant cell" in the description below.

When the ES cells configured by the second to fourth macro eNBs 1208 to 1210 enter the dormant state, the coverages 1201 to 1203 of the Comp cells configured by the first macro eNB 1204 are extended so as to respectively include the coverages 1205 to 1207 of the ES cells in the switch-on state into, for example, a circular shape.

FIG. 9 shows the case where the cell configured by the first macro eNB 1204 is an ES cell, and the cells configured by the second to fourth macro eNBs 1208 to 1210 are Comp cells. In the example shown in FIG. 9, the first macro eNB 1204 configures three cells, each of which is an ES cell.

Each of the second to fourth macro eNBs 1208 to 1210 configures one cell, and each cell is a Comp cell.

FIG. 9(*a*) shows the case where the ES cells configured by the first macro eNB 1204 are in the switch-on state. FIG. 9(*b*) shows the case where the ES cells configured by the first macro eNB 1204 are in the switch-off state, specifically, the dormant state.

As shown in FIG. 9(*a*), when the respective ES cells configured by the first macro eNB 1204 are in the switch-on state, the respective ES cells have the coverages 1201 to 1203 of, for example, an oval shape. The Comp cells configured by the second to fourth macro eNBs 1208 to 1210 respectively have the coverages 1205 to 1207 of, for example, an oval shape. The coverages 1201 to 1203 of the ES cells are formed while partially overlapping the coverages 1205 to 1207 of the Comp cells.

In the compensating eNB(s) deployment scenario, each of the ES cells configured by the first macro eNB 1204 transitions from the switch-on state shown in FIG. 9(*a*) to the switch-off state shown in FIG. 9(*b*), specifically, the dormant state. Thus, the coverages 1205 to 1207 of the Comp cells respectively configured by the second to fourth macro eNBs 1208 to 1210 are extended so as to respectively include the coverages 1201 to 1203 of the ES cells in the switch-on state into, for example, a circular shape.

As shown in FIGS. 8 and 9, when the ES cell transitions from the switch-on state to the switch-off state or from the switch-off state to the switch-on state, the UE in the RRC_Connected state, which is connected with the ES cell or the Comp cell, is desired to keep that state. This, however, involves a problem described below.

For example, in the compensating eNB(s) deployment scenario, if there is a discrepancy between the timing at which the ES cell is switched on or off and the timing at which the coverage of the Comp cell increases or decreases in the cells, interference between cells and a coverage hole may occur.

To avoid the occurrence of interference between cells and a coverage hole, it is proposed to gradually increase or decrease the transmission power of each cell when switching on or off the ES cell or when increasing or decreasing the coverage of the Comp cell (see Non-Patent Document 13).

When synchronization is not achieved between the cells, however, the timings at which the transmission power is increased or decreased cannot be made perfectly identical between the cells. Therefore, when the ES cell is switched on or off and the coverage of the Comp cell is increased or decreased, the occurrence of the interference between the ES cell and the Comp cell and a coverage hole cannot be completely avoided. The UE in the RRC_Connected state may accordingly fail to keep that state.

Figure 10:
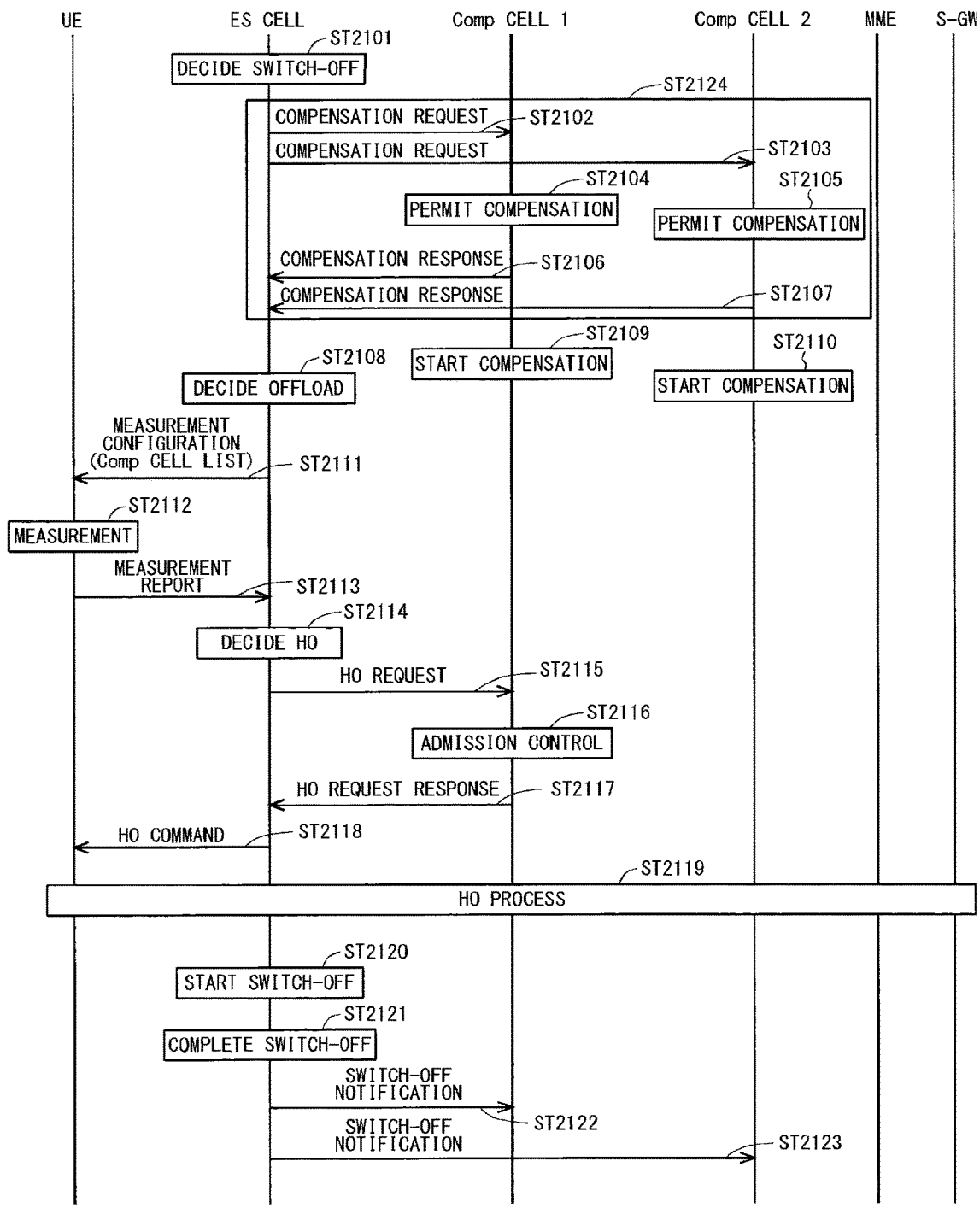
FIG. 10 shows one example of the sequence of an ES process in a communication system according to the underlying technology of the present invention.

FIG. 10 shows an example of the sequence of an ES process in a communication system according to the underlying technology of the present invention. FIG. 10 shows the sequence when the ES cell switches off its own cell for ES and the Comp cell increases the coverage of its own cell for compensating for the coverage of the ES cell.

In Step ST2101, the ES cell decides to switch itself off (hereinafter, also referred to as "switch-off"). Although the ES cell decides switch-off in the example shown in FIG. 10, as another example, the ES cell may be instructed to perform switch-off from a neighbor cell, an operation and maintenance (O&M), or the like. The O&M may be an operation administration and maintenance (OAM). The O&M and OAM are collectively referred to as "O&M" in the description below.

In Step ST2124, the ES cell performs a compensation request process on all the Comp cells that compensate for the coverage of its own cell. The compensation request process of Step ST2124 includes, specifically, processes of Steps ST2102 to ST2107.

In Step ST2102, the ES cell notifies the Comp cell 1 of a compensation request message for requesting the compensation of the coverage. In Step ST2103, the ES cell notifies the Comp cell 2 of a compensation request message.

In Step ST2104, the Comp cell 1 permits the compensation of the coverage. In Step ST2105, the Comp cell 2 permits the compensation of the coverage. In Step ST2106, the Comp cell 1 notifies the ES cell of a compensation response message, specifically, a permission message. In Step ST2107, the Comp cell 2 notifies the ES cell of a compensation response message, specifically, a permission message.

In Steps ST2109 and ST2110, the Comp cell 1 and the Comp cell 2 that have permitted the compensation of the coverage requested from the ES cell individually start compensating for the coverage. Specifically, the Comp cell 1 and the Comp cell 2 start increasing the coverage by increasing their transmission power. In this case, the Comp cell 1 and the Comp cell 2 may gradually increase the transmission power.

In Steps ST2106 and ST2107, the ES cell receives the compensation response messages, specifically, permission messages from all the Comp cells, herein, the Comp cell 1 and the Comp cell 2. In Step ST2108, the ES cell that has received the permission messages from all the Comp cells as the compensation response messages decides to offload the UE connected with its own cell to the Comp cell.

In Step ST2111, the ES cell notifies the UE connected with its own cell of the message for causing the UE to perform measurement. The message for causing the UE to perform measurement may be a measurement configuration message of RRC signaling. In the measurement configuration message, a cell to be measured may be configured as a Comp cell. Specifically, the carrier frequency and cell identifier of a Comp cell may be configured. The carrier frequency and cell identifier of the Comp cell may be configured as a Comp cell list. In the example shown in FIG. 10, the ES cell notifies the UE connected with its own cell of the measurement configuration message including the Comp cell list.

In Step ST2112, the UE that has received the measurement configuration message in Step ST2111 executes measurement in accordance with the received measurement configuration message.

At the occurrence of a measurement event, in Step ST2113, the UE notifies the ES cell of a measurement report message.

In Step ST2114, the ES cell decides HO using the measurement report message from the UE. Herein, the cell being a HO destination, that is, a target cell is the Comp cell 1.

In Step ST2115, the ES cell notifies the Comp cell 1 being a target cell of a HO request message for requesting HO. In Step ST2116, the Comp cell 1 that has received the HO request message performs admission control. In Step ST2117, the Comp cell 1 notifies the ES cell of a HO request response (HO request ack) message indicating that the Comp cell 1 will respond to the HO request. In Step ST2118, the ES cell notifies the UE of a HO command message for instructing HO.

The prior process for HO performed among the ES cell, the Comp cell 1, and the UE in Steps ST2115 to ST2119 is referred to as a "HO preparation process."

After the HO preparation process, in Step ST2119, the HO process is performed among the ES cell, the Comp cell 1, the MME, the S-GW, and the UE.

After checking the offload of all the UEs connected with its own cell, in Step ST2120, the ES cell starts switching-off of its own cell. While the ES cell is switched off, the transmission power may be decreased gradually.

In Step ST2121, the ES cell completes switch-off, thereby entering the dormant state.

In Steps ST2122 and ST2123, the ES cell notifies the neighbor cells or Comp cells, herein, the Comp cell 1 and the Comp cell 2 of a switch-off message indicating that the ES cell has completed switch-off or has entered the dormant state.

As described above, a sequence in which the ES cell performs the ES operation completes. In this sequence, however, the HO process for the Comp cell does not always complete normally for all the UEs that have been connected with the ES cell.

For example, when the Comp cell 1 or the Comp cell 2 increases the transmission power to compensate for the coverage of the ES cell in Step ST2109 or ST2110, interference with the ES cell occurs. A UE located closer to the coverage edge of the ES cell has higher interference due to an increase in transmission power of the Comp cell.

This interference may reduce the reception quality of the UE connected with the ES cell, and accordingly, the UE may cause a radio link failure (RLF). For example, when interference becomes higher before the UE connected with the ES cell receives the measurement configuration message from the ES cell, the UE fails to receive the measurement configuration message and causes an RLF between the ES cell and itself.

The UE that has caused an RLF performs RRC connection reestablishment to reestablish RRC connection. RRC connection reestablishment is usually performed similarly to the operation of selecting a cell, and thus, an enormous amount of time may be required for cell search, or optimum cell search cannot be performed. As a result, RRC connection reestablishment may be repeated. When RRC connection reestablishment is repeated, the UE may shift from the connected state (RRC_Connected state) to the idle state (RRC_Idle state).

Consequently, a large delay may occur in communications, or missing data may occur, thereby leading to communication interruption. This degrades user experience.

To solve the problem above, a communication system is desired in which a UE in the connected state can keep that state when the ES cell transitions from the switch-on state to the switch-off state. This embodiment accordingly employs the configuration below.

The eNB configuring an ES cell notifies the UE being served by the ES cell of the information about a Comp cell that compensates for the ES cell during ES of its own ES cell. That is to say, the ES cell notifies the UE of the information about a Comp cell.

The following five, (1) to (5), will be disclosed as the examples of the information about a Comp cell.

(1) Cell Identifier of Comp Cell.

Examples of the cell identifier of the Comp cell include PCI and E-CGI. When the cell identifier of the Comp cell is to be changed before/after the Comp cell increases or decreases its coverage (hereinafter, "before/after Comp" may refer to before/after the coverage is increased or decreased, "before Comp" may refer to before the coverage is increased or decreased, and "after Comp" may refer to after the coverage is increased or decreased), the cell identifier after Comp may be used. Alternatively, the cell identifier before Comp and the cell identifier after Comp may be used in association with each other.

(2) Carrier Frequency.

When the carrier frequency of a Comp cell is changed before/after Comp, the carrier frequency after Comp may be used. Alternatively, the carrier frequency before Comp and the carrier frequency after Comp may be used in association with each other.

(3) Frequency Band.

When the frequency band of a Comp cell is changed before/after Comp, the frequency band after Comp may be used. Alternatively, the frequency band before Comp and the frequency band after Comp may be used in association with each other.

(4) Comp cell indication, which is the information indicative of a Comp cell.

(5) Combination of (1) to (4) above.

For a plurality of Comp cells that compensate for the ES cell during ES of its own ES cell, the information about a plurality of Comp cells may be used as a Comp cell list.

A method in which an ES cell notifies a UE of the information about a Comp cell will be disclosed. The ES cell broadcasts the information about a Comp cell to the UE being served thereby. The information about a Comp cell may be included in the system information to be broadcast. The information about a Comp cell may be included in the neighbor cell list of the system information to be broadcast. Alternatively, a Comp cell list may be provided as a new neighbor cell list to be broadcast. When the information about a Comp cell is broadcast, notification can be made not only to the UE in the RRC_Connected state but also to the UE in the RRC_Idle state. The ES cell may search for a notified Comp cell in cell re-selection when the ES cell switches itself off.

Another method in which an ES cell notifies a UE of the information about a Comp cell will be disclosed. The ES cell notifies a target UE of the information about a Comp cell over dedicated signaling. RRC signaling may be used as dedicated signaling. In this case, for example, the message notified over RRC signaling may include the information about a Comp cell. The information about a Comp cell may be included in a neighbor cell list notified over RRC signaling to be notified. Alternatively, a Comp cell list may be provided as a new neighbor cell list to be notified. Still alternatively, the information about a Comp cell may be notified in the RRC connection establishment process when the UE is connected. The ES cell notifies the UE of the information about a Comp cell in the RRC connection establishment of the UE, thereby allowing the UE to recognize the presence of a Comp cell early.

Although it is assumed herein that "the ES cell notifies the UE of the information about a Comp cell," the ES cell may notify the UE of the information about a Comp cell when deciding switch-off of its own cell or when being instructed to perform switch-off. By limiting the notification of the information to the case where the cell decides switch-off or the case where the ES cell is instructed to perform switch-off, for example, unnecessary signaling for notifying the information can be reduced when the cell switches itself off less frequently although it is the ES cell.

The UE connected with the ES cell performs RRC connection reestablishment with the Comp cell at the occurrence of at least any one of an RLF and a handover failure (HOF).

A method in which the UE judges whether the serving cell for its own UE is an ES cell will be disclosed. It suffices that, for example, the UE makes judgment based on whether it has been notified of the information about a Comp cell. The UE may judge that the serving cell is an ES cell when being notified of the information about a Comp cell by the serving cell or judge that the serving cell is not an ES cell when not being notified of the information about a Comp cell by the serving cell.

When the ES cell wants to cause a target UE to recognize that the own cell is an ES cell, the ES cell may notify the target UE of the information about a Comp cell.

In another method in which the UE judges whether the serving cell for its own UE is an ES cell, the ES cell may notify a target UE that its own cell is an ES cell or whether its own cell is an ES cell. This allows the UE to explicitly recognize whether the serving cell for its own UE is an ES cell. Alternatively, the UE can use the information notified by the ES cell to judge whether the serving cell is an ES cell. Although the ES cell notifies the UE of an increased amount of information in this method compared with the method disclosed above, the UE is explicitly notified that the cell is an ES cell, leading to fewer malfunctions as a system.

With the use of the method above, even when the UE that has been connected with the ES cell causes an RLF or a HOF during the transition of the ES cell from the switch-on state to the switch-off state, the UE can perform subsequent RRC connection reestablishment with the Comp cell.

When the ES cell transitions from the switch-on state to the switch-off state, the Comp cell compensates for the coverage of the ES cell. This increases a possibility that the UE that has performed RRC connection reestablishment with the Comp cell will be connected to the Comp cell. Consequently, the UE in the RRC_Connected state, which has been connected with the ES cell, is highly likely to keep that state.

Figure 11:
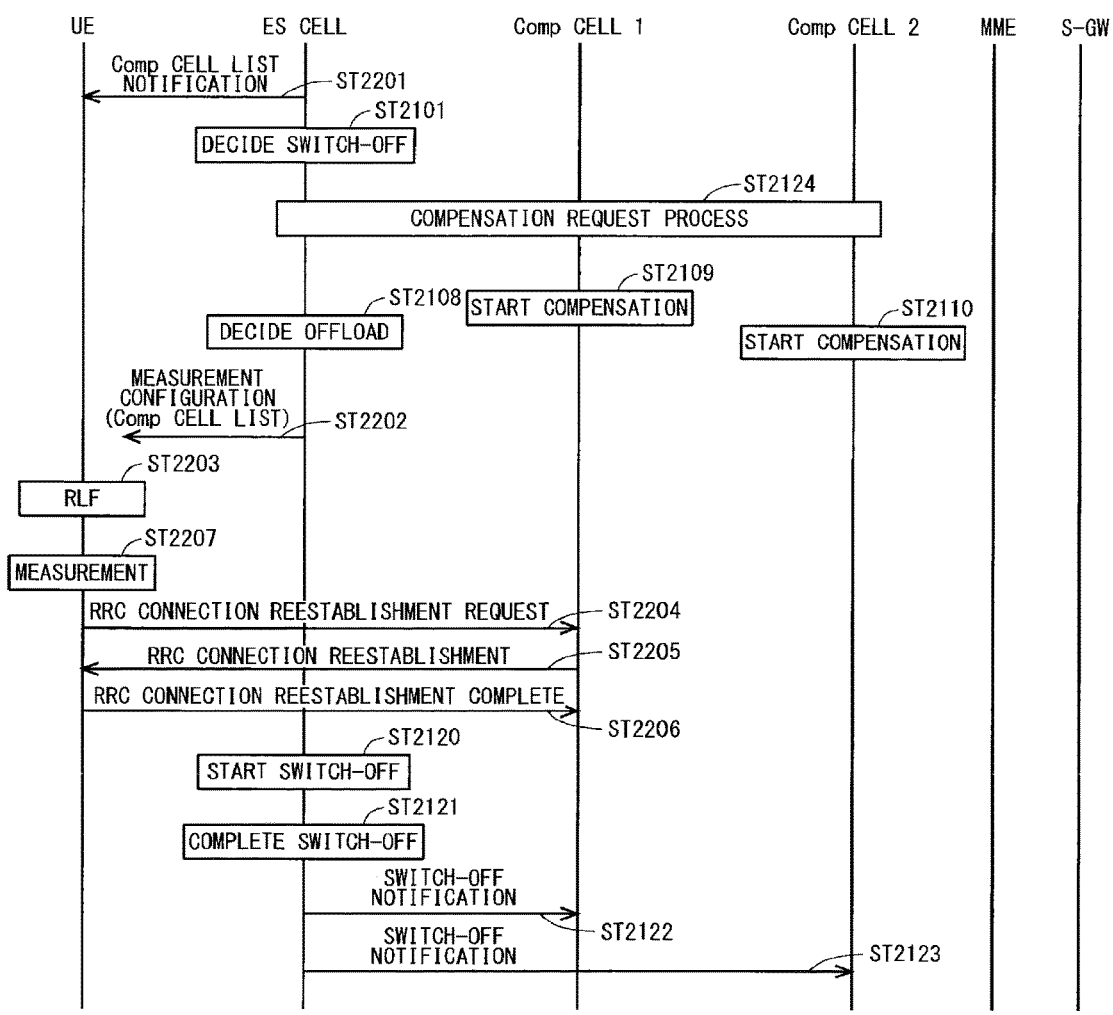
FIG. 11 shows one example of the sequence of an ES process in a communication system according to a first embodiment of the present invention.

FIG. 11 shows an example of the sequence of an ES process in a communication system according to a first embodiment of the present invention. The sequence shown in FIG. 11 is similar to the sequence shown in FIG. 10, and thus, the steps corresponding to those of FIG. 10 will be denoted by the same step numbers, and common description will be omitted.

In Step ST2201, the ES cell notifies the UE of the information about a Comp cell. Specifically, the ES cell notifies the UE of a Comp cell list as the information about a Comp cell. The Comp cell list may be broadcast as, for example, system information.

After that, in Step ST2101, the ES cell decides switch-off and, in Step ST2124, performs a compensation request process on all the Comp cells that compensate for the coverage of its own cell.

The ES cell preferably notifies the UE of the information about a Comp cell before deciding switch-off in Step ST2101 or before notifying the Comp cells of a message for causing the Comp cells to start compensation in Step ST2124. In this embodiment, accordingly, the ES cell notifies the UE of the information about a Comp cell in Step ST2201 as described above. The message for causing the Comp cell to start compensation in Step ST2124 described above is a compensation request message herein.

In Step ST2108, the ES cell decides to offload the UE connected with the ES cell in Step ST2108, and then in Step ST2202, notifies the UE of a message for a measurement configuration. Described here is the case where the UE fails to normally receive the measurement configuration message due to the interference from the Comp cell and causes an RLF.

In Step ST2203, the UE that has failed to receive the measurement configuration message in Step ST2202 causes an RLF after a lapse of a predetermined period. In Step ST2207, the UE that has caused an RLF starts a cell selection process for an RRC connection reestablishment process and performs measurement therefor. In this measurement, the UE uses the information about a Comp cell notified in Step ST2201. Specifically, the UE uses the carrier frequency and cell identifier of the Comp cell included in the Comp cell list to measure the cell.

In Step ST2204, the UE that has selected the best cell in the Comp cell list through the measurement notifies the best cell of an RRC connection reestablishment request message. Herein, the Comp cell 1 is the best cell.

The Comp cell 1 that has received the RRC connection reestablishment request message in Step ST2204 re-configures RRC connection with the UE. In Step ST2205, the Comp cell 1 notifies the UE of an RRC connection reestablishment message including an RRC connection reconfiguration parameter.

The UE that has received the RRC connection reestablishment message in Step ST2205 performs an RRC connection reestablishment process. In Step ST2206, the UE notifies the Comp cell 1 of an RRC connection reestablishment complete message. This completes the RRC connection reestablishment process, so that communication is performed between the UE and the Comp cell 1. When the RRC connection reestablishment process is successful, the UE keeps the RRC_Connected state without shifting to the RRC_Idle state.

In the measurement of Step ST2207, the UE can search for a Comp cell that compensates for the coverage of the ES cell, and thus can detect the best cell early. Also, the UE can detect the cell to be reliably connected therewith after the ES cell has switched itself off.

As a result, the time for cell search can be reduced, thereby restricting the repetitive occurrence of RRC connection reestablishment. Also, a possibility of successful RRC connection reestablishment can be increased. The UE can accordingly keep the RRC_Connected state without shifting to the RRC_Idle state. Also, a delay time can be reduced, thereby reducing the probability of occurrence of missing data and communication interruption. This reduces the degradation in user experience.

In this embodiment described above, before the Comp cell starts compensating for the coverage, the base station device configuring an ES cell notifies the UE being connected with the ES cell of the information about a Comp cell that compensates for the coverage of the ES cell when the ES cell is in the switch-off state. This allows the UE that has been connected with the ES cell to establish communication with a Comp cell using the information about a Comp cell notified in advance, even when the UE fails to communicate with the ES cell during the transition of the ES cell from the switch-on state to the switch-off state. When the ES cell transitions from the switch-on state to the switch-off state, thus, the UE in the connected state can keep that state.

The coverage of a Comp cell before compensating for the coverage of an ES cell is narrower than the coverage of the Comp cell after starting the compensation for the coverage of the ES cell. Thus, before the Comp cell compensates for the coverage of the ES cell, the UE located near the center of the coverage of the ES cell is highly likely to fail in the RRC connection reestablishment with the Comp cell. The UE desirably performs RRC connection reestablishment with the Comp cell, which has increased or is increasing to compensate for the coverage of the ES cell. When the ES cell is in the normal operation state (hereinafter, also referred to as a "normal state"), the UE preferably performs the conventional RRC connection reestablishment operation.

When the ES cell transitions to the dormant state, thus, the UE may perform RRC connection reestablishment with the Comp cell. In the cases except for the case in which the ES cell transitions to the dormant state, the UE performs RRC connection reestablishment with any cell, which is not limited to the Comp cell.

It is a problem how the UE recognizes that the Comp cell has increased or is increasing to compensate for the coverage of the ES cell. The method for solving this problem will be disclosed below.

The UE recognizes the state of a ES cell. Specifically, the state information of an ES cell is newly provided. The state information of an ES cell may be the information including whether the state is a normal state, that is, switch-on state, or whether the state is an ES transition state, that is, a transition state from the normal state to the dormant state. The ES transition state may be the state of the ES cell from deciding switch-off to starting switch-off.

The state information of an ES cell may be the information indicating whether the state is the ES transition state. This requires a small amount of information to be notified to the UE.

The state information of an ES cell is notified to the UE by the ES cell. A method in which an ES cell notifies a UE of the state information of its own cell will be disclosed. The ES cell broadcasts the state information of its own cell to the UE being served thereby. The state information of an ES cell may be included in the system information to be broadcast. The state information of an ES cell may be changed in the process of changing the system information. The state information of an ES cell may be changed upon the ES cell deciding switch-off or the ES cell receiving a switch-off instruction.

Another method in which an ES cell notifies a UE of the state information of its own cell will be disclosed. The ES cell notifies the UE of the state information of its own cell over dedicated signaling. The state information of an ES cell may be first notified to the UE in RRC connection establishment by being included in the RRC connection establishment message. The state information of an ES cell may be included in the RRC connection reconfiguration message to be notified. A new RRC signaling message may be provided to notify of the state information of an ES cell. In this case, a new RRC signaling message may be notified over dedicated signaling when the state of the ES cell is changed.

Another method for solving the problem "how the UE recognizes that the Comp cell has increased or is increasing to compensate for the coverage of the ES cell" will be disclosed below. The UE recognizes the state of the Comp cell.

In a specific example, an ES cell may notify a UE of the state information of a Comp cell. The method in which an ES cell notifies a UE of the state information of its own cell may be applied as the notification method.

In another specific example, a UE may recognize the state of a Comp cell based on the information about a Comp cell.

The information about a Comp cell is notified to the UE by the ES cell after the ES cell decides switch-off. Alternatively, the information about a Comp cell is notified to the UE by the ES cell when the ES cell notifies the Comp cell of the message for causing the Comp cell to start compensation.

Consequently, when receiving the information about a Comp cell from the ES cell, the UE can recognize that the Comp cell will increase the transmission power to compensate for the coverage of the ES cell and start increasing the coverage.

When being notified of the information about a Comp cell by the ES cell, the UE can thus perform RRC connection reestablishment with the Comp cell to reduce failures of RRC connection reestablishment.

This method eliminates the need for notifying the UE of the state information of an ES cell, thereby restricting an increase in signaling information amount, an increase in signaling load, and increasing complexity of control as a system.

First Modification of First Embodiment

This modification will disclose another method of solving the problem described in the first embodiment. When the ES cell decides switch-off or when the ES cell receives a switch-off instruction, the eNB configuring an ES cell configures a Comp cell in the message for measurement and notifies the UE connected therewith of the Comp cell. Specifically, by including the configuration of a Comp cell in the message for measurement and notifying the UE of the configuration, the eNB configuring an ES cell configures a Comp cell and notifies the UE of the Comp cell. The configuration of a Comp cell corresponds to the information about a Comp cell.

The message for measurement may be a measurement configuration message of RRC signaling. As the configuration of a Comp cell, for example, the carrier frequency and cell identifier of a Comp cell may be configured. Comp cells may be configured as a Comp cell list. When the configuration of a Comp cell is changed before/after Comp, the configuration of the Comp cell after Comp may be used. Alternatively, the configuration of the Comp cell before Comp and the configuration of the Comp cell after Comp may be used in association with each other. The message for measurement is preferably notified before a Comp cell is notified of a message for causing the Comp cell to start compensation.

As described above, the activation of RRC connection reestablishment is started with cell selection. In the cell selection at RRC connection reestablishment, cell selection based on the stored information (hereinafter, also referred to as "stored information cell selection") is used. In the stored information cell selection, cell selection is performed with respect to the configuration of a Comp cell, such as a carrier frequency and a cell identifier, received in the message for measurement or with respect to previously detected cells (see Non-Patent Document 2).

The UE performs the configuration of a Comp cell, such as a carrier frequency and a cell identifier, received in the message for measurement or stores the information on the previously detected cells, at the occurrence of an RLF. The UE uses the configuration of a Comp cell, such as the stored carrier frequency and cell identifier, or the information on the previously detected cells to perform stored information cell selection for RRC connection reestablishment.

As described above, in this modification, when the ES cell decides switch-off or the ES cell receives a switch-off instruction, the eNB configuring the ES cell configures a Comp cell in the message for measurement to notify the UE connected with the ES cell of the Comp cell. After that, when the UE causes an RLF between the ES cell and itself, accordingly, the UE performs, through the stored information cell selection, an RRC connection reestablishment process on the Comp cell or on the cell detected through the measurement among the Comp cells.

Even if an RLF or a HOF occurs in the UE that has been connected with the ES cell when the ES cell transitions from the switch-on state to the switch-off state, therefore, subsequent RRC connection reestablishment can be performed with a Comp cell.

When the ES cell transitions from the switch-on state to the switch-off state, the Comp cell compensates for the coverage of the ES cell, and thus, the UE that has performed RRC connection reestablishment with the Comp cell is highly likely to be connected with the Comp cell. This increases a possibility that the UE in the RRC_Connected state, which has been connected with the ES cell, can keep that state.

Figure 12:
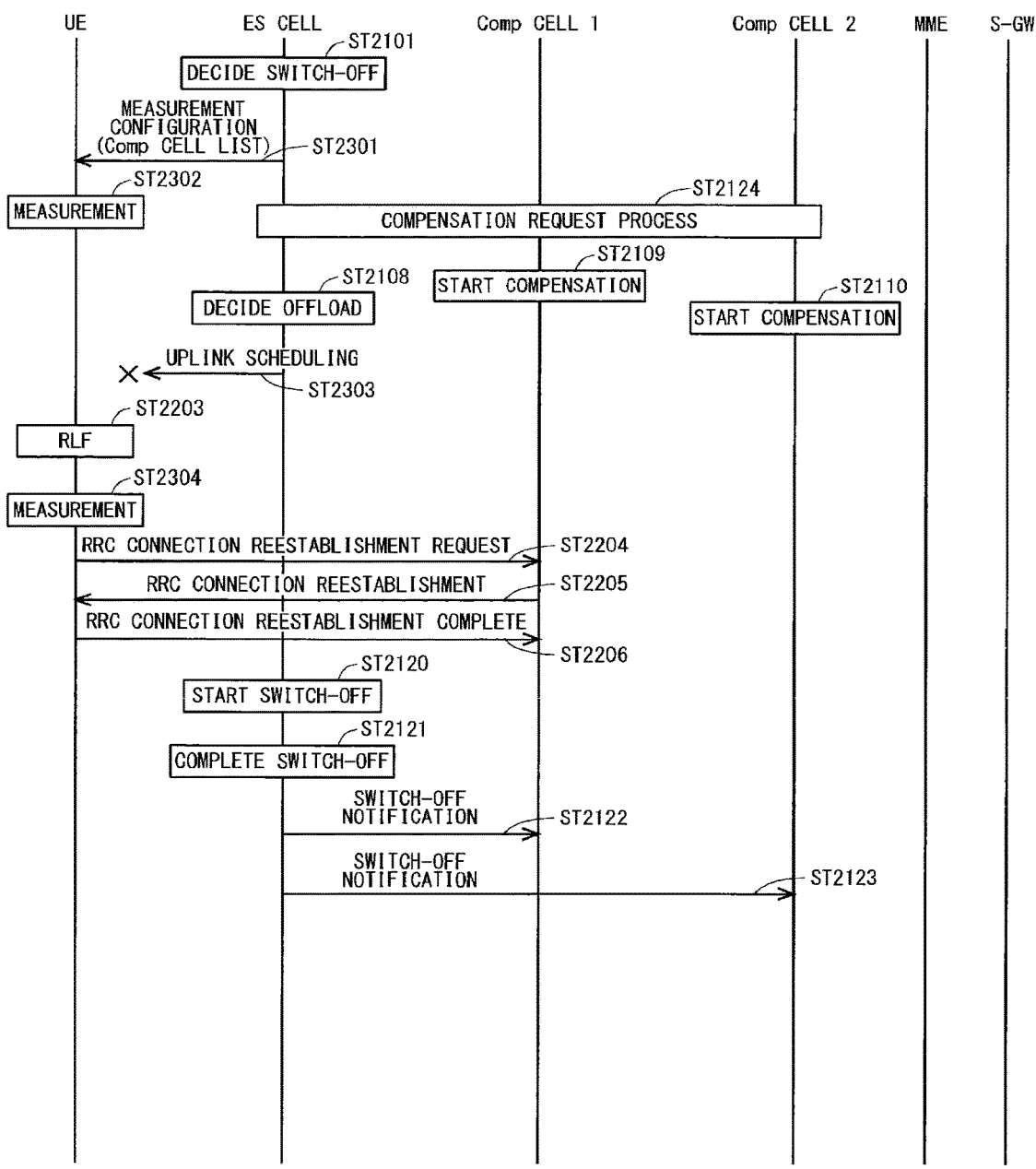
FIG. 12 shows one example of the sequence of an ES process in a communication system according to a first modification of the first embodiment of the present invention.

FIG. 12 shows an example of the sequence of an ES process in a communication system according to a first modification of the first embodiment of the present invention. The sequence shown in FIG. 12 is similar to the sequences shown in FIGS. 10 and 11, and thus, the steps corresponding to those of FIGS. 10 and 11 will be denoted by the same step numbers, and common description will be omitted.

After deciding switch-off in Step ST2101, in Step ST2301, the ES cell notifies the UE of a message for measurement. In the example shown in FIG. 12, the message for measurement is a measurement configuration message. The ES cell configures a Comp cell as a measurement target cell in the measurement configuration message. In the example shown in FIG. 12, the ES cell configures a Comp cell list including one or a plurality of Comp cells in the measurement configuration message. The Comp cell list includes a Comp cell that compensates for the coverage when the ES cell performs ES.

The ES cell includes the configuration information of a Comp cell in the measurement configuration message, thereby configuring a Comp cell in the measurement configuration message. When Comp cells are configured as a Comp cell list in the measurement configuration message, the ES cell includes the configuration information of each Comp cell included in the Comp cells in the measurement configuration message, thereby configuring a Comp cell list in the measurement configuration message. The configuration information of a Comp cell may be the carrier frequency and cell identifier of a Comp cell.

In Step ST2302, the UE, which has received the message for measurement, specifically, the measurement configuration message in which a Comp cell list is configured in the Step ST2301, measures the Comp cells included in the Comp cell list. In many cases, an event due to measurement occurs after the Comp cell starts increasing its transmission power to compensate for the coverage. In the example shown in FIG. 12, this is after the execution of the processes of Steps ST2109 and ST2110. In this case, the Comp cell simultaneously causes interference with the ES cell.

Even if a measurement event occurs, the UE accordingly cannot receive uplink scheduling for measurement report in Step ST2303, and thus may fail to notify the ES cell of the measurement report. In this case, the ES cell cannot activate HO for offloading the UE to a Comp cell.

Moreover, in Step ST2203, the UE may cause an RLF between the ES cell and itself due to the interference from the Comp cell. In this case, the UE stores the information of a measurement target cell in the message for measurement received in Step ST2301, herein, the Comp cell list. Alternatively, the UE stores the information about a Comp cell detected in the measurement performed in Step ST2302.

In Step ST2304, the UE performs, on the cell that has stored information, stored information cell selection for RRC connection reestablishment. In the measurement for cell selection in Step ST2304, thus, the UE selects the best cell from the Comp cells.

In Steps ST2204 to ST2206, the UE performs the RRC connection reestablishment process on the Comp cell being the best cell, which is the Comp cell 1 in the example shown in FIG. 12. Specifically, in Step ST2204, the UE notifies the Comp cell 1 of an RRC connection reestablishment request message. In Step ST2205, the Comp cell 1 notifies the UE of an RRC connection reestablishment message.

When being notified of the RRC connection reestablishment message by the Comp cell 1 in Step ST2205, the UE executes the RRC connection reestablishment process and, in Step ST2206, notifies the Comp cell 1 of an RRC connection reestablishment complete message.

When the RRC connection reestablishment process for the Comp cell 1 is successful, accordingly, the UE keeps the RRC_Connected state without transitioning to the RRC_Idle state.

The use of the method disclosed in this modification allows the UE to search for a Comp cell that compensates for the coverage of the ES cell in the measurement of Step ST2304. As a result, the UE can detect the best cell early. Also, the UE can detect a cell to be reliably connected therewith after the ES cell switches itself off. Thus, the effects similar to those of the first embodiment can be achieved.

The ES cell needs to separately notify the UE of a Comp cell list in the first embodiment, which is not required in this modification. It is merely required in this modification that a message for measurement be notified early. This simplifies the control in a communication system.

Moreover, this modification does not need to newly provide the state information of an ES cell disclosed in the first embodiment and notify the UE of this information. The control in the communication system can thus be performed more easily.

FIG. 13 shows another example of the sequence of the ES process in the communication system according to the first modification of the first embodiment of the present invention. The sequence shown in FIG. 13 is similar to the sequences shown in FIGS. 10 to 12, and thus, the steps corresponding to those of FIGS. 10 to 12 will be denoted by the same step numbers, and common description will be omitted.

With reference to FIG. 13, after deciding to offload the UE connected with its own cell in Step ST2108, in Steps ST2401 and ST2402, the ES cell notifies the Comp cells of a compensation start request message as a message for causing the Comp cell to start compensation.

In Steps ST2109 and ST2110, the Comp cells that have received the compensation start request message starts compensating for the coverage. Specifically, the Comp cell starts increasing its transmission power to compensate for the coverage.

As described above, when deciding offload, the ES cell may notify the Comp cell of a compensation start request message. This prevents the offload of the UE from starting while all the Comp cells do not permit compensation. This also prevents the ES cell from starting switch-off.

When not permitting compensation, the Comp cell may notify the ES cell of a non-permission message as the compensation response message. In the compensation request process of Step ST2124, specifically, in Step ST2106 or ST2107 shown in FIG. 10, the Comp cell may notify the ES cell of a compensation response message, specifically, a non-permission message.

In the example shown in FIG. 13, before notifying the Comp cells of a compensation start request in Steps ST2401 and ST2402, in Step ST2301, the ES cell notifies the UE being an offload target of a message for measurement. The process of notifying a message for measurement in Step ST2301 may be executed between the process of deciding offload by the ES cell in Step ST2108 and the processes of notifying the Comp cells of a compensation start request message in Steps ST2401 and ST2402.

Consequently, the UE can perform stored information cell selection in the measurement of Step ST2304 even if the downlink quality of the ES cell reduces due to the interference from the Comp cell and the UE fails to receive a downlink signal such as uplink scheduling in Step ST2303 and causes an RLF in Step ST2203. The UE can also search for a Comp cell that compensates for the coverage of the ES cell.

The method disclosed herein may be applied also in the case of HOF. Applying the method disclosed herein enables stored information cell selection also in the case of HOF. Also, a Comp cell that compensates for the coverage of the ES cell can be searched for.

As a result, the UE can detect the best cell early. Also, the UE can detect a cell to be reliably connected therewith after the ES cell switches itself off. The effects similar to those of the case in which the sequence shown in FIG. 12 is executed can thus be achieved.

Second Modification of First Embodiment

RRC connection reestablishment is successful only when the cell that performs RRC connection reestablishment is prepared. Herein, being "prepared" refers to having an effective UE context.

In conventional HO, the UE context of a target UE is included in the HO request message from the eNB being a HO source to the eNB being a HO destination to be notified. In the case where, for example, a UE to be offloaded causes an RLF before the ES cell notifies the Comp cell of the HO request message of the UE, thus, the Comp cell is not notified of the UE context. In this case, even if the UE requests RRC connection reestablishment from the Comp cell, the RRC connection reestablishment will not be successful, and the RRC_Connected state cannot be kept.

This modification will disclose the method of solving this problem. An eNB configuring an ES cell notifies a Comp cell of the UE context of a UE connected with the ES cell. Even if a UE to be offloaded causes an RLF before the ES cell notifies the Comp cell of the HO request message of the UE, thus, the Comp cell has obtained the UE context of the UE. When the UE requests RRC connection reestablishment from the Comp cell, thus, RRC connection reestablishment will be successful. The RRC_Connected state can thus be kept.

A specific example of the timing of notifying a UE context will be disclosed below. When an ES cell decides switch-off or when the ES cell receives a switch-off instruction, an eNB configuring the ES cell notifies a Comp cell of the UE context of a UE connected with the ES cell.

The ES cell may notify the Comp cell of the UE context of the UE connected with the ES cell before completely switching off its own cell.

The ES cell may notify the Comp cell of the UE context of the UE connected with the ES cell before notifying of the message for causing the Comp cell to start compensation.

In a specific example of the method of notifying of a UE context, the UE context may be notified by being included in a compensation request message notified to the Comp cell by the ES cell or may be notified together with the compensation request message. The ES cell notifies the Comp cell of the UE context of the UE connected with its own cell.

In another specific example of the method of notifying of a UE context, the UE context may be notified by being included in a compensation start request message notified to the Comp cell by the ES cell or may be notified together with the compensation start request message. The ES cell notifies the Comp cell of the UE context of a UE connected with its own cell.

The UE context to be notified may be the same as the UE context notified in the conventional HO request messages, such as RRC context and AS-configuration. Alternatively, the UE context to be notified may be the information for RLF recovery of the UE context of the conventional HO request message.

FIG. 14 shows an example of the sequence of an ES process in a communication system according to a second modification of the first embodiment of the present invention. The sequence shown in FIG. 14 is similar to the sequences shown in FIGS. 10 and 11, and thus, the steps corresponding to those of FIGS. 10 and 11 will be denoted by the same step numbers, and common description will be omitted.

In Steps ST2501 and ST2502, the ES cell that has decided switch-off in Step ST2101 notifies Comp cells, specifically, the Comp cells 1 and 2 of the UE context of the UE connected with its own cell. The UE context may be notified by being included in the compensation request message notified to the Comp cell by the ES cell or may be notified together with the compensation request message. In this embodiment, the ES cell notifies the Comp cells of the Comp cell compensation request message and the UE context together.

By notifying the Comp cell of the UE context of the UE in Steps ST2501 and ST2502, before starting increasing its transmission power for compensating for the coverage of the ES cell, the Comp cell can obtain the UE context of a UE that may be downloaded. Consequently, even if the Comp cell fails to receive a HO request from the ES cell, the Comp cell can obtain the UE context of the UE that has been connected with the ES cell.

When the UE causes an RLF between the ES cell and itself and performs RRC connection reestablishment with the Comp cell, accordingly, the RRC connection reestablishment can be successful. Also, when the UE causes a HOF and performs RRC connection reestablishment with the Comp cell, RRC connection reestablishment can be successful.

Even if the UE causes an RLF or a HOF, accordingly, the UE can perform RRC connection reestablishment with the Comp cell to keep the RRC_Connected state without transitioning to the RRC_Idle state.

In the example shown in FIG. 14, the ES cell notifies all the Comp cells that compensate for the coverage of its own cell of the UE context. Meanwhile, the Comp cell with which the UE performs RRC connection reestablishment when the UE causes an RLF or the Comp cell to which the UE performs HO is one of these cells. The UE context of the UE that has performed RRC connection reestablishment with another Comp cell or has been handed over is stored in the Comp cell without being used.

The UE context is stored unnecessarily every time the ES operation of the ES cell is performed, leading to an increase in the storage capacity for storing the UE context in the Comp cell. This causes a problem that storing of a new UE context will be hindered. As another problem, an enormous amount of storage capacity is required. A method for solving these problems will be disclosed below.

When the Comp cell is not connected with the UE within a predetermined period after receiving the UE context from the ES cell, the Comp cell discards the UE context of the UE. The Comp cell may delete the UE context of the UE from a storage.

The predetermined period may be configured as a timer. The Comp cell starts the timer upon receipt of the UE context of the UE and does not discard the UE context of the UE when the Comp cell is connected with the UE within the period of the timer or discards the UE context of the UE when the Comp cell is not connected with the UE within the period of the timer and the timer expires.

Unnecessary UE context can be accordingly discarded, avoiding a situation in which storing of a new UE context will be hindered. Also, a situation in which an enormous amount of storage capacity is needed can be avoided.

Another method for solving the problem that storing a new UE context is hindered and the problem that an enormous amount of storage capacity is needed will be disclosed below. The information about a connected UE is notified between Comp cells. As a method of notifying of the information about a connected UE between Comp cells, the Comp cell may notify another Comp cell or a neighbor cell of a discard request message for requesting a discard of the UE context of a predetermined UE. The cell takes a UE connected with its own cell as a predetermined UE.

The discard request message may include the information about a predetermined UE. The information about a UE may be a part or the whole of the information of the UE context notified to the Comp cell by the ES cell. Alternatively, the information about a UE may be the information for identifying a UE of the UE context information. This allows the Comp cell to recognize a UE connected with another Comp cell or a neighbor cell.

The Comp cell that has received the information about a predetermined UE or the discard request message discards the UE context of the UE connected with another Comp cell or a neighbor cell.

Consequently, the Comp cell can discard an unnecessary UE context, thereby avoiding a situation in which storing a new UE context is hindered. Also, a situation in which an enormous amount of storage capacity is needed can be avoided.

The information about a UE connected with the Comp cell may be notified to the Comp cell or a neighbor cell by the Comp cell or may be notified via the ES cell. Alternatively, the information may be notified via the O&M.

Still another method for solving the problem that storing a new UE context is hindered and the problem that an enormous amount of storage capacity is needed will be disclosed below. The completion of Comp on, that is, the completion of an increase in the coverage for compensation is notified between Comp cells. The Comp cell may notify another Comp cell of the completion of Comp on.

The Comp cell, which has received the completion of Comp on from all the Comp cells within the predetermined Comp cell list of the ES cell, discards the UE contexts of the UEs except for the UE connected with its own cell. After a lapse of a predetermined period from receiving the completion of Comp on from all the Comp cells within the predetermined Comp cell list of the ES cell, the Comp cell may discard the UE contexts of the UEs except for the UE connected with its own cell.

Consequently, an unnecessary UE context can be discarded, thereby avoiding a situation in which storing a new UE context is hindered. Also, a situation in which an enormous amount of storage capacity is needed can be avoided.

The completion of Comp on is not notified to the Comp cell by the Comp cell but may be notified via the ES cell. Alternatively, the completion may be notified via the O&M.

This modification eliminates the need for the Comp cell to recognize the predetermined Comp cell list of the ES cell.

Third Modification of First Embodiment

The first embodiment and the first and second modifications of the first embodiment have disclosed the methods of improving the success rate of RRC connection reestablishment to keep the RRC_Connected state. The RRC connection reestablishment, however, is the process performed when the UE causes an RLF or a HOF. This modification will therefore disclose the method for hardly causing an RLF or a HOF.

The eNB configuring an ES cell starts, for the Comp cell, the process of preparing HO of the UE connected with the ES cell when the ES cell decides switch-off or when the ES cell has received a switch-off instruction.

The ES cell may start, for the Comp cell, the process of preparing HO of the UE connected with the ES cell before completely switching off its own cell.

The ES cell may start, for the Comp cell, the process of preparing HO of the UE connected with the ES cell together with a message for causing the Comp cell to start compensation or before notifying a message for causing the Comp cell to start compensation.

In an example of the method of starting the HO preparation process, a HO request process may be performed together with the compensation request process from the ES cell to the Comp cell. Alternatively, a HO request response may be performed together with a compensation request response from the Comp cell to the ES cell.

The HO request process may be performed together with a compensation start request process from the ES cell to the Comp cell. Alternatively, a HO request response may be performed together with a compensation start request response from the Comp cell to the ES cell.

A cell being a HO destination should be desirably one. The ES cell may thus cause the UE to execute measurement before starting the HO preparation process. The ES cell causes the UE connected therewith to measure the Comp cell. As in the method disclosed in the first modification of the first embodiment, the ES cell configures and notifies of a Comp cell in the message for measurement. The message for measurement may be a measurement configuration message of RRC signaling. As the configuration of a Comp cell, the carrier frequency and cell identifier of a Comp cell may be configured. Comp cells may be configured as a Comp cell list.

At the time when a message for measurement is notified, the Comp cell is yet to start increasing its transmission power to compensate for the coverage of the ES cell. The Comp cell thus has the coverage before compensation, resulting in lower received power of the Comp cell in the UE that has measured the Comp cell.

In consideration of the above, the threshold of the received power or reception quality of a neighbor cell for the occurrence of an event may be made small. For example, the threshold may be set to a settable minimum value. Alternatively, the received power or reception quality serving as the reception sensitivity of the UE which is defined in the specifications may be set as a threshold. Still alternatively, an offset may be provided to the received power or reception quality serving as the reception sensitivity of the UE which is defined in the specifications, and a resultant value may be set as a threshold.

This allows the UE to cause an event based on the reception power from the Comp cell before compensation, thereby causing the ES cell to notify of a measurement report. The ES cell can accordingly decide a cell being a HO destination for the UE that is caused to perform HO, even at a stage before the compensation by the Comp cell.

A measurement report, which includes a value of the received power or reception quality of a Comp cell, may be notified. In the presence of a plurality of Comp cells in which an event has occurred, thus, one cell being a HO destination can be decided for the UE that is caused to perform HO, using the value of the received power or the reception quality of each Comp cell. Thus, one HO destination cell can be provided for the UE that is caused to perform HO. The ES cell can start the HO preparation process for one cell being a HO destination.

This modification has mainly disclosed that the threshold of the received power or reception quality of a neighbor cell for the occurrence of an event may be set to a settable minimum value. In another method, a threshold may be set to a predetermined value such that when the value of the received power or reception quality is greater than or equal to the threshold, the UE judges that it has successfully detected a cell and measured the received power or reception quality and then performs measurement report as the occurrence of an event. Similar effects, which are achieved in the case where the threshold of the received power or reception quality of a neighbor cell for the occurrence of an event is set to a settable minimum value, can be achieved also in this case.

Figure 15:
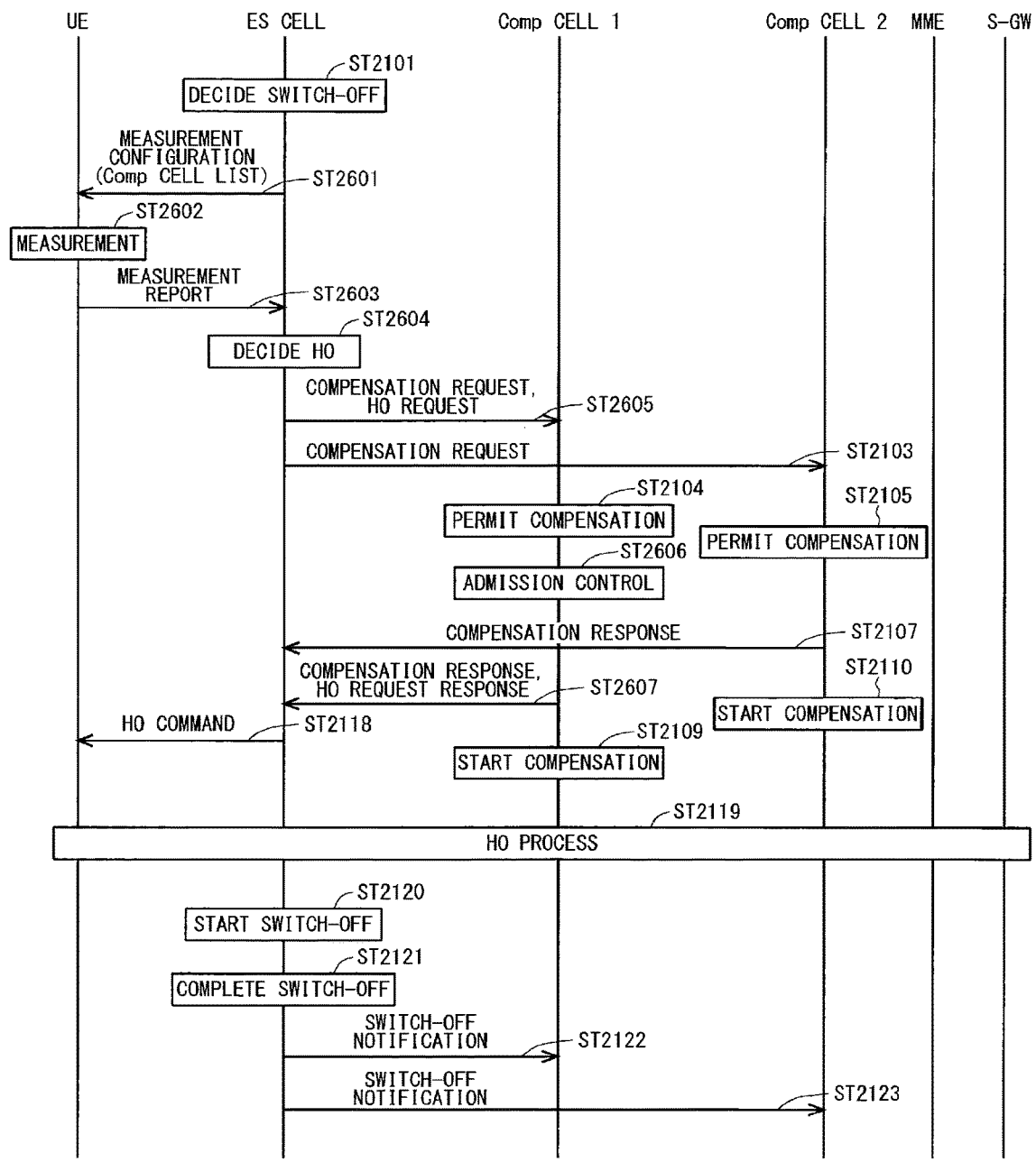
FIG. 15 shows an example of the sequence of an ES process in a communication system according to a third modification of the first embodiment of the present invention.

FIG. 15 shows an example of the sequence of an ES process in a communication system according to a third modification of the first embodiment of the present invention. The sequence shown in FIG. 15 is similar to the sequence shown in FIG. 10, and thus, the steps corresponding to those of FIG. 10 will be denoted by the same step numbers, and common description will be omitted.

After deciding switch-off in Step ST2101, in Step ST2601, the ES cell notifies the UE connected therewith of a message for measurement. In the example shown in FIG. 15, the measurement configuration message of RRC signaling is used as the message for measurement. A Comp cell list is configured as the configuration of a Comp cell, and the carrier frequency and cell identifier of a Comp cell are configured. The threshold of the received power or reception quality of a neighbor cell for the occurrence of an event is set to a settable minimum value.

In Step ST2602, the UE that has received the message for measurement measures the Comp cell. The threshold for the occurrence of a measurement event is set to a minimum value, and accordingly, an event is likely to occur even before the Comp cell starts compensation.

At the occurrence of an event, in Step ST2603, the UE notifies the ES cell of a measurement report message.

In Step ST2604, the ES cell that has received the measurement report message uses the information of a Comp cell in the measurement report message to decide HO of the UE that has performed measurement report, thereby deciding the cell being a HO destination. In the example shown in FIG. 15, the cell being a HO destination is the Comp cell 1. The Comp cell being a HO destination may differ for each UE connected with the ES cell.

The ES cell, which has decided HO of the target UE and decided the Comp cell being a HO destination in Step ST2604, starts the HO preparation process for the UE.

In the HO preparation process, in Step ST2605, first, the ES cell notifies the Comp cell 1 of a HO request message together with a compensation request message. These may be notified as the same message. For example, the compensation request message, which includes the information included in the HO request message, may be notified. In contrast, the HO request message, which includes the information included in the compensation request message, may be notified.

The Comp cell 2 is not a HO destination, and thus, in Step ST2103, the ES cell notifies the Comp cell 2 of only a compensation request message.

In Step ST2104, the Comp cell 1 that has received the compensation request message and the HO request message permits the compensation of the coverage of the ES cell. Further, in Step ST2606, the Comp cell 1 performs admission control for HO to allow the acceptance of HO of the UE.

In Step ST2607, the Comp cell 1 notifies the ES cell of a HO request response (Ack) message together with a compensation request response (permission) message. These may be notified as the same message. For example, the compensation request response message, which includes the information included in the HO request response message, may be notified. In contrast, the HO request response message, which includes the information included in the compensation request response message, may be notified.

In Step ST2118, the ES cell, which has received the compensation request response (permission) message and the HO request response (Ack) message for the UE in Step ST2607, uses the information received in the HO request response message to notify the UE of a HO command message.

In Step ST2119, the UE that has received the HO command message performs the HO process with the ES cell, the Comp cell 1, the MME, and the S-GW.

In Step ST2107, the Comp cell 2, which has permitted the compensation of the coverage of the ES cell in Step ST2105, notifies the ES cell of a compensation request response (permission) message.

In Steps ST2109 and ST2110, the Comp cell 1 and the Comp cell 2, which have notified the compensation request response (permission) message respectively in Steps ST2607 and ST2107, start compensation. Specifically, the Comp cell 1 and the Comp cell 2 increase the transmission power to compensate for the coverage.

In this manner, by notifying the Comp cell of a message for causing the Comp cell to start compensation and also starting, on the Comp cell, the HO preparation process for the UE connected with the ES cell, the ES cell can start HO of the UE early. This minimizes effects of the interference caused by the Comp cell starting the compensation of the coverage to increase the transmission power. This allows the UE to easily receive a HO command message, and thus, can normally perform a HO process. This reduces at least any one of an RLF and a HOF.

Figure 16:
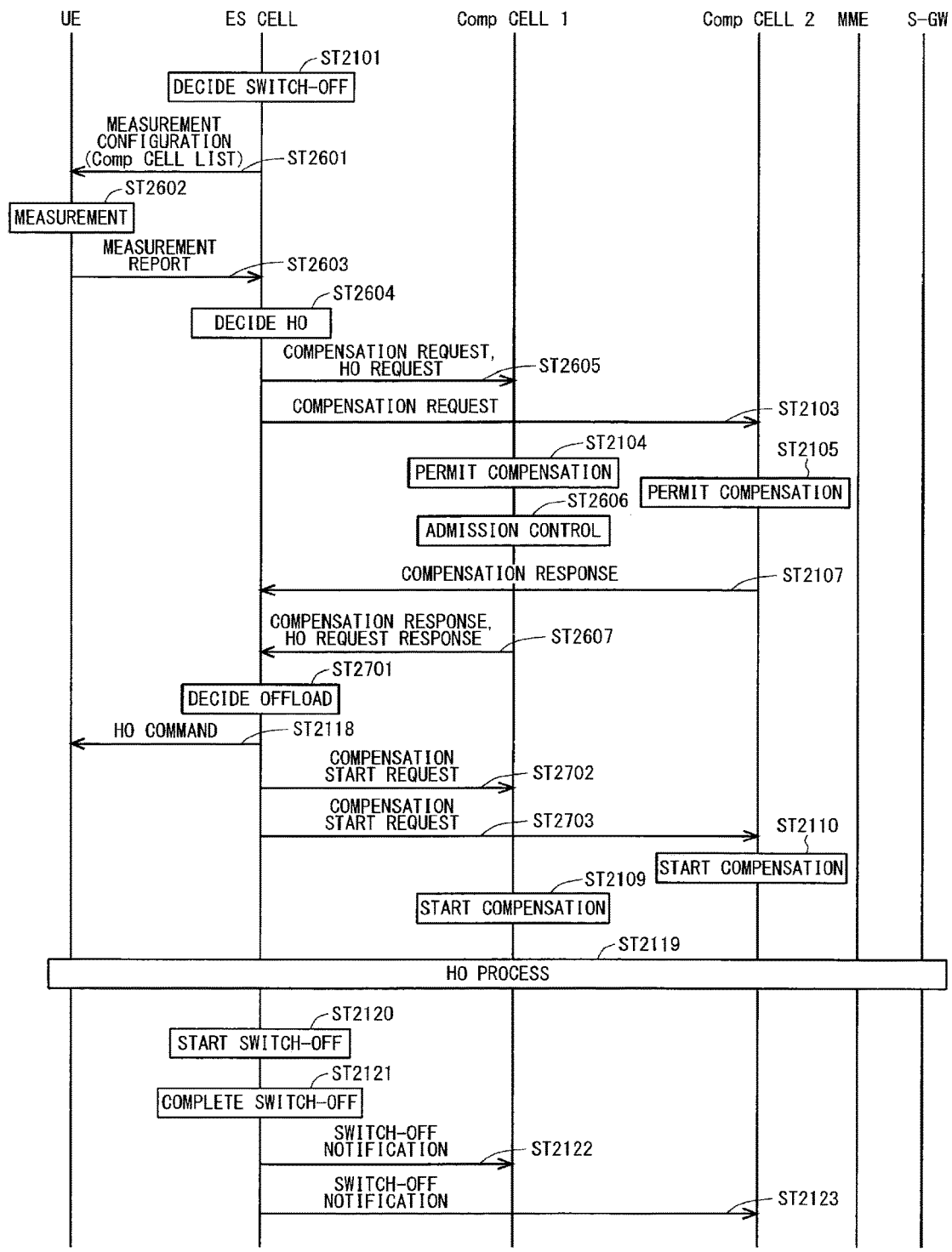
FIG. 16 shows another example of the sequence of the ES process in the communication system according to the third modification of the first embodiment of the present invention.

FIG. 16 shows another example of the sequence of the ES process in the communication system according to the third modification of the first embodiment of the present invention. The sequence shown in FIG. 16 is similar to the sequences shown in FIGS. 10 and 15, and thus, the steps corresponding to those of FIGS. 10 and 15 will be denoted by the same step numbers, and common description will be omitted.

When receiving a compensation response (permission) message from all the Comp cells that compensate for the coverage of its own cell in Steps ST2607 and ST2107, in Step ST2701, the ES cell decides to offload the UE connected therewith.

In Step ST2118, the ES cell that has decided offload in Step ST2701 notifies the UE connected therewith of a HO command message. In Steps ST2702 and ST2703, the ES cell notifies all the Comp cells of a compensation start request message. In Steps ST2109 and ST2110, the Comp cells that have received the compensation start request message start compensation. Specifically, the Comp cells start increasing its transmission power to compensate for the coverage.

As a result, the ES cell can start the process of preparing HO of the UE connected with the ES cell on the Comp cell, prior to the message for causing the Comp cell to start compensation. Also, the UE can be notified of a HO command message early.

This can minimize the effect due to the interference caused by the Comp cell starting the compensation of the coverage to increase the transmission power. This allows the UE to receive a HO command message more easily, so that the HO process can be performed normally. At least any one of an RLF and a HOF can be reduced.

With the use of the method disclosed in this modification, the HO preparation process can be performed early, so that an RLF or a HOF hardly occurs. This improves the HO success rate for offloading the UE connected with the ES cell, enabling the UE to keep the RRC_Connected state.

A delay time for RRC connection reestablishment can be accordingly reduced, and also, the generation of missing data and communication interruption can be reduced. This reduces the degradation in user experience.

If the UE causes an RLF or a HOF for any reason, the ES cell has early notified of the message for measurement in which a Comp cell is configured, thereby increasing a possibility that the UE will successfully perform RRC connection reestablishment with the Comp cell. Also in that case, the degradation in user experience can be reduced.

The first embodiment and the first to third modifications of the first embodiment have described the cases in which an ES cell is switched off and the coverage of a Comp cell is increased (compensation is executed). The methods disclosed in the first embodiment and the first to third modifications of the first embodiment are also applicable in the case in which an ES cell is switched on and the coverage of a Comp cell is reduced (compensation is ended). In this case, it suffices that the methods are applied by causing the ES cell that will switch itself off to correspond to the Comp cell that will end the compensation of the coverage and causing the Comp cell that compensates for the coverage to correspond to the ES cell that will switch itself on.

As a result, even when the UE that has been connected with the Comp cell causes an RLF or a HOF during the transition of the Comp cell from the coverage compensation state to the coverage compensation ended state, the UE can perform subsequent RRC connection reestablishment with the ES cell. Also, effects similar to those of the first embodiment and the first to third modifications of the first embodiment can be achieved: a delay time for RRC connection reestablishment can be reduced, the occurrence rate of missing data and communication interruption can be reduced, and a possibility of successful RRC connection reestablishment can be increased.

Second Embodiment

The problem solved in a second embodiment will be described below. Even when an energy saving cell (ES cell) decides switch-off, a UE capable of receiving downlink signals may be present as long as the ES cell transmits downlink signals. The downlink signals are, for example, downlink reference signals or downlink synchronization signals. The UE that has received a downlink signal may re-select the ES cell through a normal cell re-selection process. Or, the UE that has received a downlink signal may notify the serving cell of the measurement report message of the ES cell through the normal measurement process.

When the UE re-selects the ES cell that has decided switch-off, the following problem arises. When the ES cell switches itself off, the UE needs to perform cell re-selection again, leading to a problem that the processing load of the UE increases. Also, a control delay occurs as another problem. When a cell re-selection of the ES cell and a subsequent cell re-selection are accompanied with TAU, unnecessary TAU occurs, leading to a problem of the generation of an unnecessary radio resource.

When the UE notifies the serving cell of the measurement report message of the ES cell that has decided switch-off, the following problem arises. The serving cell may select the ES cell as a target cell for handover. In that case, the ES cell needs to reject a handover request or hand over the UE, which has handed over to itself once, to a cell except for its own cell, for example, a Comp cell again in the handover process. As described above, there are problems of the generation of unnecessary signaling between cells and the generation of a control delay.

When the ES cell causes the UE that has once handed over to itself to hand over again to a cell except for its own cell, for example, a Comp cell, the handover process that is performed when the ES cell switches itself off is performed. This increases a possibility of a handover failure (HOF), leading to a problem that a user cannot stably obtain communication services.

The solution in the second embodiment will be described below. When the ES cell decides switch-off, the UE in the idle state (hereinafter, also referred to as an "idle mode UE") is prevented from camping on the ES cell. Also, handover to the ES cell as a target cell by the UE in the connected state (hereinafter, also referred to as a "connected mode UE") is rejected.

This operation may be performed when the ES cell decides energy saving or decides to gradually decrease the transmission power of downlink signals. Specific examples of the downlink signals include a downlink reference signal, downlink synchronization signal, PBCH, PCFICH, and PDCCH.

A specific example of the method of preventing an idle mode UE from camping on the ES cell will be disclosed below. The ES cell that has decided switch-off notifies the UE in its coverage that camp-on to its own cell is not allowed.

A specific example of the method of notifying that camp-on is not allowed will be disclosed below. The "cellBarred" parameter in the broadcast information is changed to "barred" (see Non-Patent Document 10).

A cell on which the UE camps to obtain normal service has such a requirement that the UE shall exclude a barred cell (see Non-Patent Document 2). In the solution of this embodiment, thus, the ES cell that has decided switch-off changes the "cellBarred" parameter to "barred," thereby preventing camping on to obtain normal service by the UE. The use of the existing parameter prevents the communication system from becoming complicated. Also, a communication system having excellent backward compatibility can be constructed.

A specific example of the method of rejecting handover to the ES cell as a target by the connected mode UE will be disclosed below. The ES cell that has decided switch-off notifies a neighbor cell that its own cell cannot be selected as a target cell for handover.

The following three, (1) to (3), will be disclosed as specific examples of the method of notifying that the ES cell cannot be selected as a target cell for handover.

(1) The ES cell notifies a neighbor cell that the ES cell has decided switch-off. The neighbor cell that has received this notification does not select the ES cell as a target cell when making a handover decision. The details of the notification that the ES cell notifies the neighbor cell may be the following: a switch-off process is ongoing (switch off ongoing), the transmission power of downlink signals is to be gradually decreased, or the transmission power of downlink signals is gradually being decreased.

The X2 interface or S1 interface may be used in notification. Conventionally, the eNB configuration update message of the X2 interface includes "Deactivation Indication" parameter (see 3GPP TS36.423). The "Deactivation Indication" parameter is an indicator indicating that the cell is switched off. The conventional parameter "Deactivation Indication" therefore cannot be used in the notification from when a cell decides to switch itself off to when the cell switches itself off. In the first place, the switched-off cell transmits no downlink signals. Thus, the conventional parameter "Deactivation Indication" is not provided in consideration of the problem to be solved in the second embodiment.

(2) The ES cell notifies a neighbor cell that the ES cell has decided switch-off. The neighbor cell that has received this notification notifies the UE within its coverage that the ES cell is out of range of the measurement target, out of range of the event evaluation, or out of range of the measurement report.

A specific example of the method of notifying that the ES cell is out of range of the measurement target will be disclosed below. The neighbor cell adds the ES cell to a black list and notifies the UE being served thereby of the black list as an RRC message or broadcast information.

The black list is a list of cells that are not taken into account in event evaluation and measurement report. In the solution of this embodiment, thus, by adding the ES cell that has decided switch-off to the black list of neighbor cells, the ES cell can be eliminated from the measurement targets for the UE being served by the neighbor cell.

This prevents the neighbor cell from selecting the ES cell as a target cell for handover. The use of the existing parameter can prevent the communication system from becoming complicated. Also, a communication system having excellent backward compatibility can be constructed.

Compared with the method (1) in which the ES cell is not selected as a target cell, the method (2) can reduce the measurements targeted for the ES cell by the UE and reduce the measurement reports targeted for the ES cell from the UE to the neighbor cell. Consequently, the processing load of the UE can be reduced, and radio resources can be used effectively.

(3) Combination of (1) and (2) above.

FIG. 17 shows an example of the sequence of an ES process in a communication system according to the second embodiment of the present invention.

In Step ST3101, the ES cell 1 decides switch-off. In Step ST3102, the ES cell 1 changes a "cellBarred" parameter in the broadcast information to "barred."

The case in which the UE1 that takes the ES cell 1 as a serving cell and the UE2 that takes a neighbor cell for the ES cell as a serving cell are present will be described. In Steps ST3103 and ST3104, the ES cell 1 notifies the UE1 and the UE2 being served thereby that the system information has been changed, that is, performs SI change notification.

The UE1 that has received the SI change notification in Step ST3103 recognizes that the "cellBarred" parameter in the broadcast information, that is, in the system information has been changed to "barred." The UE1 recognizes that the ES cell 1 is no longer the cell on which the UE1 camps to obtain normal service. In Step ST3105, accordingly, the UE1 performs a cell re-selection process to re-camp on a cell except for the ES cell 1.

The UE2 that has received the SI change notification in Step ST3104 recognizes that the "cellBarred" parameter in the broadcast information, that is, in the system information has been changed to "barred." The UE2 recognizes that the ES cell 1 is no longer a cell on which the UE2 camps to obtain normal service. In Step ST3106, accordingly, the UE2 performs a cell re-selection process on a cell except for the ES cell 1.

In Step ST3107, the ES cell 1 notifies the neighbor cell that it has decided switch-off. Description will be given of the case in which a neighbor cell is a Compensation cell 1 (Comp cell 1) as a specific example.

The case in which a UE3 and a UE4 that take the Comp cell 1 as a serving cell are present will be described.

In Step ST3108, the UE3 notifies the Comp cell 1 of a measurement report message targeted for the ES cell 1.

Even when receiving the measurement report message targeted for the ES cell 1 from the UE3 in Step ST3108, in Step ST3109, the Comp cell 1, which has received the notification that the ES cell 1 has decided switch-off from the ES cell 1 in Step ST3107, does not select the ES cell 1 as a target cell for handover.

In Step ST3110, the Comp cell 1 adds the ES cell 1 to "Black List."

In Steps ST3111 and ST3112, respectively, the Comp cell 1 notifies the UE3 and the UE4 being served thereby of "Black List."

The UE4 that has received "Black List" in Step ST3111 recognizes that the ES cell 1 is a cell that is not taken into account in event evaluation and measurement report and, in Step ST3113, does not take the ES cell 1 as a target for event evaluation. In Step ST3113, the UE4 may avoid taking the ES cell 1 as a measurement target or avoid taking the ES cell 1 as a target for measurement report.

The UE3 that has received "Black List" in Step ST3112 recognizes that the ES cell 1 is a cell that is not taken into account in event evaluation and measurement report and, in Step ST3114, does not take the ES cell 1 as a target for event evaluation. In Step ST3114, the UE3 may avoid taking the ES cell as a measurement target or avoid taking the ES cell as a target for measurement report.

The second embodiment can achieve the following effects. The idle mode UE is prevented from camping on the ES cell that has decided switch-off, and handover to the ES cell as a target cell by the connected mode UE is rejected. This reduces the processing load of the UE, enables effective use of radio resources, restricts an increase in signaling between cells, and prevents a control delay.

Third Embodiment

The ES cell in the dormant state switches itself on when the load of the Comp cell increases. In transitions where the ES cell switches itself on and the coverage of the Comp cell decreases, a large number of UEs may be offloaded from the Comp cell to the ES cell. In this case, when a large number of UEs offloaded to the ES cell begin to be connected with the ES cell simultaneously, signaling contention and congestion occur. This may cause a large delay when the offloaded UE begins to be connected with the ES cell. Depending on a quality of service (QoS) request for service issued by the UE, a required delay amount may be exceeded. When the required delay amount is exceeded as described above, missing data may be caused, thereby degrading user experience. This embodiment will disclose the method for solving this problem.

An eNB configuring an ES cell decides, after the ES cell starts switching itself on, an access priority in accordance with a criterion for deciding the priority of a UE that has received a HO request.

For a predetermined period after the ES cell starts switching itself on, or until the ES cell completes switching itself on, the eNB may decide an access priority in accordance with the criterion for deciding the priority of a UE that has received a HO request.

A specific example of the criterion for deciding a priority is QoS. QoS may be a QoS class identifier (QCI). Or, an access priority may be decided in accordance with a delay amount of the QoS criterion. This provides a higher priority to a UE with a high QoS request and allows the UE to access the ES cell early, thereby enabling offload. This restricts a situation in which the QoS request for service will not be satisfied and a situation in which missing data will be caused during offload, thereby reducing the degradation in user experience.

Another specific example of the criterion for deciding a priority is an amount of data. In the use of an amount of data as the criterion, the ES cell decides an access priority in accordance with at least any one of an amount of data yet to be transmitted to the UE and an amount of data yet to be received from the UE. For example, the ES cell decides an access priority in accordance with at least any one of the amount of downlink packet data yet to be transmitted to the UE to be offloaded and the amount of uplink packet data yet to be received from the UE.

The amount of data may be, for example, a packet count, a byte count, or a bit count. The amount of uplink data may be buffer status report (BSR) information. The amount of uplink data may be the resultant obtained by subtracting an amount of already allocated data from BSR information.

The above-mentioned use of an amount of data as a criterion provides a higher priority to a UE with a larger amount of data yet to be transmitted or received, enabling access to the ES cell early. As a result, such data is forwarded to the ES cell early, thereby restricting the occurrence of missing data or the like. The degradation in user experience can therefore be reduced. In the use of an amount of data as a criterion, QoS and an amount of data may be used in combination to decide an access priority.

Other specific examples of the criterion for deciding a priority include the access priority of an operator, whether the UE is for machine type communication (MTC), and an extended access barring (EAB) configuration of a UE. The use of these as criteria results in a priority according to each configuration.

The method of providing a higher priority to access will be disclosed. The ES cell decides, in accordance with the criterion for deciding the priority of a UE that has received a HO request, the priority of the UE and then allocates a dedicated RACH configuration, beginning with a UE with the highest priority.

Examples of the dedicated RACH configuration include a preamble ID indicative of the index of a preamble configuration for use in PRACH and a PRACH mask ID indicative of the resource that transmits PRACH. Examples of the preamble ID include "ra-PreambleIndex" and "Preamble Index." Examples of the PRACH mask ID include "ra-PRACH-MaskIndex" and "PRACH Mask Index."

The UE that has been explicitly notified of the dedicated RACH configuration uses the dedicated RACH configuration to transmit PRACH (see Non-Patent Document 14), and thus, a PRACH contention does not occur in the ES cell. A so-called non-contention-based RA process can be performed. Also when a large number of UEs start accessing the ES cell, accordingly, an access delay due to PRACH contention can be prevented.

The ES cell needs to recognize the criterion for deciding the priority of a UE to be offloaded from the Comp cell in order to decide the priority of the UE. As the method of recognizing the criterion for deciding the priority of a UE to be offloaded from the Comp cell, the Comp cell notifies in advance of the UE-ID of the UE to be offloaded to the ES cell and the criterion for deciding a priority. As a way of notification, they may be notified together with a HO request for offload or may be notified by being included in a HO request.

The ES cell allocates a dedicated RACH configuration in accordance with the priority of a UE, and the UE needs to recognize the dedicated RACH configuration. As the method in which the UE recognizes a dedicated RACH configuration, the ES cell notifies the UE of the allocated dedicated RACH configuration via the Comp cell. The ES cell may notify the Comp cell of the dedicated RACH configuration together with a HO request response message in response to the previously received HO request or by including the dedicated RACH configuration in the HO request response message. The Comp cell that has received the dedicated RACH configuration in the HO request response message may notify the UE of the dedicated RACH configuration together with a HO command message or by including the dedicated RACH configuration in a HO command message. Consequently, the ES cell can notify the UE with the allocated dedicated RACH configuration of the dedicated RACH configuration.

The UE that has received the dedicated RACH configuration can use, for HO, the dedicated RACH configuration to transmit the PRACH to the ES cell.

In another method in which the Comp cell notifies the UE of a dedicated RACH configuration, before the UE transmits the PRACH for HO, the Comp cell may include the dedicated RACH configuration information in the PDCCH to notify the UE of the dedicated RACH configuration information.

FIGS. 18 and 19 show an example of the sequence of an ES process in a communication system according to a third embodiment of the present invention. FIG. 18 is continuous with FIG. 19 at a boundary BL1. A UE1 is a UE being served by the Comp cell 1. A UE2 is a UE being served by the Comp cell 2.

In Step ST4101, the Comp cell 1 decides switch-on of the ES cell in response to, for example, an increase in load.

In Step ST4102, the Comp cell 1 notifies the ES cell of a switch-on request message. The ES cell that has received the switch-on request message from one Comp cell notifies another Comp cell, here, the Comp cell 2 of a compensation end request message for the coverage of its own cell.

When judging that its own cell can end the compensation of the coverage of the ES cell, in Step ST4104, the Comp cell 2 that has received the compensation end request message permits to end the compensation.

In Step ST4105, the Comp cell 2 notifies the ES cell of a compensation end response (Ack) message. This allows the ES cell to judge whether to decide to switch itself on after checking the statuses of all the Comp cells that compensate for the coverage of its own cell.

In Step ST4106, the ES cell that has received the compensation end response (Ack) message from the Comp cell decides switch-on.

In Steps ST4107 and ST4108, the ES cell notifies all the Comp cells, herein, the Comp cell 1 and the Comp cell 2 of a switch-on request response (Ack) message. It may be a compensation-end-process start request message instead of the switch-on request response message. The Comp cell that has received the compensation-end-process start request message starts a compensation end process.

In Steps ST4110 and ST4111, as the compensation end process, the Comp cell 1 and the Comp cell 2 start the process of offloading the UEs being served thereby. To recognize the UEs that can perform HO to the ES cell among the UEs being served thereby, in Steps ST4113 and ST4114, the Comp cell 1 and the Comp cell 2 notify the UEs being served thereby of a message for measurement. The cell identifier of the ES cell and carrier frequency information may be configured in the message for measurement as a measurement target. Alternatively, the ES cell list may be configured.

In Steps ST4115 and ST4116, the UE1 and the UE2 perform measurement.

At the occurrence of an event in the ES cell, in Steps ST4117 and ST4118, the UE1 and the UE2 respectively notify the Comp cell 1 and the Comp cell 2 of a measurement report message. This allows the Comp cell to obtain the information on the UEs capable of HO to the ES cell.

In Steps ST4119 and ST4121, the Comp cell 1 and the Comp cell 2 that have obtained the information on the UEs capable of HO to the ES cell decide to cause the UE to perform HO to the ES cell.

In Steps ST4120 and ST4122, the Comp cell 1 and the Comp cell 2 notify the ES cell of a HO request message. The identifier of the UE (UE-ID) and the criterion for deciding a priority are included in the HO request message. Herein, the criterion for deciding a priority is QoS. This allows the ES cell to recognize the UE that has been requested to perform HO and the QoS thereof.

In Step ST4109, the ES cell, which has notified all the Comp cells, herein, the Comp cell 1 and the Comp cell 2 of the switch-on request response (Ack) message in Steps ST4107 and ST4108, starts switching itself on. In Step ST4112, the ES cell starts the timer that has a predetermined period. In Step ST4123, the ES cell ends the timer. The ES cell stores a HO request message received during the period until the timer has expired in Step ST4123.

In this manner, the ES cell can decide a priority after receiving the HO request message for the UE that is caused to be offloaded from the Comp cell that compensates for the coverage of its own cell.

In Step ST4124 of FIG. 19, the ES cell that has ended the timer in Step ST4123 decides the HO acceptance priority using the HO request message and the information about the UE being a HO request target and the QoS of the UE which have been received within the predetermined period of the timer. For example, a higher priority is provided to the UE with higher QoS.

In Step ST4125, the ES cell performs admission control in response to the HO request. After the process for admission control in Step ST4125, the ES cell may perform the process of deciding a priority in Step ST4124. Alternatively, a priority deciding function may be provided in HO admission control of the ES cell such that a priority is decided together with admission control.

The ES cell that has decided a priority in Step ST4124 allocates a dedicated RACH configuration, beginning with a UE with the highest priority. Herein, the UE1 has a higher priority, and thus, a dedicated RACH configuration is allocated thereto. The UE2 has a lower priority, and thus, no dedicated RACH configuration is allocated thereto. The number of dedicated RACH configurations is decided in advance, and thus, the number of UEs to which dedicated RACH configurations can be allocated is limited.

In Step ST4126, the ES cell notifies the Comp cell 1 of the dedicated RACH configuration allocated to the UE1 with a higher priority and the identifier of the UE (UE-ID). Herein, they are notified together with a HO request response (Ack) message or notified by being included in the HO request response (Ack) message. The dedicated RACH configuration includes a preamble ID and a PRACH mask ID.

In Step ST4127, the ES cell notifies the Comp cell 2 of the identifier of the UE2 with a lower priority together with a HO request response (Ack) message or by including the identifier in the HO response (Ack) message.

In Step ST4128, the Comp cell 1 notifies the UE1 of a dedicated RACH configuration allocated to the UE. Herein, the Comp cell 1 notifies of the dedicated RACH configuration together with a HO command message or by including the dedicated RACH configuration in the HO command message.

In Step ST4129, the Comp cell 2 notifies the UE2 of a HO command message.

Consequently, the UE whose priority has been set higher by the ES cell, that is, the UE1 can obtain a dedicated RACH configuration.

The UE1 and the UE2 have received the HO command message respectively in Steps ST4128 and ST4129, and accordingly start accessing the ES cell. Specifically, the UE1 and UE2 start a random access (RA) process. The RA process is started with PRACH transmission.

In Step ST4130, the UE1 transmits the PRACH to the ES cell using the dedicated RACH configuration. A non-contention-based PRACH, which involves no contention, is accordingly provided, thereby allowing the ES cell to receive the PRACH from the UE1 without contention with another UE.

In Step ST4132, accordingly, the ES cell can notify the UE1 of a random access response (abbreviated as RAR) message early within a predetermined timing. In Step ST4132, the UE1 can receive the RAR message within the predetermined timing. In Step ST4133, subsequently, the UE1 executes the process for HO to the ES cell. In Step ST4139, the Comp cell 1 ends the compensation.

In Step ST4131, the UE2, which cannot use a dedicated RACH configuration, selects the PRACH from a common RACH configuration and transmits the PRACH. The PRACH is accordingly a contention-based PRACH that involves a contention risk. The ES cell may fail to receive the PRACH due to the contention with the PRACH from another UE. In Step ST4134, the ES cell notifies the UE2 of an RAR message. In Step ST4135, the UE2 notifies the ES cell of a message 3 (Msg3).

If the ES cell fails in the RA process from the UE, the ES cell does not notify the UE2 of a message 4 (Msg4). In Step ST4136, accordingly, the UE2 cannot receive the message 4 (Msg4). In Step ST4137, thus, the UE2 has to start the RA process again, beginning with the PRACH retransmission.

When the RA process on the ES cell is successful, in Step ST4138, the UE2 executes the HO process subsequent to the RA process. In Step ST4140, the Comp cell 2 ends the compensation.

The HO process on the UE2 is a contention-based PRACH, and thus, when a large number of UEs make access, the contention increases a possibility that the PRACH will be retransmitted and the RA process will be re-executed. This increases a possibility of the occurrence of a delay. In Step ST4124, however, the ES cell has decided the execution of the contention-based PRACH in accordance with the priority according to the QoS of the UE2. Thus, there are few effects of delay.

This method can provide, when the offloaded UE is connected to the ES cell, the UE with a priority in response to a QoS request for service. This enables control of a delay amount according to a priority in such a manner that a UE with a higher priority is allowed access with a lower delay and the UE with a lower priority is allowed access with a higher delay. The degradation in user experience can therefore be reduced.

First Modification of Third Embodiment

The third embodiment has disclosed the case in which all the UEs, to which dedicated RACH configurations are allocated, are provided with higher priorities. With a large number of UEs to which dedicated RACH configurations are allocated, however, even if the large number of UEs transmit a non-contention-based PRACH to the ES cell, the ES cell may fail to transmit the RAR being a response to the PRACH to the UE within a predetermined period (window). The UE that cannot receive the RAR within the predetermined period has to perform the PRACH retransmission process, causing a delay. This modification will disclose the method for solving this problem.

As in the first embodiment, the ES cell decides the priority of a UE in accordance with the QoS of the UE that has received a HO request and then allocates a dedicated RACH configuration, beginning with a UE with the highest priority. The ES cell stores the priority and the dedicated RACH configuration in association with each other. The ES cell may also store the allocated UE identifier in association with the priority and the dedicated RACH configuration.

The ES cell receives, from the UE to which the dedicated RACH configuration has been allocated, the PRACH transmitted using the dedicated RACH configuration. After receiving all the PRACHs of the UEs to which the dedicated RACH configurations are allocated, the ES cell determines the priorities of the UEs using the dedicated RACH configurations of the received PRACHs and the association of the stored priorities and the dedicated RACH configurations.

The ES cell can thus recognize to which UE the ES cell has to provide a higher priority. The ES cell may determine the priorities not after receiving the PRACHs of all the UEs to which dedicated RACH configurations are allocated but after a lapse of a predetermined period from notifying the Comp cell of a HO request response message or after a lapse of a predetermined period from first receiving the PRACH using the allocated dedicated RACH configuration. This avoids a situation in which the ES cell cannot proceed to the next process if the ES cell does not receive the PRACH due to a sudden change in radio wave environment.

The ES cell transmits RAR in the order of UE priority within a predetermined period. As to the UE to which RAR cannot be transmitted within a predetermined period, the ES cell waits for the PRACH retransmission from the UE.

Immediately after receiving the RAR within the predetermined period, the UE performs the HO process subsequent to the RA process. If failing to receive the RAR within the predetermined period, the UE retransmits the PRACH at the next PRACH transmission timing.

In this manner, the ES cell can transmit the RAR in the order of UE priority, and thus, the ES cell can perform the HO process as soon as possible, beginning with a UE with the highest priority. For the UEs offloaded from the Comp cell to the ES cell, accordingly, a delay in access to the ES cell can be reduced, beginning with a UE with the highest priority. This reduces the degradation in user experience.

Figure 20:
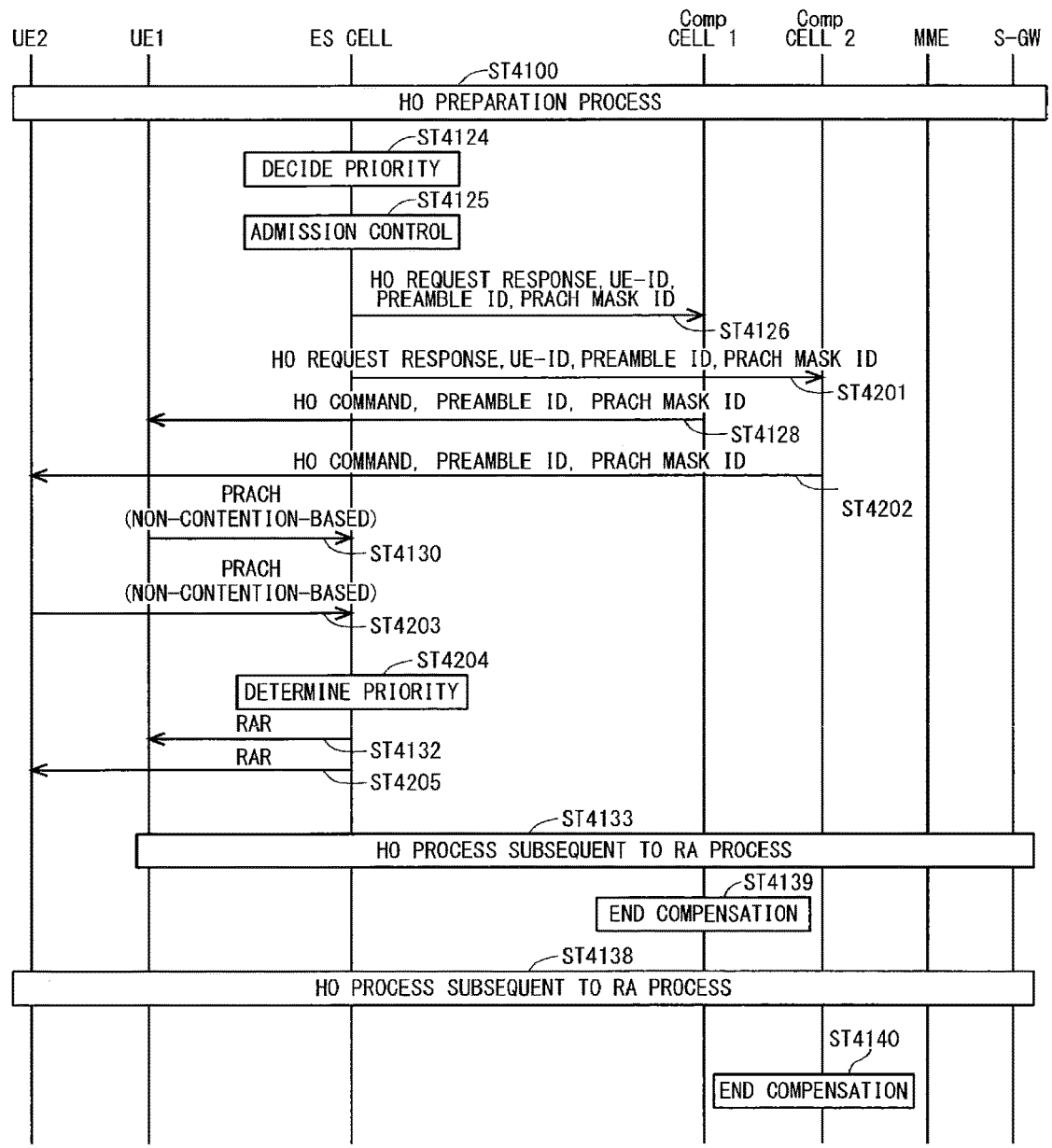
FIG. 20 shows an example of the sequence of an ES process in a communication system according to a first modification of the third embodiment of the present invention.

FIG. 20 shows an example of the sequence of an ES process in a communication system according to a first modification of the third embodiment of the present invention. The sequence shown in FIG. 20 is similar to the sequence shown in FIGS. 18 and 19, and thus, the steps corresponding to those of FIGS. 18 and 19 will be denoted by the same step numbers, and common description will be omitted.

In Step ST4124, the ES cell, which has ended the timer in Step ST4123 in the HO preparation process of Step ST4100, decides the priority of HO acceptance using the HO request and the information about the UE being a HO request target and the QoS of the UE which have been received within the predetermined period of the timer. For example, the ES cell provides a higher priority to the UE with higher QoS.

The ES cell that has decided a priority in Step ST4124 allocates a dedicated RACH configuration, beginning with a UE with the highest priority. Herein, the priority of the UE1 is 1, and the priority of the UE2 is 2. A dedicated RACH configuration is allocated to both of the UE1 and the UE2. The ES cell stores the priority of the UE and the dedicated RACH configuration allocated to this UE in association with each other.

In Step ST4126, the ES cell notifies the Comp cell 1 of the dedicated RACH configuration allocated to the UE1 and the identifier of the UE (UE-ID). Herein, they are notified together with a HO request response (Ack) message or notified by being included in the HO request response (Ack) message.

In Step ST4201, the ES cell notifies the Comp cell 2 of the dedicated RACH configuration allocated to the UE2 and the identifier of the UE (UE-ID). Herein, they are notified together with a HO request response (Ack) message or notified by being included in the HO request response (Ack) message. The dedicated RACH configuration includes a preamble ID and PRACH mask ID.

In Step ST4128, the Comp cell 1 notifies the UE1 of the dedicated RACH configuration allocated to the UE. Herein, the dedicated RACH configuration is notified together with a HO command message or notified by being included in the HO command message.

In Step ST4202, the Comp cell 2 notifies the UE2 of the dedicated RACH configuration allocated to the UE. Herein, the dedicated RACH configuration is notified together with a HO command message or notified by being included in the HO command message.

The UE1 and UE2 have received the HO command messages respectively in Steps ST4128 and ST4202, and thus, start accessing the ES cell.

In Steps ST4130 and ST4203, the UE1 and the UE2 each transmit the PRACH to the ES cell using the dedicated RACH configuration obtained together with the HO command message. The non-contention-based PRACH, which involves no contention, is provided, thereby allowing the ES cell to receive the PRACHs from the UE1 and the UE2 without contention with another UE.

In Steps ST4130 and ST4203, the ES cell receives the PRACH transmitted in the dedicated RACH configuration from the UE to which the dedicated RACH configuration has been allocated.

In Step ST4204, the ES cell determines a UE priority using the dedicated RACH configuration of the received PRACH and the stored association between the priority and the dedicated RACH configuration.

The ES cell can accordingly recognize to which UE the ES cell has to provide a higher priority. Herein, the ES cell can determine that the priority of the UE1 is 1 and the priority of the UE2 is 2.

In Step ST4132, the ES cell transmits an RAR message to the UE1 with priority No. 1 earliest within a predetermined period.

In Step ST4205, next, the ES cell transmits an RAR message to the UE2 with priority No. 2 at the next transmission timing within the predetermined period.

Immediately after receiving the RAR message in Step ST4132, in Step ST4133, the UE1 performs the HO process subsequent to the RA process.

Immediately after receiving the RAR message in Step ST4205, in Step ST4138, the UE2 performs the HO process subsequent to the RA process.

The UE1 can receive the RAR message earlier than the UE2, and thus, executes the HO process earlier than the UE2. The UE1 with a higher priority thus causes a lower delay when accessing the ES cell.

The example of the sequence shown in FIG. 20 describes the case in which the RAR message is transmitted to both of the UE1 and the UE2 within a predetermined period. In some cases, however, a large number of UEs are present, and thus, the RAR message cannot be transmitted to the UEs within a predetermined period. In these cases, as to the UE to which the RAR message cannot be transmitted within a predetermined period, the ES cell waits for the PRACH retransmission from the UE. On the other hand, the UE that cannot receive the RAR message within a predetermined period retransmits the PRACH at the next PRACH transmission timing.

Also in such a case, as described above, the ES cell transmits the RAR message to the UE in the order of UE priority. Consequently, the UE to which the RAR message cannot be transmitted within a predetermined period can be the UE with a lower priority. In other words, the UE is, for example, a UE with low QoS or a UE that tolerates a high delay. Therefore, the UE that requests high QoS is allowed to execute the HO process with a low delay, and the UE that requests low QoS is allowed to execute the HO process with a high delay.

Consequently, the HO can be performed as soon as possible, beginning with a UE with the highest priority. For the UEs offloaded from the Comp cell to the ES cell, accordingly, a delay in the accesses to the ES cell can be reduced, beginning with a UE with the highest priority. This reduces the degradation in user experience.

Second Modification of Third Embodiment

The third embodiment has disclosed the method of providing a higher priority to the access to an offload destination by allocating a dedicated RACH configuration in accordance with a UE priority. The UE to which no dedicated RACH configuration has been allocated involves a PRACH risk in accessing the HO destination. The UE, on which the RA process has not been performed by the ES cell, starts from the PRACH retransmission. For a large number of UEs to which no dedicated RACH configurations are allocated, a problem arises that the PRACH retransmissions are not prioritized among the UEs. This modification will disclose the method of solving this problem.

The ES cell decides, in accordance with the criterion for deciding the priority of a UE that has received a HO request, the priority of the UE and sets a backoff time in PRACH retransmission in accordance with the priority of the UE. The UE for which a backoff time has been set delays the PRACH retransmission by a predetermined period in accordance with the set value of the backoff time. The backoff time may be set using the existing parameter "Backoff Parameter values" of the RAR (see Non-Patent Document 14). The backoff time may be set not in accordance with the priority of the UE but in accordance with a QoS request or a delay time request value. Compared with the setting according to the priority, the relationship with the tolerable delay time of the UE is established easily, leading to easy control. The backoff time may be set to 0, that is, no delay may be set.

In particular, the parameter "Backoff Parameter values" of the RAR may be set, in accordance with the priority of the UE, to the UE to which no dedicated RACH configuration is allocated. When the RA process fails, thus, the UE to which a dedicated RACH configuration has been allocated can be caused to retransmit the PRACH with no backoff time. Also, when the RA process fails, the UE to which no dedicated RACH configuration is allocated can be caused to delay the PRACH retransmission by the set backoff time. This reduces PRACH contentions and sets a delay time according to the priority.

The UE has to recognize a backoff time. The method in which the UE recognizes a backoff time may be similar to the method disclosed in the first embodiment in which the UE recognizes a dedicated RACH configuration.

The ES cell notifies the UE of a set backoff time, that is, a backoff time set value via the Comp cell. The ES cell may notify the Comp cell of the backoff time set value together with a HO request response message in response to the previously received HO request message or by including the backoff time in the HO request response message. The Comp cell that has received the backoff time set value in the HO request response message may notify the UE of the backoff time set value together with a HO command message or by including the backoff time set value in the HO command message.

In another method in which the Comp cell notifies the UE of a backoff time set value, the Comp cell may notify the UE of the backoff time set value, which is included in the PDCCH, before the UE transmits the PRACH for HO.

The UE that has received the backoff time set value can transmit, in PRACH retransmission when the RA process fails, the PRACH to the ES cell after a delay of a predetermined period, using the backoff time set value.

Figure 21:
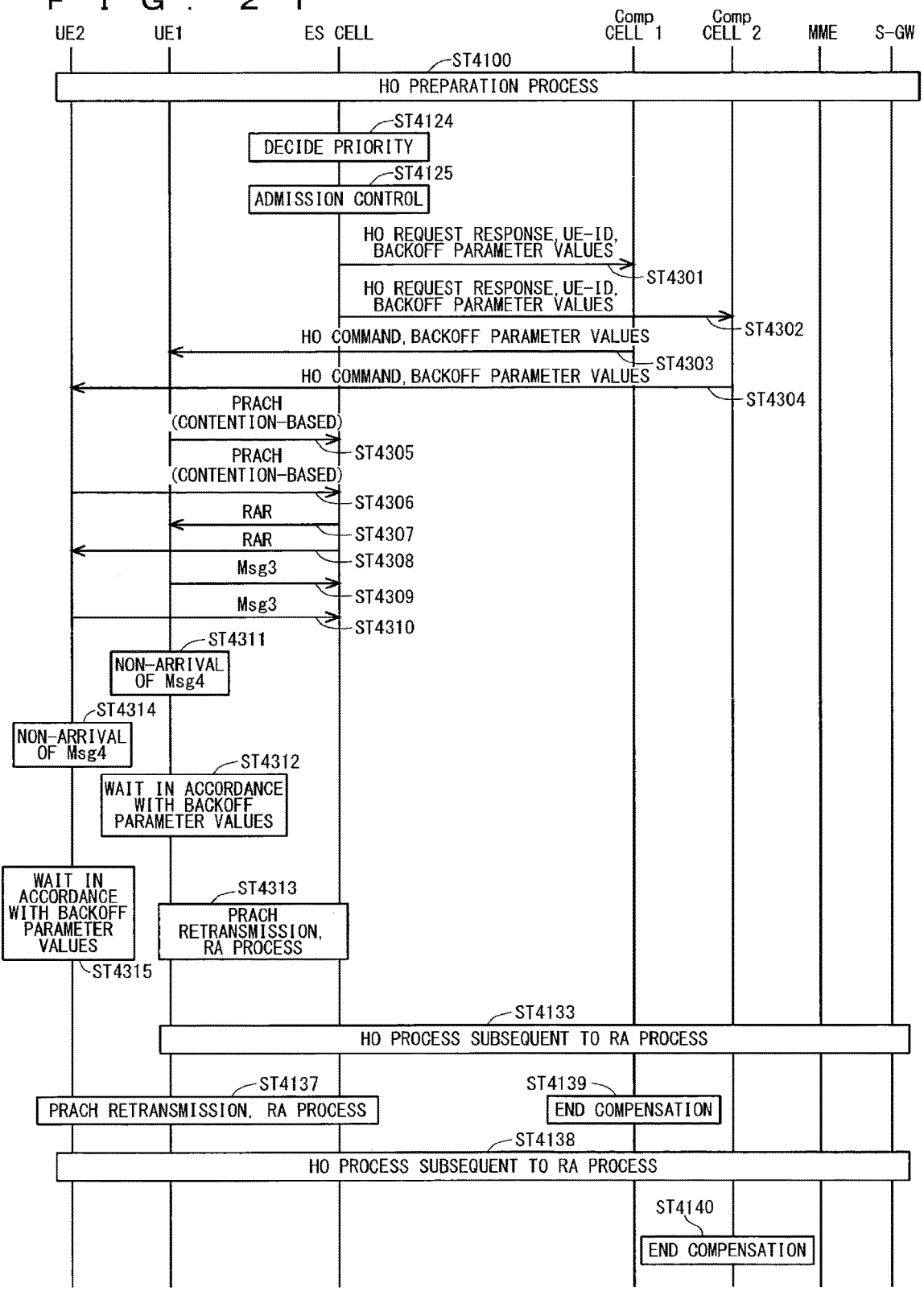
FIG. 21 shows an example of the sequence of an ES process in a communication system according to a second modification of the third embodiment of the present invention.

FIG. 21 shows an example of the sequence of an ES process in a communication system according to a second modification of the third embodiment of the present invention. The sequence shown in FIG. 21 is similar to the sequences shown in FIGS. 18 to 20, and thus, the steps corresponding to those of FIGS. 18 to 20 will be denoted by the same step numbers, and common description will be omitted.

In Step ST4124, the ES cell, which has ended the timer in Step ST4123 in the HO preparation process of Step ST4100, decides the priority of HO acceptance using the HO request and the information about the UE being a HO request target and the QoS of the UE which have been received within the predetermined period of the timer. For example, a higher priority is provided to a UE with higher QoS.

In the example shown in FIG. 21, the UE1 has a priority higher than that of the UE2. No dedicated RACH configuration is allocated and a backoff time is set to both of the UE1 and the UE2. The backoff time is set using the backoff parameter values of the RAR. The ES cell sets a backoff time of smaller value to the UE1 with a relatively high priority and sets a backoff time of greater value to the UE2 with a relatively low priority.

In Steps ST4301 and ST4302, the ES cell notifies the Comp cell 1 and the Comp cell 2 of the backoff parameter values being backoff times set to the UE1 and the UE2 and UE identifiers (UE-IDs). Herein, they are notified together with a HO request response (Ack) message or notified by being included in the HO request response (Ack) message.

In Steps ST4303 and ST4304, the Comp cell 1 and the Comp cell 2 respectively notify the UE1 and the UE2 of the backoff parameter values being backoff times set to the corresponding UEs. Herein, the backoff parameter value is notified together with a HO command message or notified by being included in the HO command message.

In Steps ST4305 and ST4306, the UE1 and the UE2 respectively transmit the PRACHs to the ES cell using a common PRACH configuration. Therefore, a contention-based PRACH that involves a contention risk is provided.

In Steps ST4307 and ST4308, the ES cell notifies the UE1 and the UE2 of an RAR message, respectively.

In Steps ST4309 and ST4310, respectively, the UE1 and the UE2 that have received the RAR message notify the ES cell of a message 3 (Msg3) of the RA process.

The RA process involves a contention risk in this sequence, and thus, this sequence shows the case in which none of the UEs has successfully performed the RA process between the ES cell and itself. In Steps ST4311 and ST4314, the UE1 and the UE2 respectively cannot receive a message 4 (Msg4) of the RA process. In this case, in Step ST4312, the UE1 delays the PRACH retransmission by a predetermined period using the backoff parameter values received in Step ST4303.

In Step ST4313, the UE1 retransmits the PRACH after a delay of a predetermined period and performs the RA process between the ES cell and itself. When the RA process is successful, in Step ST4133, the HO process subsequent to the RA process is performed.

In Step ST4315, the UE2 that has failed to receive the message 4 (Msg4) in Step ST4314 delays the PRACH retransmission by a predetermined period using the backoff parameter values received in Step ST4304.

In Step ST4137, the UE2 retransmits the PRACH after a delay of a predetermined period and performs the RA process between the ES cell and itself. When the RA process is successful, in Step ST4138, the HO process subsequent to the RA process is performed.

Consequently, also when a large number of UEs are allocated with no dedicated RACH configurations, the PRACH retransmissions are prioritized among the UEs, enabling the HO process as soon as possible, beginning with a UE with the highest priority. For the UEs offloaded from the Comp cell to the ES cell, accordingly, a delay in access to the ES cell can be reduced, beginning with a UE with the highest priority. This reduces the degradation in user experience.

Third Modification of Third Embodiment

The second modification of the third embodiment has disclosed the method of setting a backoff time in PRACH retransmission in accordance with a UE priority to provide a higher priority to the access to an offload destination. In this case, unfortunately, many UEs retransmit the PRACH, resulting in unnecessary signaling and an increase in power consumption of the UE. This modification will disclose the method for solving this problem.

The ES cell decides a UE priority in accordance with the criterion for deciding the priority of a UE that has received the HO request message and, in accordance with the UE priority, sets a wait time in the initial PRACH transmission. The UE whose wait time has been set delays the initial PRACH transmission by a predetermined period in accordance with the set value of the wait time. The wait time may be set not in accordance with the UE priority but in accordance with a QoS request message or a delay-time request value. Compared with the setting according to the priority, the relationship with the tolerable delay time of the UE is established easily, leading to easy control. The wait time may be set to 0, that is, no delay may be set.

The UE needs to recognize a wait time. The method in which the UE recognizes a wait time may be similar to the method disclosed in the first embodiment in which the UE recognizes a dedicated RACH configuration.

The ES cell notifies the UE of a set wait time, that is, a wait time set value via the Comp cell. The ES cell may notify the Comp cell of the wait time set value together with a HO request response message in response to the previously received HO request message or by including the wait time set value in the HO request response message. The Comp cell that has received the wait time set value in the HO request response message may notify the UE of the wait time set value together with a HO command message or by including the wait time set value in the HO command message.

In another method in which the Comp cell notifies the UE of a wait time set value, the Comp cell may notify the UE of the wait time set value, which is included in the PDCCH, before the UE transmits the PRACH for HO.

The UE that has received the wait time set value can use, in the initial PRACH transmission for accessing a HO destination, the wait time set value to transmit the PRACH to the ES cell after a delay of a predetermined period.

Figure 22:
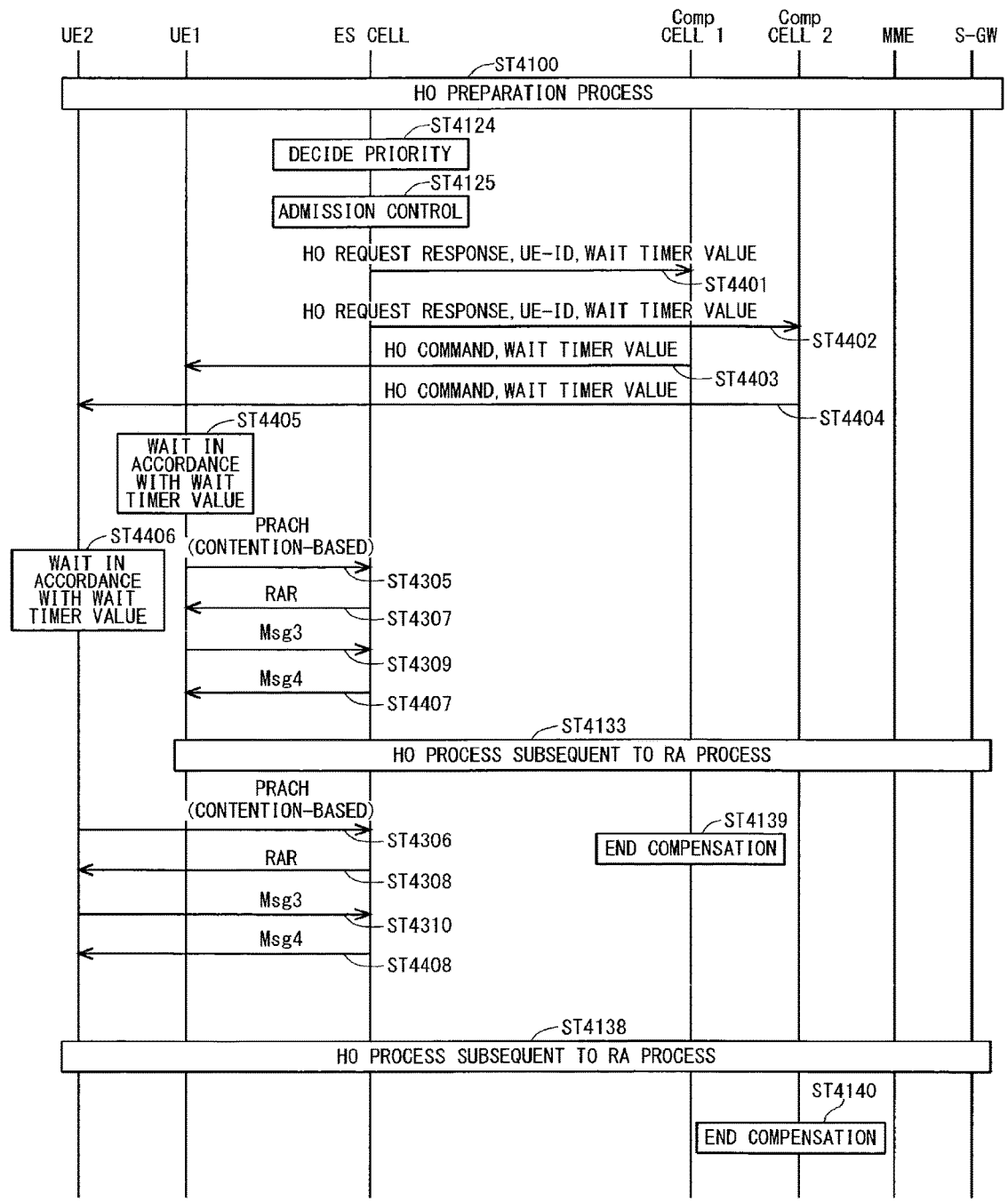
FIG. 22 shows an example of the sequence of an ES process in a communication system according to a third modification of the third embodiment of the present invention.

FIG. 22 shows an example of the sequence of an ES process in a communication system according to a third modification of a third embodiment of the present invention. The sequence shown in FIG. 22 is similar to the sequences shown in FIGS. 18 to 21, and thus, the steps corresponding to those of FIGS. 18 to 21 will be denoted by the same step numbers, and common description will be omitted.

In Step ST4124, the ES cell that has ended the timer in Step ST4123 in the HO preparation process of Step ST4100 decides a HO acceptance priority using the HO request and the information about the UE being a HO request target and the QoS of the UE which have been received within the predetermined period of the timer. For example, a higher priority is provided to the UE with higher QoS.

In the example shown in FIG. 22, the UE1 has priority No. 1 and the UE2 has priority No. 2. No dedicated RACH configuration is allocated and a wait time is set to both of the UE1 and the UE2. The ES cell sets a wait time of smaller value to the UE1 having a relatively high priority and sets a wait time of greater value to the UE2 having a relatively low priority.

In Steps ST4401 and ST4402, the ES cell respectively notifies the Comp cell 1 and the Comp cell 2 of wait timer values that are wait times set to the UE1 and the UE2 and UE identifiers (UE-IDs). Herein, they are notified together with a HO request response (Ack) message or notified by being included in the HO request response (Ack) message.

In Steps ST4403 and ST4404, the Comp cell 1 and the Comp cell 2 respectively notify the UE1 and the UE2 of the wait timer values that are the wait times set for the respective UEs. Herein, they are notified together with a HO command message or notified by being included in the HO command message.

In Steps ST4405 and ST4406, the UEs that have respectively received the wait times in Steps ST4403 and ST4404 delay the PRACH transmission by a predetermined period in accordance with the respective wait timer values. Herein, the priority of the UE1 is higher than the priority of the UE2, and thus, the wait timer value of the UE1 is set to be smaller than the wait timer value of the UE2.

In Step ST4305, first, the UE1 transmits the PRACH. The PRACH is a contention-based PRACH with a common PRACH configuration. This method is applicable not only to the PRACH with a common RACH configuration but also to the PRACH to which a dedicated RACH configuration has been allocated.

The ES cell can set a wait timer value to the UE, to which the dedicated RACH configuration has been allocated, to further provide a higher priority to the PRACH, thereby causing the UE to transmit the PRACH. This reduces the PRACH retransmissions when the UE cannot receive the RAR within a predetermined period, which occurs when dedicated RACH configurations are allocated to a large number of UEs.

Setting a wait timer value by the ES cell can provide a time difference in the PRACH transmissions by the UEs. This results in a low possibility that the PRACHs of a plurality of UEs will contend with each other even when they are contention-based PRACHs. The ES cell is therefore highly likely to receive the PRACH in Step ST4305.

In Steps ST4307, ST4309, and ST4407, the ES cell that has received the PRACH from the UE1 in Step ST4305 performs the RA process between the UE1 and itself. Specifically, in Step ST4307, the ES cell notifies the UE1 of an RAR message. In Step ST4309, the UE1 notifies the ES cell of a message 3 (Msg3) of the RA process. In Step ST4407, the ES cell notifies the UE1 of a message 4 (Msg4) of the RA process. In Step ST4133, the UE1 performs the HO process subsequent to the RA process.

In Step ST4406, the UE2 delays the PRACH transmission by a predetermined period in accordance with the wait timer value. The UE2, which has a wait timer value set to be greater than that of the UE1, transmits the PRACH after a delay from the timing at which the UE1 transmits the PRACH.

In Step ST4306, the UE2 transmits the PRACH to the ES cell. As in the case of the UE1, the ES cell is highly likely to receive the PRACH in Step ST4306.

In Steps ST4308, ST4310, and ST4408, the ES cell that has received the PRACH from the UE2 in Step ST4306 performs the RA process between the UE2 and itself. Specifically, in Step ST4308, the ES cell notifies the UE2 of an RAR message. In Step ST4310, the UE2 notifies the ES cell of a message 3 (Msg3) of the RA process. In Step ST4408, the ES cell notifies the UE2 of a message 4 (Msg4) of the RA process. In Step ST4138, the UE2 performs the HO process subsequent to the RA process.

Consequently, the transmission timing in the initial PRACH transmission can be delayed in accordance with the UE priority. If a large number of UEs are to be offloaded, the PRACH transmission timing can be varied, thereby prioritizing the PRACH transmissions. The HO process can thus be performed as soon as possible, beginning with a UE with the highest priority. For the UEs offloaded from the Comp cell to the ES cell, accordingly, a delay in access to the ES cell can be reduced, beginning with a UE with the highest priority. This reduces the degradation in user experience.

The wait timer value disclosed in this modification may be used not only in the initial PRACH transmission but also in the PRACH retransmission when the RA process fails. The PRACH transmission timing by the UE can be varied also in the PRACH retransmission, and further, the retransmissions of the PRACHs are prioritized. Therefore, the HO process can be performed as soon as possible, beginning with a UE with the highest priority.

Fourth Modification of Third Embodiment

The second modification of the third embodiment has disclosed the method of providing a higher priority to the access to an offload destination by setting a backoff time in PRACH retransmission in accordance with a UE priority. The third modification of the third embodiment has disclosed the method of providing a higher priority to the access to an offload destination by setting a wait time in PRACH initial transmission in accordance with a UE priority. This modification will disclose another method of providing a higher priority to the access to an offload destination.

The ES cell decides a UE priority in accordance with the criterion for deciding the priority of a UE that has received a HO request message and, in accordance with the UE priority, sets a wait time for transmitting an RRC message to the ES cell. This wait time may be referred to as an "RRC wait time."

The UE whose RRC wait time has been set delays the transmission of an RRC message to the ES cell by a predetermined period in accordance with the set value of the RRC wait time. The RRC wait time may be set not in accordance with the UE priority but in accordance with a QoS request message or a delay-time request value. Compared with the setting according to the priority, the relationship with the tolerable delay time of the UE is established easily, leading to easy control. The RRC wait time may be set to 0, that is, no delay may be set.

The RRC wait time may be used for, for example, an RRC connection reestablishment request message when the UE causes an RLF or a HOF.

Appropriate use of an RRC wait time for the RRC message to be notified to the cell being an offload destination can differ the transmission timing of the RRC message in accordance with the UE priority. Further, the RRC message transmissions are prioritized, enabling the connection with the cell being an offload destination as soon as possible, beginning with a UE with the highest priority.

The method in which the UE recognizes an RRC wait time may be performed similarly to the method involving the use of a wait time which has been disclosed in the third modification of the third embodiment.

This modification can delay the timing of transmitting an RRC message to the cell being an offload destination in accordance with the UE priority. If a large number of UEs are to be offloaded, the transmission timing of the RRC message can be varied. Further, the RRC message transmissions are prioritized, and thus, the process for RRC connection with the cell being an offload destination can be performed as soon as possible, beginning with a UE with the highest priority.

For the UEs offloaded from the Comp cell to the ES cell, accordingly, a delay in access to the ES cell can be reduced, beginning with a UE with the highest priority. This reduces the degradation in user experience.

The third embodiment and the first to third modifications of the third embodiment have described the examples in transitions where the ES cell switches itself on and the coverage of the Comp cell reduces. The methods disclosed in the third embodiment and the modifications are also applicable to the UEs offloaded from the ES cell to the Comp cell in transitions where the ES cell switches itself off and the coverage of the Comp cell increases. In a transition where the ES cell switches itself off, switch-off is performed to reduce the load of the ES cell. This conceivably results in few UEs compared with the case in which the ES cell switches itself on. Although in few cases, however, a contention of UE's access with the Comp cell occurs. In such cases, effects similar to those of the third embodiment and the first to third modifications of the third embodiment can be achieved.

Fourth Embodiment

Disclosed below are a method of notifying the reference signal (RS) transmission power of the ES cell or Comp cell that gradually increases or decreases its transmission power in the first embodiment and a method of deciding the uplink transmission power of the UE that accesses the ES cell or Comp cell.

The cell that increases or decreases its transmission power through a plurality of stages does not notify the UE of the RS transmission power after it has increased or decreased the transmission power but notifies the UE of the RS transmission power every time it increases or decreases the transmission power.

The UE uses the notified RS transmission power at each stage to evaluate a path loss at each stage. The UE uses the evaluated path loss at each stage to decide the transmission power at each stage.

Consequently, the notification of the RS transmission power is updated every time the transmission power is increased or decreased, thus reducing a time period in which an error occurs in the evaluation of a path loss by the UE side. The UE can therefore decide appropriate transmission power with few errors at each stage.

In some cases, the timing of setting the transmission power at each stage in the ES cell or a Comp cell that gradually increases or decreases its transmission power differs from the timing of receiving the RS transmission power at each stage at which the UE that accesses the cell is notified. The following two, (1) and (2), will be disclosed as the methods that reflect this point.

(1) Case where Reduction in Interference Caused by UE is Emphasized

Figure 23:
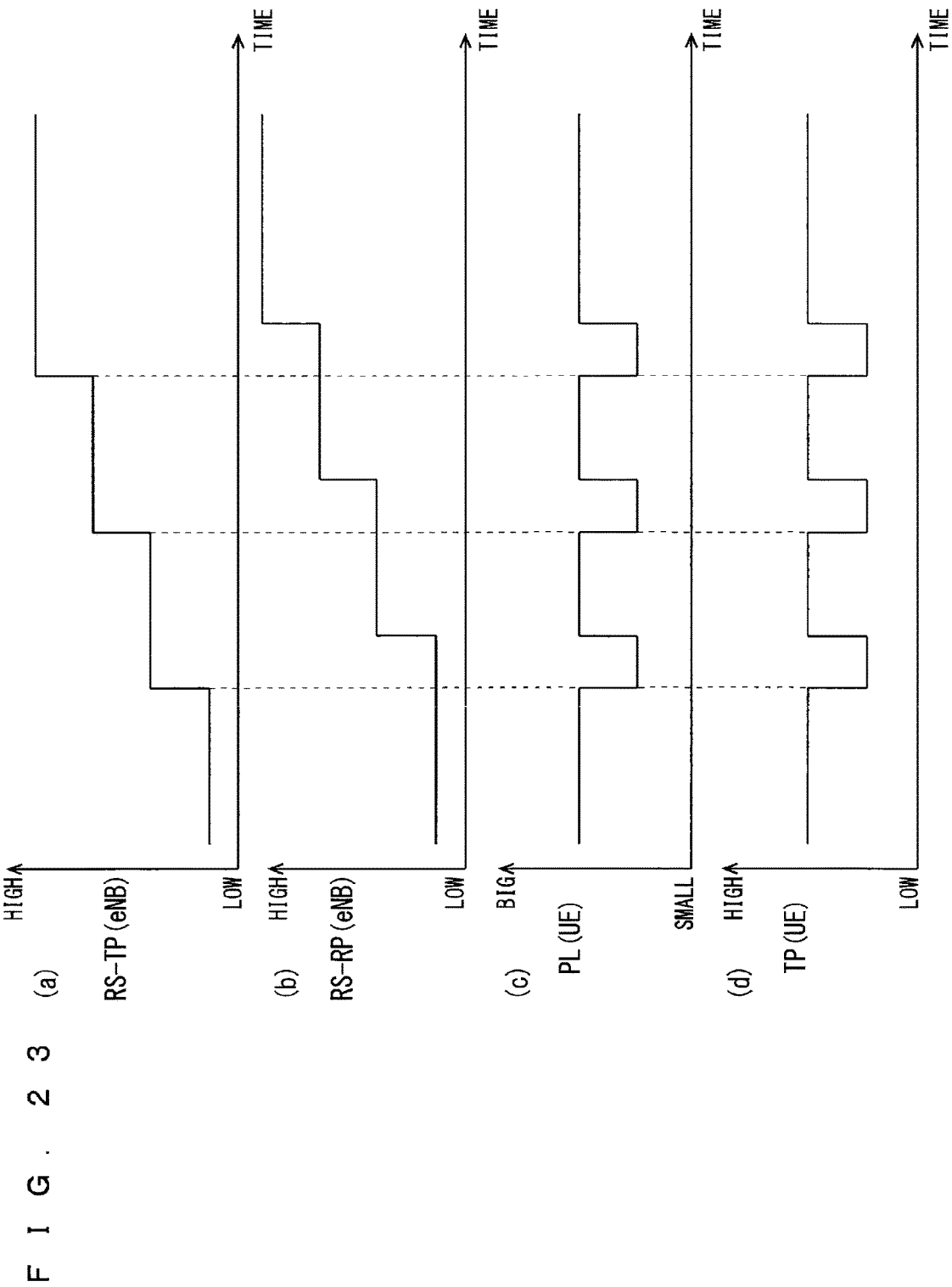
FIG. 23 shows an example of the procedure of deciding the transmission power of a UE in a fourth embodiment of the present invention.
Figure 24:
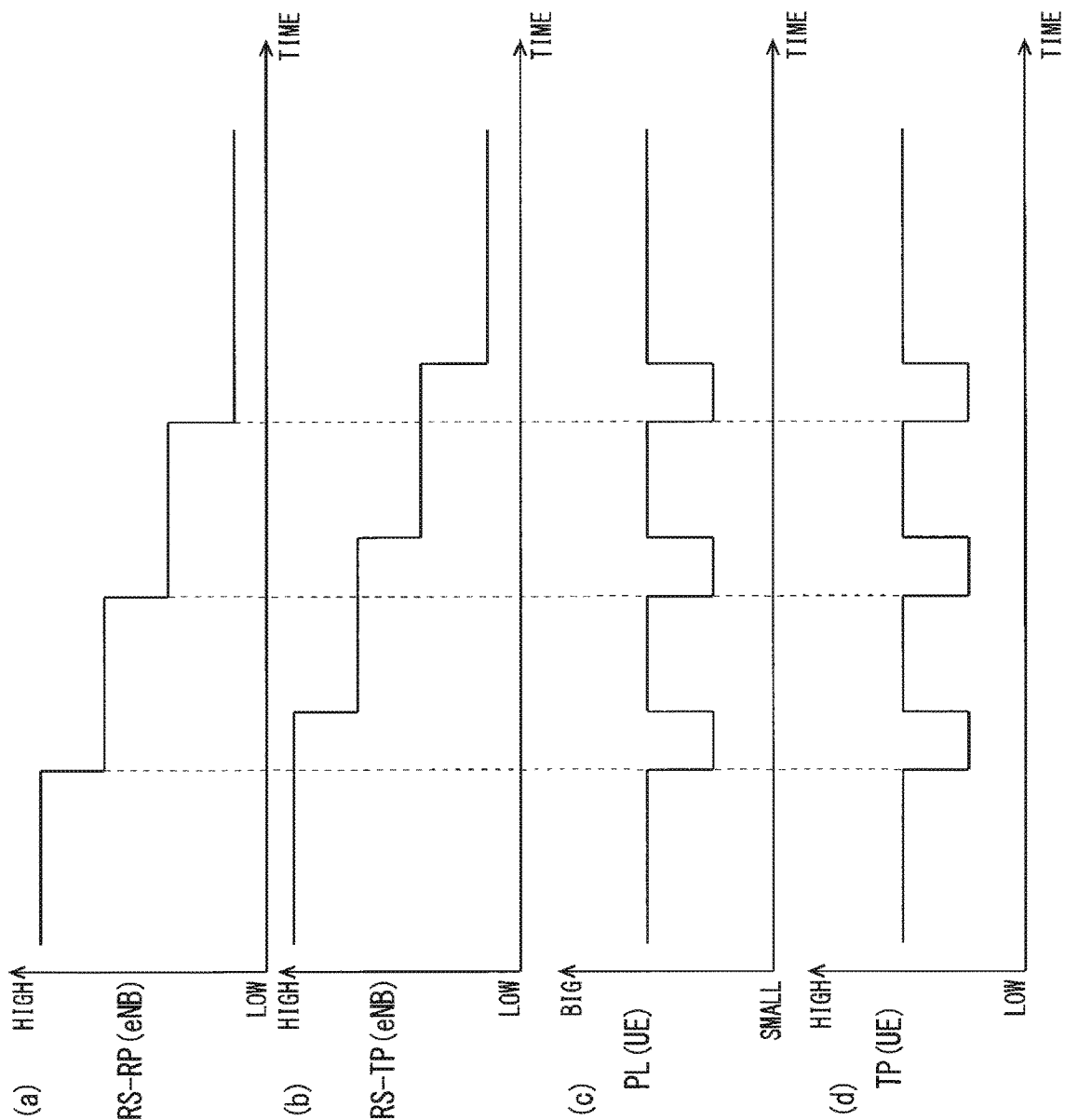
FIG. 24 shows the example of the procedure of deciding the transmission power of the UE in the fourth embodiment of the present invention.

FIGS. 23 and 24 show an example of the procedure of deciding the transmission power of a UE in a fourth embodiment of the present invention. The vertical axes of FIGS. 23(a) and 24(b) represent the RS transmission power RS-TP (eNB) of an eNB, the vertical axes of FIGS. 23(b) and 24(a) represent the RS notification power RS-RP (eNB) from the eNB, the vertical axes of FIGS. 23(c) and 24(c) represent the path loss PL (UE) calculated by the UE, and the vertical axes of FIGS. 23(d) and 24(d) represent the transmission power TP (UE) of the UE. The horizontal axes of FIGS. 23(a) to 23(d) and FIGS. 24(a) to 24(d) represent time. An example of the procedure of deciding the transmission power of a UE when the reduction in interference caused by the UE is emphasized will be described with reference to FIGS. 23 and 24.

The cell that increases or decreases its transmission power through a plurality of stages does not notify the UE of the RS transmission power after it has increased or decreased the transmission power but notifies the UE of the RS transmission power every time it increases or decreases the transmission power. When increasing its transmission power, the cell increases the transmission power and then notifies the UE of the RS transmission power. When decreasing its transmission power, the cell notifies the UE of the RS transmission power and then decreases the transmission power.

The period in which the RS transmission power (RS-TP (eNB)) can be modified may be equal to or longer than the period in which the cell can notify the UE of the RS transmission power (RS notification power RS-RP (eNB)). Consequently, the UE can be notified of the RS transmission power every time the RS transmission power is increased or decreased.

According to Non-Patent Document 10, the RS transmission power is notified over RRC signaling, specifically, is notified using the parameter "referenceSignalPower". "referenceSignalPower" is mapped to a "pdsch-ConfigCommon" message. "pdsch-ConfigCommon" is mapped to a "radioResourceConfiguCommon" message. "radioResourceConfiguCommon" is mapped to the SIB2 of the system information to be notified to all the UEs being served by the cell. The system information is modified by "modification period" that is the modification period of the system information.

This embodiment will therefore disclose that the period in which the RS transmission power (RS-TP (eNB)) can be modified is set to be equal to or longer than "modification period." This changes the period in which the RS transmission power (RS-TP (eNB)) can be modified to the period in which the cell can notify the UE of the RS transmission power (RS notification power RS-RP (eNB)) or a longer period, so that the UE can be notified of the RS transmission power every time the RS transmission power is increased or decreased.

This method updates the notification of the RS transmission power every time the transmission power is increased or decreased, thereby reducing a time period in which an error occurs in the evaluation of a path loss by the UE side. Also, a possibility that the UE will overestimate a path loss is reduced, thereby reducing a probability that the UE will transmit the power equal to more than the power required for the eNB side. This can restrict the interference caused by the UE when the transmission power is gradually increased or decreased.

(2) Case where Communication Quality of UE is Emphasized

Figure 25:
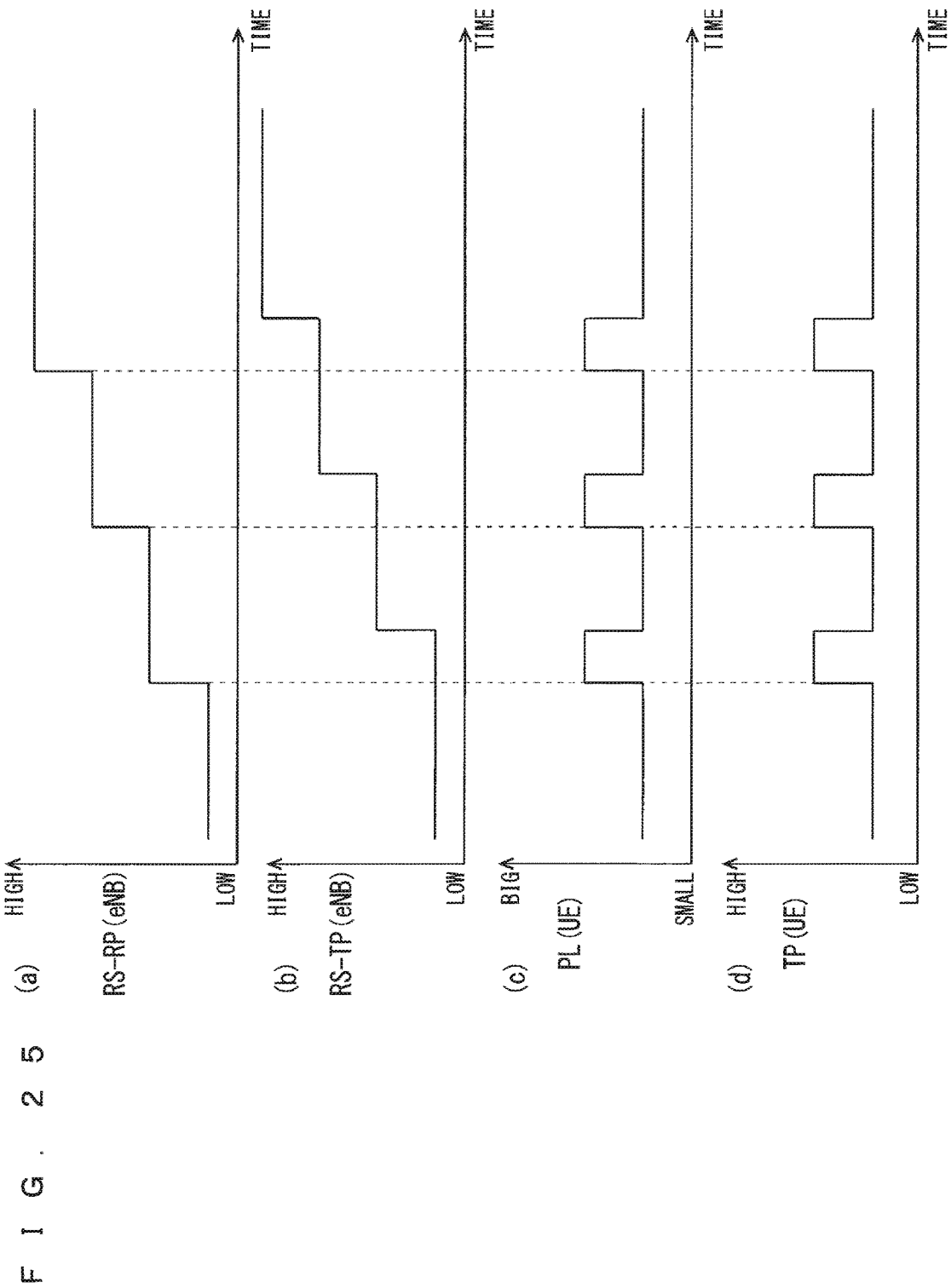
FIG. 25 shows another example of the procedure of deciding the transmission power of the UE in the fourth embodiment of the present invention.
Figure 26:
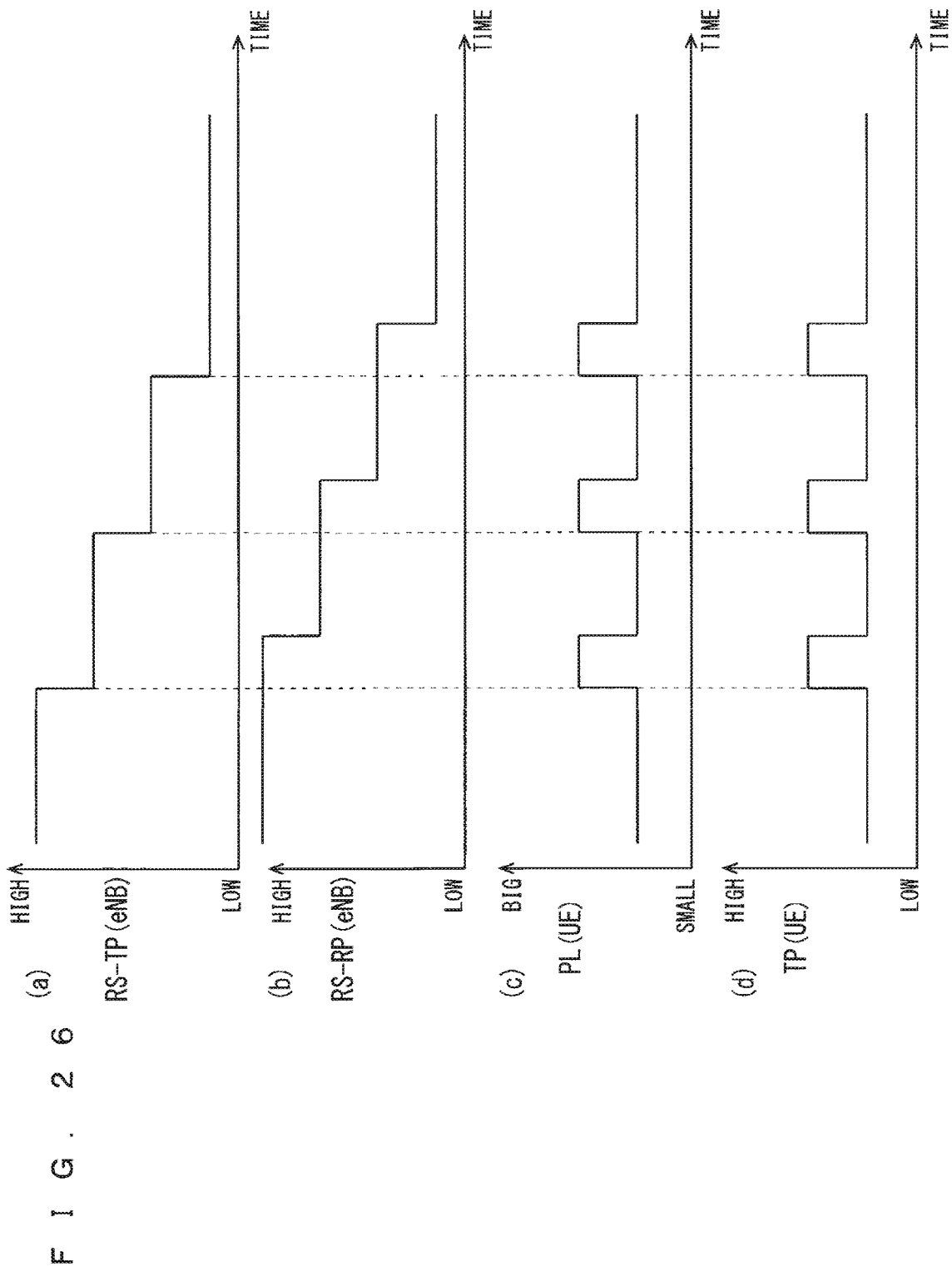
FIG. 26 shows the other example of the procedure of deciding the transmission power of the UE in the fourth embodiment of the present invention.

FIGS. 25 and 26 show an example of the procedure of deciding the transmission power of a UE in the fourth embodiment of the present invention. The vertical axes of FIGS. 25(a) and 26(b) represent the RS notification power RS-RP (eNB) from an eNB, the vertical axes of FIGS. 25(b)

and 26(*a*) represent the RS transmission power RS-TP (eNB) from the eNB, the vertical axes of FIGS. 25(*c*) and 26(*c*) represent the path loss PL (UE) calculated by the UE, and the vertical axes of FIGS. 25(*d*) and 26(*d*) represent the transmission power TP (UE) of the UE. The horizontal axes of FIGS. 25(*a*) to 25(*d*) and FIGS. 26(*a*) to 26(*d*) represent time. An example of the procedure of deciding the transmission power of a UE when the communication quality of the UE is emphasized will be described with reference to FIGS. 25 and 26.

The cell that increases or decreases its transmission power through a plurality of stages does not notify the UE of the RS transmission power after it has increased or decreased the transmission power but notifies the UE of the RS transmission power every time it increases or decreases the transmission power. When increasing its transmission power, the cell notifies the UE of the RS transmission power and then increases the transmission power. When decreasing the transmission power, the cell decreases the transmission power and then notifies the UE of the RS transmission power.

This method updates the notification of the RS transmission power every time the transmission power is increased or decreased, thereby reducing a time period in which an error occurs in the evaluation of a path loss by the UE side. Also, a possibility that the UE will underestimate a path loss is reduced, thereby reducing a probability that the transmission power of the UE will become scarce on the eNB side. This improves the communication quality of the UE when the transmission power is gradually increased or decreased.

Fifth Embodiment

A UE adjacent to the antenna of an ES cell, whose serving cell is a Comp cell, performs transmission with high uplink transmission power while the ES cell switches itself off. When the ES cell has started switch-on and transitioned to the switch-on state, the UE which is within the coverage of the ES cell and whose serving cell is a Comp cell accesses the ES cell. For a plurality of UEs whose serving cell is a Comp cell, the UEs individually access the ES cell at different timings. In this case, the uplink of the UE adjacent to the antenna of the ES cell, whose serving cell is a Comp cell, may interfere with the uplink of the UE that will access the ES cell. This leads to a problem that the process of the UE that is accessing the ES cell or the UE that begins to access the ES cell is not performed normally. This embodiment will disclose the method of solving this problem.

The uplink transmission power with which the UE to be offloaded from the Comp cell to the ES cell accesses the ES cell is fixed. The following three, (1) to (3), will be disclosed as specific examples of the entity that decides a fixed value of the uplink transmission power and the method of notifying the UE.

(1) A Comp cell sets a fixed value and notifies a UE in advance.

(2) An ES cell sets a fixed value and notifies a UE via a Comp cell in advance.

(3) An O&M sets cell sets a fixed value and notifies a UE via a Comp cell in advance.

The fourth embodiment has disclosed that the cell that increases or decreases its transmission power through a plurality of stages does not notify the UE of the RS transmission power after it has increased or decreased the transmission power but notifies the UE of the RS transmission power every time it increases or decreases the transmission power.

In this case, the transmission power with which the UE starts accessing the ES cell is obtained by the UE deriving a path loss from the ES cell and using the path loss to decide the transmission power. The transmission power of the UE adjacent to the ES cell is accordingly low. The UE adjacent to the antenna of the ES cell, whose serving cell is a Comp cell, performs transmission with high uplink transmission power, and thus, interferes with the UE that will access the ES cell.

By setting the uplink transmission power with which the UE accesses the ES cell to a fixed value, the transmission power of the UE adjacent to the ES cell can be prevented from becoming low. This reduces effects of the interference from the UE whose serving cell is a Comp cell.

The method in which a Comp cell notifies a UE of the fixed value will be disclosed. The fixed value is notified over dedicated signaling. For example, the fixed value may be notified together with a HO command message notified by the Comp cell for causing the UE to be offloaded to the ES cell or may be notified by being included in the HO command message. The Comp cell is aware that the UE is caused to perform HO to the ES cell. This enables setting of a fixed value for use in access to the ES cell.

The method in which an ES cell notifies a UE of the fixed value via a Comp cell will be disclosed. The ES cell notifies the Comp cell of the fixed value over X2 signaling. For example, when the UE is offloaded, the fixed value may be notified together with a HO request response message notified to the Comp cell by the ES cell or may be notified by being included in the HO request response message. The Comp cell that has received the fixed value may notify the UE of the fixed value together with a HO command message notified by the Comp cell for causing the UE to be offloaded to the ES cell or may be notified by including the fixed value in the HO command message. The ES cell is aware that the UE will perform HO to its own cell. This allows setting of a fixed value for use in access to the ES cell.

The method in which an O&M notifies a UE of the fixed value via a Comp cell will be disclosed. The O&M notifies the Comp cell of the fixed value via the MME. S1 signaling may be used in the notification from the MME to the Comp cell. The O&M may notify the Comp cell of the fixed value in setup of the Comp cell or update of the Comp cell configuration. Alternatively, the fixed value may be obtained from the O&M when the Comp cell decides to end the compensation of the coverage of the ES cell or receives a command to start ending the compensation of the coverage. The Comp cell sets the fixed value for the UE that is caused to perform HO to the ES cell. The Comp cell that has received the fixed value may notify the UE of the fixed value together with a HO command message notified by the Comp cell for causing the UE to be offloaded to the ES cell or by including the fixed value in the HO command message.

The following four, (1) to (4), will be disclosed as specific examples of the period in which the fixed value is used as the uplink transmission power for the UE to access the ES cell.

(1) Until a Comp cell ends compensating for the coverage of an ES cell. In other words, until the Comp cell returns to the normal state.

The Comp cell may notify the UE that the Comp cell has returned to the normal state via the ES cell. X2 signaling may be used in the notification from the Comp cell to the ES cell. The state information indicative of whether the cell is in the coverage compensating state or normal state is provided in the X2 message. The Comp cell may configure the state information in the X2 message and notify the ES cell of the state information. The ES cell notifies the UE of the received state information of the Comp cell.

When the Comp cell ends compensating for the coverage and is in the normal state, no UE is connected with the Comp cell adjacent to the antenna of the ES cell. Therefore, no uplink interference occurs from the UE being served by the Comp cell.

(2) Until a predetermined period elapses. The predetermined period may be configured as a timer.

After receiving a fixed value, the UE performs transmission with the uplink transmission power set to the fixed value until the predetermined period elapses. After the predetermined period elapses, the UE performs transmission with the uplink transmission power derived by the normal method of deciding uplink transmission power.

The predetermined period may be notified to the UE together with a fixed value. The entity that decides a fixed value of the uplink transmission power and the method disclosed in the specific examples of the method of notifying the UE of the fixed value are applicable to the entity that decides a predetermined period and the method of notifying the UE of the predetermined period.

The Comp cell advances the shift to the normal state along with the lapse of a predetermined period, and accordingly, no UE is connected with the Comp cell adjacent to the antenna of the ES cell. Therefore, no uplink interference occurs from the UE being served by the Comp cell. This method can reduce a signaling amount.

(3) Until the received power or reception quality of the Comp cell through the measurement by the UE falls below a predetermined threshold.

The UE decides to perform measurement by itself and then performs measurement. The entity that decides a fixed value of the uplink transmission power and the method disclosed in the specific examples of the method of notifying the UE of the fixed value are applicable to the entity that decides a predetermined period and the method of notifying the UE of the predetermined period.

A target UE can directly measure and recognize whether the Comp cell has ended compensating for the coverage and has returned to the normal state or whether the interference from the Comp cell is an issue. This increases such a success probability that the UE will successfully access the ES cell when durations up to the end of the compensation of the coverage of the Comp cell vary.

(4) Until the ES cell notifies the UE that the ES cell will cause the UE to return to the configuration of normal uplink transmission power.

Disclosed below is a method in which the ES cell judges to cause the UE to return to the configuration of normal uplink transmission power. The ES cell notifies the UE of the measurement in which the Comp cell has been configured and causes the UE to report the measurement when an event occurs. The ES cell uses the measurement report to judge that it will cause the UE to return to the configuration of normal uplink transmission power. The threshold for the occurrence of an event may be decided by the ES cell and notified to the UE in a message for measurement. The ES cell can use the result directly measured by the UE. This achieves effects similar to those of the specific example (3).

Disclosed below is another method in which the ES cell judges to cause the UE to return to the configuration of normal uplink transmission power. The ES cell measures uplink interference and, when the uplink interference falls below a predetermined value, judges to cause the UE to return to the configuration of normal uplink transmission power. This allows the ES cell to directly measure and recognize whether the Comp cell has ended compensating for the coverage and has returned to the normal state or whether the interference from the Comp cell is not an issue, without requiring the measurement by the UE.

The use of the methods disclosed in this embodiment reduces effects of the interference with the UE that will access the ES cell even if there is a UE adjacent to the antenna of the ES cell, whose serving cell is a Comp cell. The process by the UE that is accessing the ES cell or the UE that begins to access the ES cell can be executed normally. Therefore, RRC connection can be continued, thereby reducing the degradation in user experience.

The methods above are also applicable to the case in which the UE performs RRC connection reestablishment with the ES cell, thereby achieving effects similar to those of the specific example (4).

The methods above are also applicable to the case in which the UE in the RRC_Idle state is connected to the ES cell. This enables the ES operation without reduction in performance, which is the performance of establishing connection with the cell, of the UE in the RRC_Idle state during the ES operation.

Sixth Embodiment

The problem solved in a sixth embodiment will be described below. As described in the first embodiment with reference to FIG. 8, coverage holes may occur that do not belong to the coverage of any cell in the compensating eNB(s) deployment scenario.

When a coverage hole occurs, the following problem will arise. Considered here is a UE that can obtain service in the ES cell while the ES cell is operating. Despite the fact that the UE is not moving, the location in which the UE is located will not belong to the coverage of any cell by the ES cell switching itself off. That is to say, the UE is not located in the cell that can offer service, and thus cannot obtain service. It is necessary in the communication system to find coverage holes early and to pursue the construction of a network in which no coverage holes occur.

3GPP is discussing logged measurement (see Non-Patent Document 12). In logged measurement, the UE in the idle state logs the results of measuring the intensity of a downlink reference signal. In logged measurement, measurement results are logged periodically. The period of logged measurement is configurable. The logged measurement area is configurable. After a logged measurement area is configured in the logged measurement configuration message notified to the UE by the E-UTRAN, the UE located in the logged measurement area performs logged measurement.

The logged measurement areas include (1) up to 32 types of global cell identities (GCIs), (2) up to 8 types of tracking areas (TAs), (3) up to 8 types of location areas (LAs), and (4) up to 8 types of routing areas (RAs).

The UE continues logged measurement in accordance with the logged measurement configuration message until the amount of information stored in the memory for minimization of drive tests (MDT) within the UE reaches the storage capacity of the memory. The logged measurement includes a measurement result, a timestamp, and location information.

The upper limit of the number of adjacent cells to be logged, that is, neighbor cells, is defined. Specifically, (1) the fixed upper limit of intra-frequency neighbor cells is "6," (2) the fixed upper limit of inter-frequency neighbor cells is "3," (3) the fixed upper limit of GSM (registered trademark)/EDGE radio access network (GERAN) neighbor cells is "3,"

(4) the fixed upper limit of UTRAN (non-serving) neighbor cells is "3," (5) the fixed upper limit of E-UTRAN (non-serving) neighbor cells is "3," and (6) the fixed upper limit of CDMA 2000 (non-serving) neighbor cells is "3."

Logged measurement is executed only during the period until the amount of information stored in the memory for minimization of drive tests within the UE reaches the storage capacity of the memory. If logged measurement is executed without any contrivance, therefore, the storage capacity of the memory may have been reached when the UE arrives at the area in which coverage holes may be present. As a result, logged measurement may not be executed. This leads to a problem that the E-UTRAN cannot obtain the logged measurement adjacent to the coverage holes.

The solution to the problem above in the sixth embodiment will be described below. The E-UTRAN configures an energy saving area as the logged measurement area for the UE. The UE that has received the logged measurement area executes logged measurement in the configured logged measurement area. That is to say, the UE executes logged measurement in the energy saving area. The E-UTRAN that has obtained the logged measurement in the energy saving area judges the presence or absence of coverage holes and, when there are coverage holes, performs adjustment so as to eliminate the coverage holes.

The following four, (1) to (4), will be disclosed as specific examples of the energy saving area.

(1) A TA to which an ES cell and a Comp cell belong, an LA to which the ES cell and the Comp cell belong, and an RA to which the ES cell and the Comp cell belong.

(2) Energy saving set (cell) list or list of PCIs or CGIs of ES cells.

(3) Compensation set (cell) list or list of PCIs or CGIs of Comp cells. When the ES cell shifts to the switch-off state and the Comp cell compensates for the coverage of the ES cell, coverage holes are likely to occur. Thus, the list may be a list of Comp cells that compensate for the coverage of the ES cell that has shifted to the switch-off state. When the PCIs are changed before Comp and after Comp, the list may be a list of PCIs after Comp.

(4) Combination of (1) to (3) above.

Considered here as an example is the case in which an energy saving area is configured as a logged measurement area. The operation of the UE when the combination of an energy saving set list and a compensation set list is configured as the energy saving area will be described with reference to FIG. 27.

Figure 27:
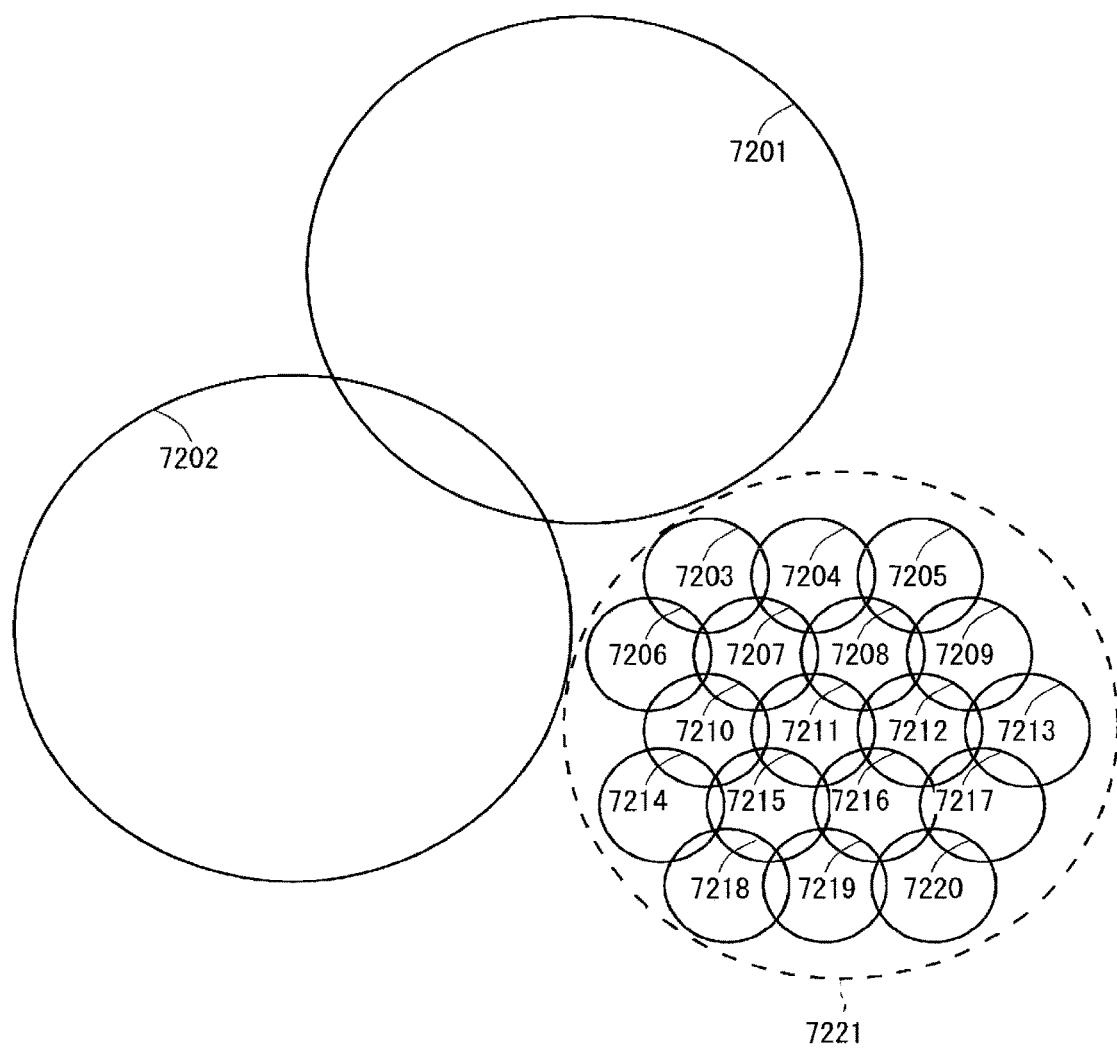
FIG. 27 is a diagram for explaining the operation of a UE when the combination of an energy saving set list and a compensation set list is configured as an energy saving area.

FIG. 27 is a diagram for explaining the operation of the UE when the combination of an energy saving set list and a compensation set list is configured as an energy saving area.

With reference to FIG. 27, the coverages of normal macro cells are represented by references "7201" and "7202." The coverages of ES cells are represented by references "7203," "7204," "7205," "7206," "7208," "7209," "7210", "7211," "7213," "7214," "7215," "7216," "7217," "7219," and "7220." The coverages of Comp cells are represented by references "7207," "7212," and "7218." With reference to FIG. 27, the portion circled by a dashed line, represented by reference "7221," is substantially an energy saving area.

It is first assumed that the UE takes the macro cell having the coverage represented by reference "7201" as a serving cell. The macro cell is not included in the logged measurement area. The macro cell does not belong to the energy saving area. The PCI or the like of the macro cell does not match the PCI configured as the logged measurement area. The UE accordingly does not execute logged measurement.

It is next assumed that the UE re-selects an ES cell having the coverage represented by reference "7203." The ES cell is included in the logged measurement area. The ES cell belongs to the energy saving area. The PCI or the like of the ES cell matches the PCI configured as the logged measurement area. The UE accordingly executes logged measurement. In other words, the UE starts logged measurement.

It is next assumed that the UE re-selects the macro cell having the coverage represented by reference "7202." The macro cell is not included in the logged measurement area. The macro cell does not belong to the energy saving area. The PCI or the like of the macro cell does not match the PCI configured as the logged measurement area. The UE accordingly does not execute logged measurement. In other words, the UE stops logged measurement.

The following will be disclosed as a specific example of judgment of the presence or absence of a coverage hole. If a timestamp or a measurement place of the logged measurement includes only cells having a reference signal intensity of a predetermined threshold or smaller, this measurement place is judged as a coverage hole. If both of the serving cell and the neighbor cell have a reference signal intensity of a predetermined threshold or smaller in a timestamp or a measurement place of the logged measurement, this measurement place may be judged as a coverage hole.

The following two, (1) and (2), will be disclosed as specific examples of the entity that judges the presence or absence of a coverage hole.

(1) eNB (cell), which is an eNB that has received logged measurement from a UE.

(2) Operation and Maintenance (O&M). An eNB that has received logged measurement from a UE transmits the logged measurement to the O&M.

The following two, (1) and (2), will be disclosed as specific examples of the method of performing adjustment so as to eliminate a coverage hole.

(1) The transmission power of a cell (Comp cell) that is to cover a measurement place judged as a coverage hole is increased.

(2) The transmission power of a cell closest to a measurement place judged as a coverage hole is increased.

In both of the specific examples (1) and (2) of the method, transmission power may be increased immediately after it is judged that there is a coverage hole, or transmission power may be increased when the ES cell switches itself off next and the Comp cell compensates for the coverage of the ES cell.

Figure 28:
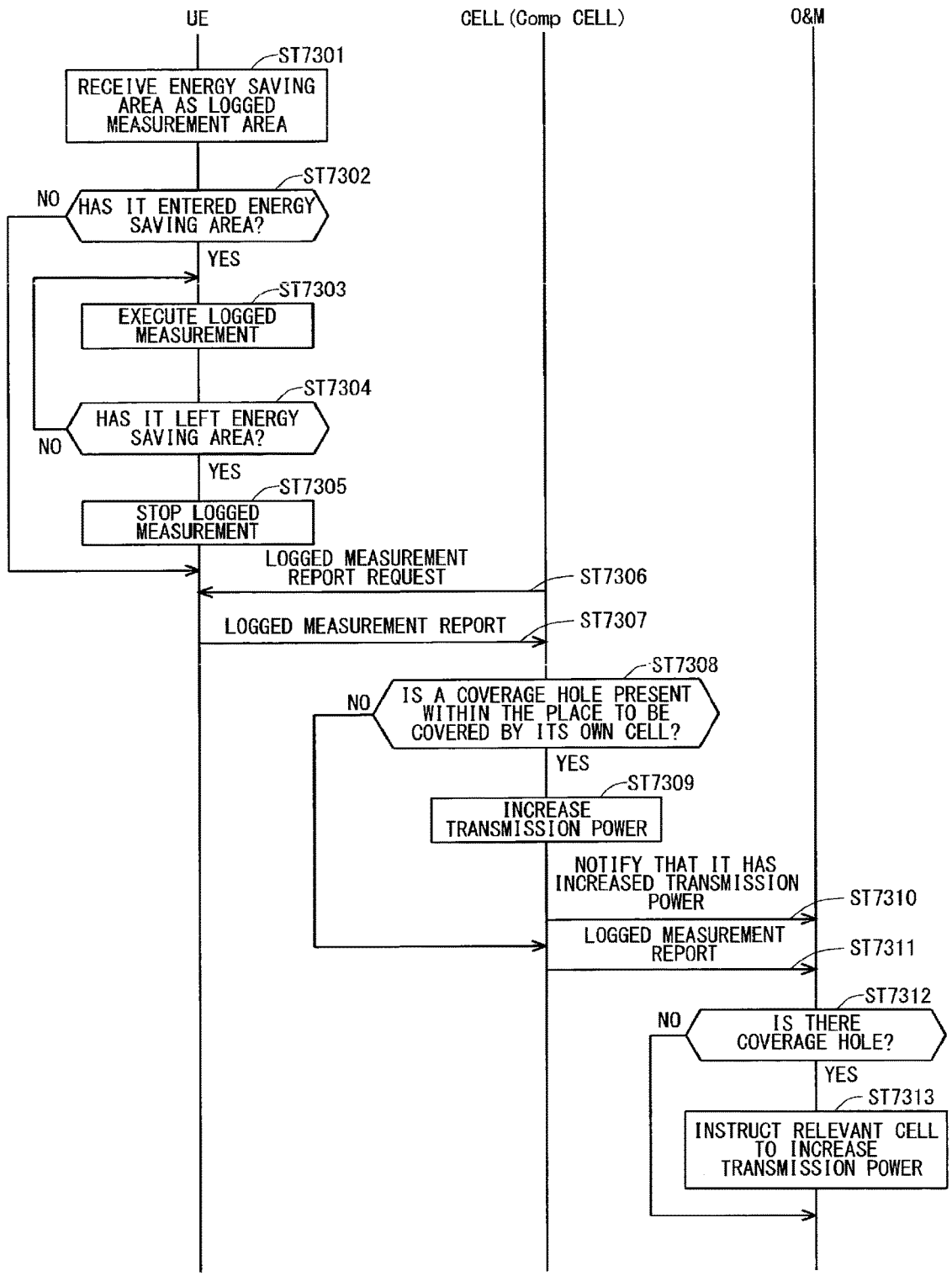
FIG. 28 shows an example of the sequence of an ES process in a communication system according to a sixth embodiment of the present invention.

FIG. 28 shows an example of the sequence of an ES process in a communication system according to the sixth embodiment of the present invention.

In Step ST7301, the UE receives an energy saving area as a logged measurement area of a MDT measurement configuration.

In Step ST7302, the UE judges whether it has entered the logged measurement area. That is to say, the UE judges whether it has entered the energy saving area. The UE moves to Step ST7303 when judging that it has entered the energy saving area or moves to Step ST7306 when judging that it has not entered the energy saving area.

The UE judges whether it has entered the energy saving area based on, for example, whether the PCI of a serving cell matches the PCI configured as the logged measurement area. Alternatively, the UE judges whether a TA matches a TA configured as the logged measurement area. The UE judges that it has entered the logged measurement area when the PCI of the serving cell matches the PCI configured as the logged measurement area or judges that it has not entered the logged measurement area when the PCI of the serving cell does not match the PCI configured as the logged measurement area.

In Step ST7303, the UE executes logged measurement. The UE logs, for example, a timestamp, location information, and the measurement result of the intensity of a downlink reference signal between the serving cell and a neighbor cell.

In Step ST7304, the UE judges whether it has left the logged measurement area. That is to say, the UE judges whether it has left the energy saving area. The UE moves to Step ST7305 when judging that it has left the energy saving area or returns to Step ST7303 when judging that it has not left the energy saving area. The UE judges whether it has left the energy saving area based on, for example, whether the PCI of the serving cell matches the PCI configured as the logged measurement area. The UE judges that it has not left the logged measurement area when the PCI of the serving cell matches the PCI configured as the logged measurement area or judges that it has left the logged measurement area when the PCI of the serving cell does not match the PCI configured as the logged measurement area.

In Step ST7305, the UE stops logged measurement. Although the UE originally returns to Step ST7302 and repeats the processes above after ending the process of Step ST7305, its illustration and description will be omitted for easy understanding.

In Step ST7306, the UE receives a logged measurement report request message transmitted from the serving cell. One specific example of the serving cell is a Comp cell. The logged measurement report request message may not be executed at the timing above and may be executed any time.

In Step ST7307, the UE notifies the Comp cell being a transmission source of the logged measurement report request message of a logged measurement report message.

In Step ST7308, the Comp cell judges whether a coverage hole is present in the logged measurement of the UE. For example, the Comp cell judges whether a coverage hole is present at a measurement place (measurement position) that is to be covered by its own cell. The Comp cell moves to Step ST7309 when judging that a coverage hole is present at the measurement place that is to be covered by its own cell or moves to Step ST7311 when judging that no coverage hole is present at the measurement place that is to be covered by its own cell.

In Step ST7309, the Comp cell increases the transmission power and performs adjustment so as to eliminate a coverage hole.

In Step ST7310, the Comp cell notifies the O&M that it has increased the transmission power in Step ST7309.

In Step ST7311, the Comp cell notifies the O&M of the logged measurement report message received in Step ST7307. Together with the logged measurement report message, the Comp cell may notify the presence or absence of a coverage hole in the logged measurement of the UE, which has been processed in Step ST7308, as a judgment result.

In Step ST7312, the O&M judges whether a coverage hole is present in the logged measurement of the UE. The O&M moves to Step ST7313 when judging that a coverage hole is present or ends the process when judging that no coverage hole is present.

In Step ST7313, the O&M instructs the cell that is to cover the measurement place of the coverage hole to increase the transmission power.

Figure 29:
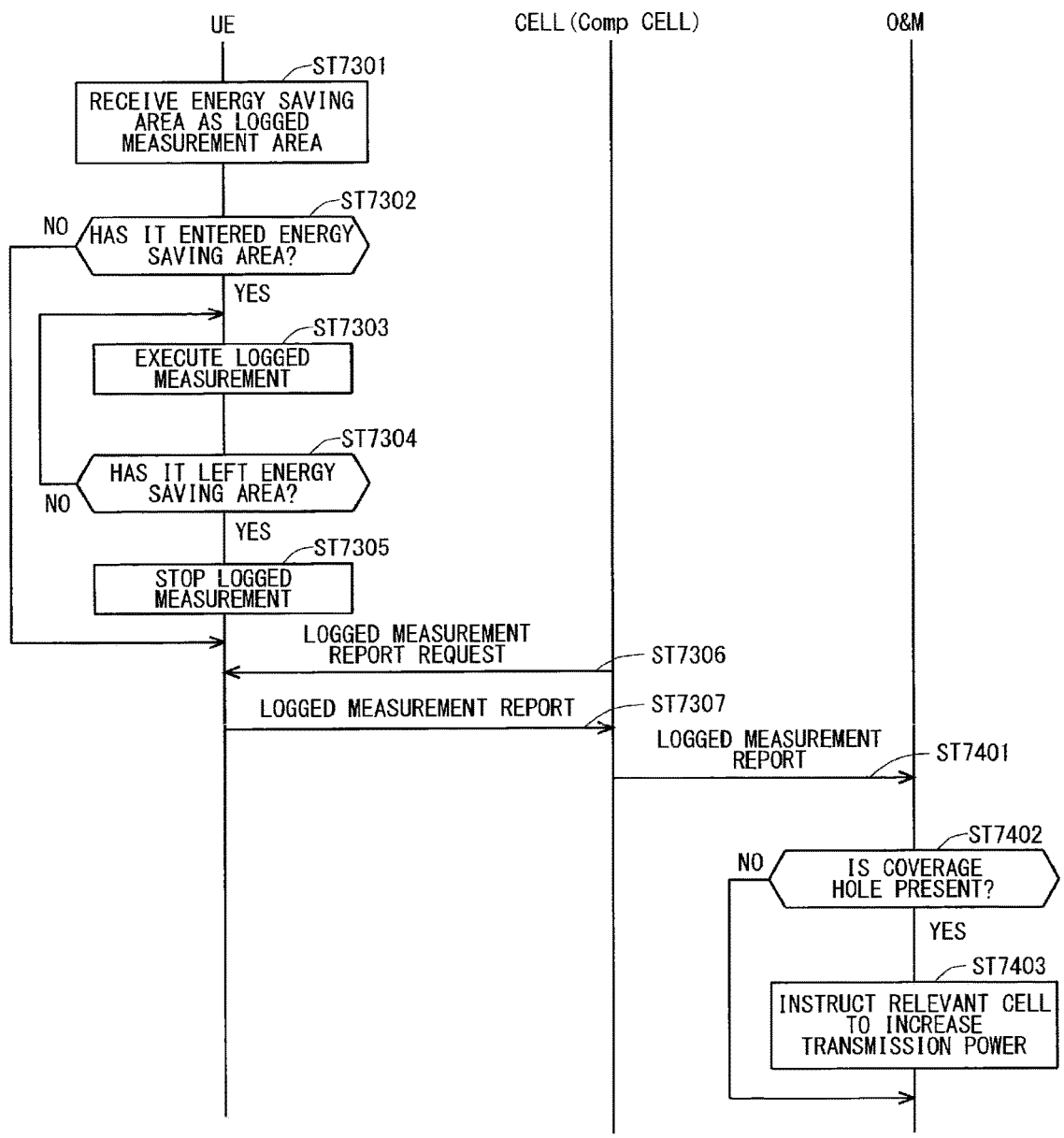
FIG. 29 shows another example of the sequence of the ES process in the communication system according to the sixth embodiment of the present invention.

FIG. 29 shows an example of the sequence of the ES process in the communication system according to the sixth embodiment of the present invention. The sequence shown in FIG. 29 is similar to the sequence shown in FIG. 28, and thus, the steps corresponding to those of FIG. 28 will be denoted by the same step numbers, and common description will be omitted.

In Step ST7401, the Comp cell notifies the O&M of the logged measurement report message received in Step ST7307.

In Step ST7402, the O&M judges whether a coverage hole is present in the logged measurement of the UE. The O&M moves to Step ST7403 when judging that a coverage hole is present or ends the process when judging that no coverage hole is present.

In Step ST7403, the O&M instructs the cell that is to cover the measurement place of a coverage hole to increase the transmission power.

The sixth embodiment can achieve the following effects. The sixth embodiment solves such inconvenience that the memory for minimization of drive tests within the UE reaches the storage capacity and logged measurement cannot be executed in the area where a coverage hole may be present. Logged measurement is executed in the area where a coverage hole may be present, and thus, whether a coverage hole is present can be judged from the logged measurement. As a result, a coverage hole can be found early, allowing the construction of a network in which no coverage hole occurs.

First Modification of Sixth Embodiment

The problem solved in a first modification of the sixth embodiment will be described below. Conceivably, a portion in which a coverage hole is present is relatively small. Therefore, the following problem arises in the case of one type of measurement period as in a conventional case.

When a relatively short measurement period is configured in accordance with the portion where a coverage hole is present, the amount of information stored in the memory for MDT may conceivably reach the storage capacity of the memory in a short period of time. The network side may accordingly fail to obtain the logged measurement of an intended UE. When the network side uses the logged measurement of the UE in the construction of a communication system, a problem that a communication system cannot be constructed efficiently arises.

When the measurement period is configured in accordance with a portion other than the portion where a coverage hole is present, meanwhile, the following problem arises: measurement is not executed in the portion where a coverage hole is present, and a coverage hole cannot be found using the MDT.

The solution in the first modification of the sixth embodiment will be described below. This modification will describe only the characteristic part of this modification of the solution of the sixth embodiment. In the logged measurement, a plurality of logged measurement areas are provided, each of which is set as a measurement period per logged measurement area.

Specific examples of a plurality of logged measurement areas will be disclosed below. Among a plurality of logged measurement areas, one logged measurement area is configured as an energy saving area. Specific examples of the energy saving area are similar to those of the sixth embodiment, and thus, description thereof will be omitted.

In place of providing a plurality of logged measurement areas, an area specified in the logged measurement area and any other area may be provided. In that case, the area specified in the logged measurement area may be configured as an energy saving area.

Specific examples of the measurement period per logged measurement area will be disclosed below. A period for energy saving area and a period for any other area are provided. The period for energy saving area may be set to be shorter than the area for any other area.

Figure 30:
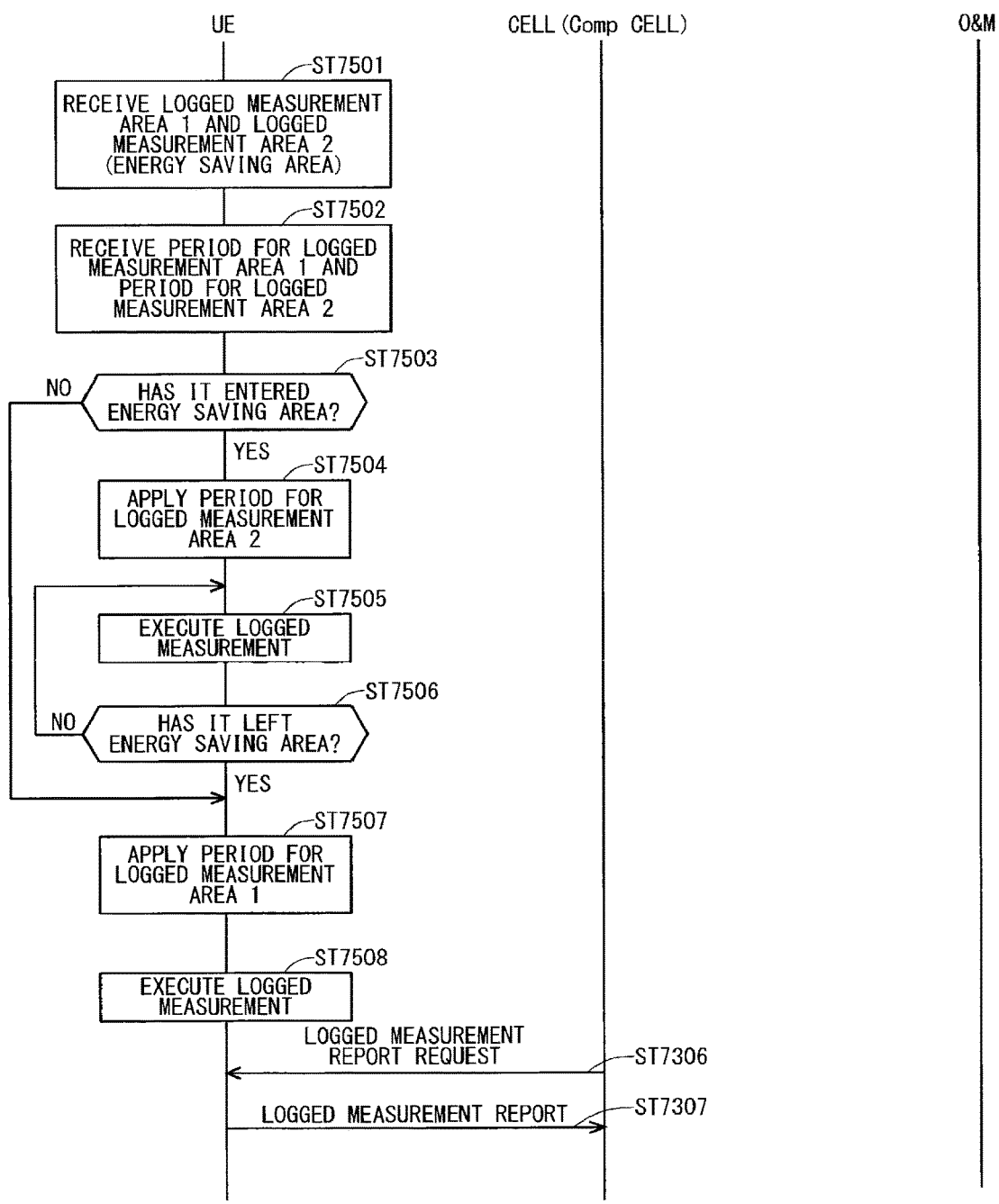
FIG. 30 shows an example of the sequence of an ES process in a communication system according to a first modification of the sixth embodiment of the present invention.

FIG. 30 shows an example of the sequence of an ES process in a communication system according to the first modification of the sixth embodiment of the present invention. The sequence shown in FIG. 30 is similar to the sequence shown in FIG. 28, and thus, the steps corresponding to those of FIG. 28 will be denoted by the same step numbers, and common description will be omitted. Although FIG. 30 omits the illustration of Step ST7308 and the following steps of FIG. 28 to show only the characteristic part of this modification, also in this modification, the process of Step ST7308 and the following steps of FIG. 28 will be executed similarly.

In Step ST7501, the UE receives a logged measurement area 1 and a logged measurement area 2 as the logged measurement areas of a MDT measurement configuration. The UE receives an energy saving area as the logged measurement area 2.

In Step ST7502, the UE receives a period for logged measurement area 1 and a period for logged measurement area 2 as the measurement periods of the MDT measurement configuration. The UE may receive the period for logged measurement area 2 as the period for energy saving area.

In Step ST7503, the UE judges whether it has entered the logged measurement area 2. That is to say, the UE judges whether it has entered the energy saving area. The UE moves to Step ST7504 when judging that it has entered the energy saving area or moves to Step ST7507 when judging that it has not entered the energy saving area. The UE judges whether it has entered the energy saving area based on whether the PCI of the serving cell matches the PCI configured as the logged measurement area 2. The UE judges that it has entered the logged measurement area 2 when the PCI of the serving cell matches the PCI configured as the logged measurement area 2 or judges that it has not entered the logged measurement area 2 when the PCI of the serving cell does not match the PCI configured as the logged measurement area 2.

In Step ST7504, the UE applies the period for logged measurement area 2. In Step ST7505, the UE executes logged measurement. The UE logs, for example, a timestamp, location information, and the measurement result of the intensity of a downlink reference signal between a serving cell and a neighbor cell in the period for logged measurement area 2.

In Step ST7506, the UE judges whether it has left the logged measurement area 2. That is to say, the UE judges whether it has left the energy saving area. The UE moves to Step ST7507 when judging that it has left the energy saving area or returns to Step ST7505 when judging that it has not left the energy saving area. The UE judges whether it has left the energy saving area based on whether the PCI of the serving cell matches the PCI configured as the logged measurement area 2. The UE judges that it has not left the logged measurement area 2 when the PCI of the serving cell matches the PCI configured as the logged measurement area 2 or judges that it has left the logged measurement area 2 when the PCI of the serving cell does not match the PCI configured as the logged measurement area 2.

In Step ST7507, the UE applies the period for logged measurement area 1. In Step ST7508, the UE executes logged measurement. The UE logs, for example, a timestamp, location information, and a measurement result of the intensity of a downlink reference signal between the serving cell and the neighbor cell in the period for logged measurement area 1. Although the UE originally returns to Step ST7503 and repeats the processes above after ending the process of Step ST7508, illustration and description thereof will be omitted for easy understanding.

The first modification of the sixth embodiment can achieve the following effects. Providing a plurality of measurement periods enables the execution of logged measurement in a short period in the energy saving area where logged measurement is required in a short measurement period and the execution of logged measurement in a normal period in any other area. This modification can solve such inconvenience that the memory for minimization of drive tests within the UE reaches the storage capacity and logged measurement cannot be executed in the area where a coverage hole may be present. Logged measurement is executed in the area where a coverage hole may be present, and thus, whether a coverage hole is present can be judged from the logged measurement. As a result, a coverage hole can be found early, and a network in which no coverage hole occurs can be constructed.

Second Modification of Sixth Embodiment

A second modification of the sixth embodiment will solve a similar problem to that of the first modification of the sixth embodiment. The solution in the second modification of the sixth embodiment will be described below. Among the solutions in the sixth embodiment and the first modification of the sixth embodiment, this modification will describe only the characteristic part of this modification. When judging the presence or absence of a coverage hole and then judging that a coverage hole is present, the UE executes logged measurement in a measurement period for a coverage hole.

Judgment on the presence or absence of a coverage hole is similar to that of the sixth embodiment, and thus, description thereof will be omitted. Herein, the threshold to be used to judge the presence or absence of a coverage hole is notified to the UE by the serving cell. The following two, (1) and (2), will be disclosed as specific examples of the notification method.

(1) The serving cell notifies, in the logged measurement configuration, the UE of a threshold to be used to judge the presence or absence of a coverage hole.

(2) The UE uses the value, which is notified to the UE by the serving cell as the received power value to start cell re-selection or the received power value to start measurement, as the threshold to be used to judge the presence or absence of a coverage hole. The specific example (2) is more effective than the specific example (1) of the notification method in that no new parameter needs to be notified and that radio resources can be used effectively.

A specific example of the measurement period for a coverage hole will be disclosed below. The period for a coverage hole may be configured to be shorter than the period for any other area. The period for a coverage hole and the period for any other area may be configured by the E-UTRAN. Alternatively, the period for a coverage hole may not be configured by the E-UTRAN but may be determined in advance.

Figure 31:
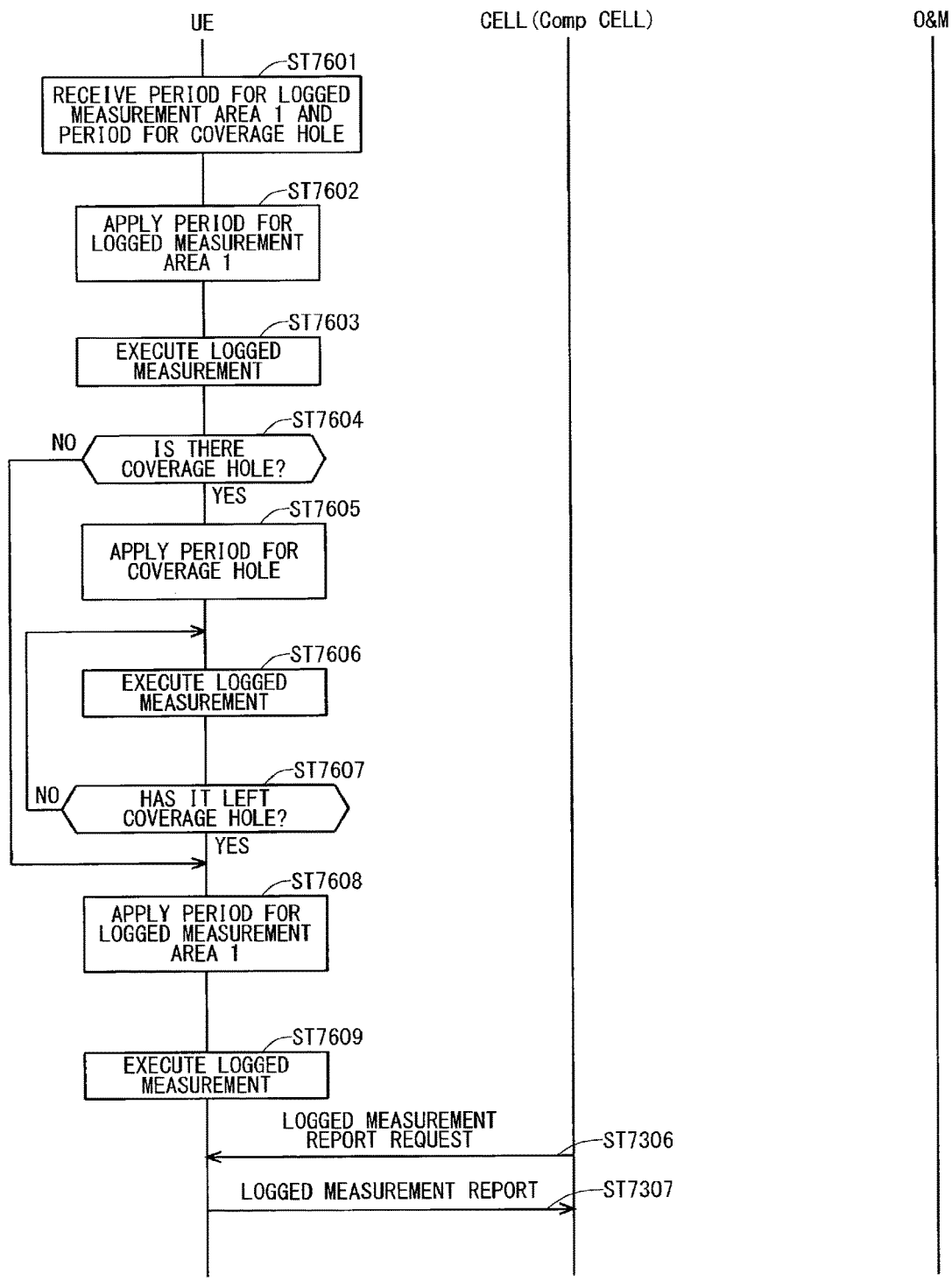
FIG. 31 shows an example of the sequence of an ES process in a communication system according to a second modification of the sixth embodiment of the present invention.

FIG. 31 shows an example of the sequence of an ES process in a communication system according to the second modification of the sixth embodiment of the present invention. The sequence shown in FIG. 31 is similar to the sequence shown in FIG. 28, and thus, the steps corresponding to those of FIG. 28 will be denoted by the same step numbers, and common description will be omitted.

Although FIG. 31 omits the illustration of Step ST7308 and the following steps of FIG. 28 to show only the characteristic part of this modification, this modification also executes the processes of Step ST7308 and the following steps of FIG. 28 in a similar manner.

In Step ST7601, the UE receives a period for a coverage hole and a period for any other area (period for logged measurement area 1) as the measurement periods of the MDT measurement configuration.

In Step ST7602, the UE applies the period for logged measurement area 1. In Step ST7603, the UE executes logged measurement. The UE logs, for example, a timestamp, location information, and a measurement result of the intensity of a downlink reference signal between a serving cell and a neighbor cell in the period for logged measurement area 1.

In Step ST7604, the UE judges whether a coverage hole is present in the logged measurement. The UE moves to Step ST7605 when judging that a coverage hole is present or moves to Step ST7608 when judging that no coverage hole is present.

In Step ST7605, the UE applies the period for a coverage hole. In Step ST7606, the UE executes logged measurement. The UE logs, for example, a timestamp, location information, and a measurement result of the intensity of a downlink reference signal between the serving cell and the neighbor cell in the period for a coverage hole.

In Step ST7607, the UE judges whether it has left the coverage hole. The UE judges whether it has left the coverage hole based on whether a coverage hole is present in the logged measurement. When a coverage hole is present, the UE judges that it has not left the coverage hole and returns to Step ST7606. When no coverage hole is present, the UE judges that it has left the coverage hole and moves to Step ST7608.

In Step ST7608, the UE applies the period for logged measurement area 1. In Step ST7609, the UE executes logged measurement. The UE logs a timestamp, location information, and a measurement result of the intensity of a downlink reference signal between the serving cell and the neighbor cell in the period for logged measurement area 1. Although the UE originally returns to Step ST7604 and repeats the processes above after ending the process of Step ST7609, illustration and description thereof will be omitted for easy understanding.

The second modification of the sixth embodiment can achieve effects similar to those of the first modification of the sixth embodiment.

Seventh Embodiment

The problem solved in a seventh embodiment, which is the same as that of the sixth embodiment, is a fear that switching off the ES cell may cause a coverage hole. This embodiment will disclose the method in which the network side detects the occurrence of a coverage hole.

Figure 32:
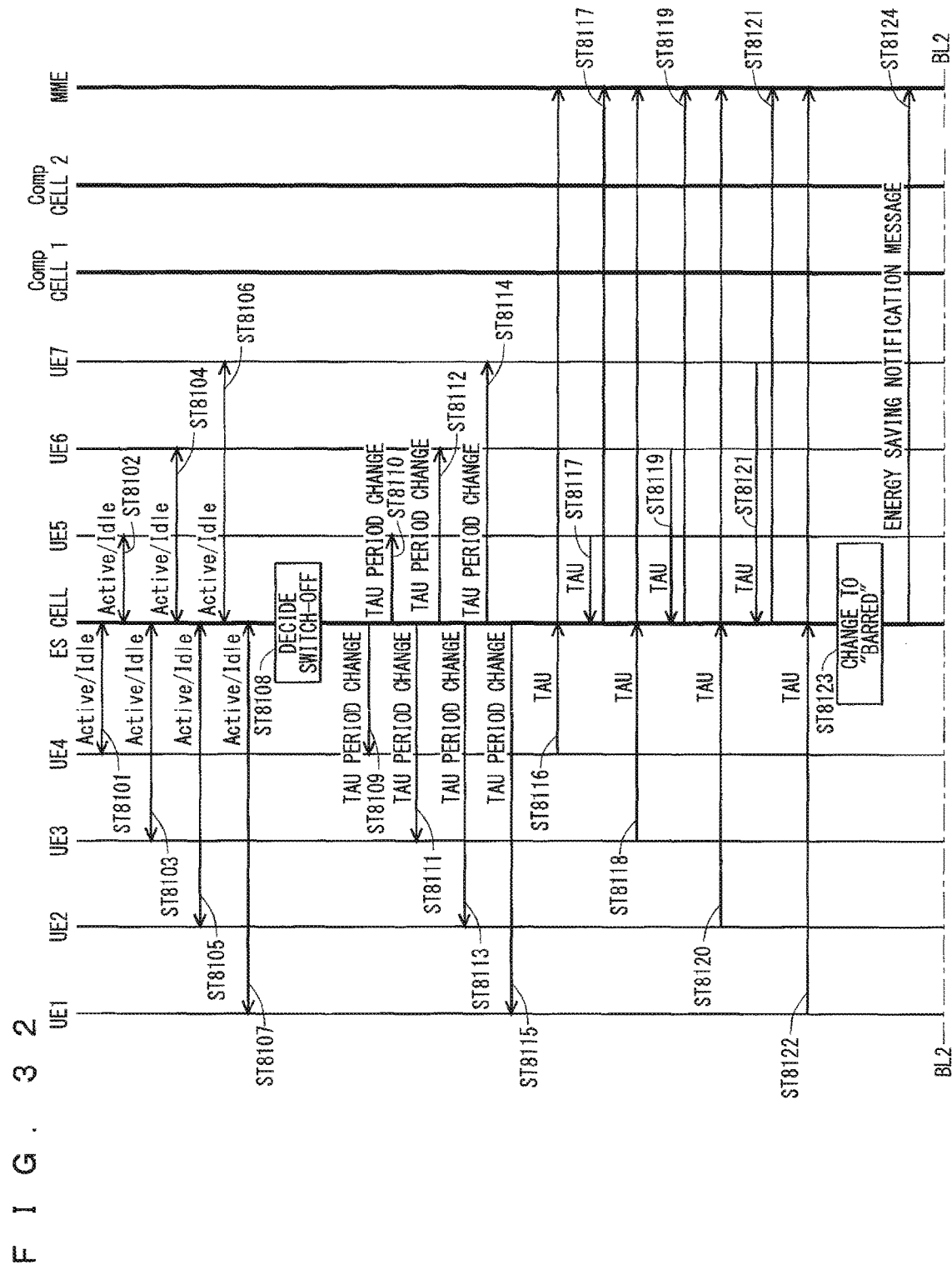
FIG. 32 shows an example of the sequence of an ES process in a communication system according to a seventh embodiment of the present invention.
Figure 33:
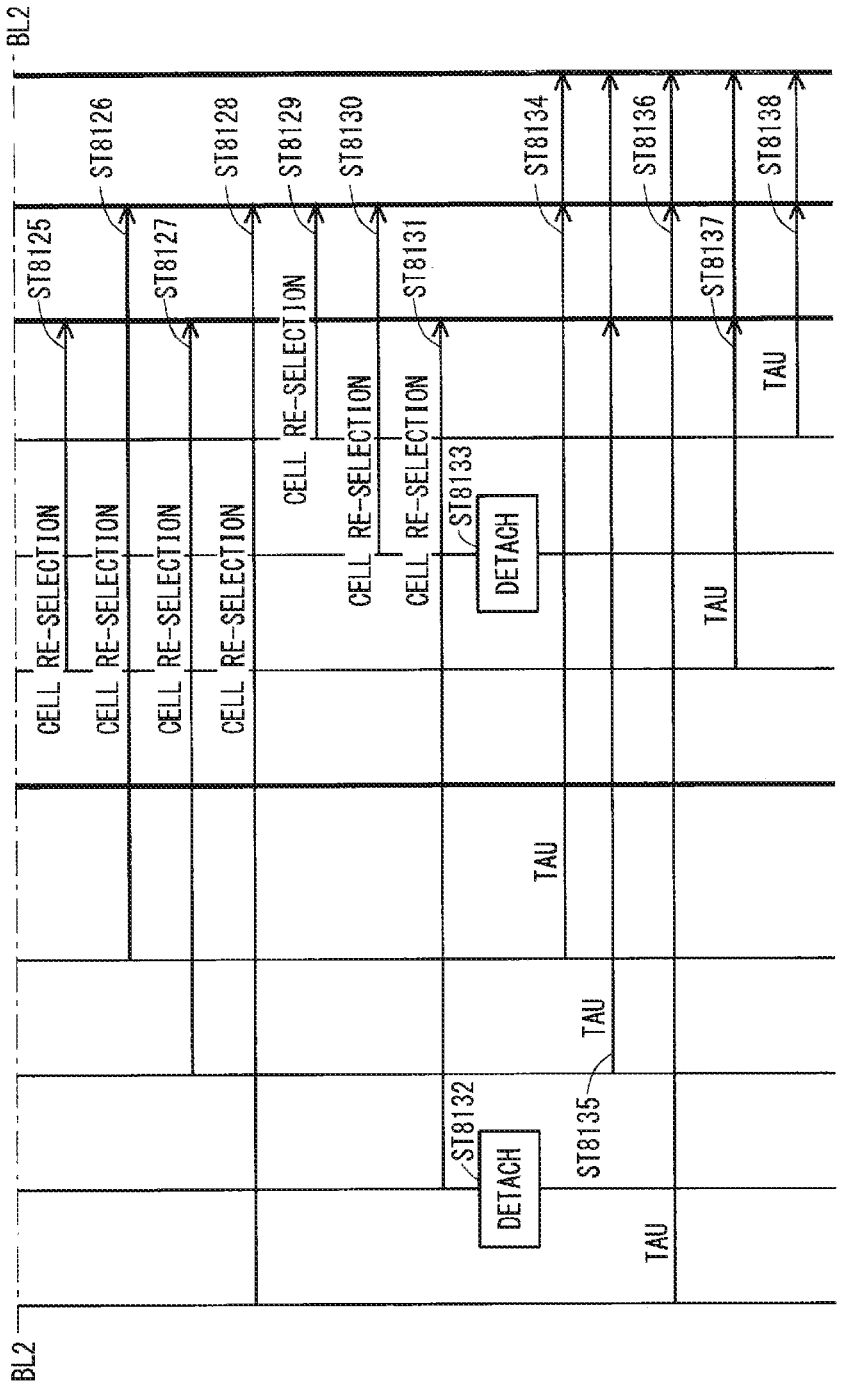
FIG. 33 shows the example of the sequence of the ES process in the communication system according to the seventh embodiment of the present invention.

FIGS. 32 and 33 show an example of the sequence of an ES process in a communication system according to the seventh embodiment of the present invention. FIG. 32 is continuous with FIG. 33 at a boundary BL2. FIGS. 32 and 33 show the procedure of determining whether a coverage hole has occurred when the ES cell switches itself off based on FIG. 17.

The following three, (1) to (3), will be disclosed as specific examples of the method of determining whether a coverage hole has occurred.

(1) The network side statistically judges that the UE in the active or idle state has entered the detach state in the cell before starting ES, thereby estimating the occurrence of a coverage hole.

(2) Missing of a location registration request (TAU) from the UE is added as the criterion for statistical judgment in the method (1).

(3) For TAU of the method (2), estimation accuracy is further improved by configuring a TAU period shorter than a normal TAU period. Herein, TAU refers to "Periodic Tracking Area Update" (see T3412 value in 3GPP TS24.301 8.2.26.2 or Chapter 5.3.5). A normal TAU period refers to a period predetermined as the TAU period in a normal state, that is, switch-on state.

For periodic tracking area update (TAU) in the area where an ES cell is present, a period shorter than a normal TAU period may be configured.

For periodic TAU in the area where a base station executes energy saving (ES), a period shorter than a normal TAU period may be configured.

Two types of periodic TAU periods may be prepared. For example, two types, namely, a normal TAU period and a TAU period during energy saving (ES) may be used. Herein, the TAU period during energy saving (ES) refers to a period predetermined as a TAU period in which ES is executed. The UE may use the TAU period during ES when being notified of the execution of energy saving (ES) by the network side or use a normal TAU period when not being notified of the execution of energy saving by the network side.

FIGS. 32 and 33 show the sequence for obtaining statistical information for the purpose of identifying a coverage hole. FIGS. 32 and 33 show the case in which one ES cell, two Comp cells, and seven UEs during communication with the ES cell are present.

UE1 to UE7 are each in the active or idle state toward the ES cell. Specifically, in Step ST8101, the UE4 is in the active or idle state toward the ES cell. In Step ST8102, the UE5 is in the active or idle state toward the ES cell.

In Step ST8103, the UE3 is in the active or idle state toward the ES cell. In Step ST8104, the UE6 is in the active or idle state toward the ES cell. In Step ST8105, the UE2 is in the active or idle state toward the ES cell. In Step ST8106, the UE7 is in the active or idle state toward the ES cell. In Step ST8107, the UE1 is in the active or idle state toward the ES cell.

In Step ST8108, the ES cell decides switch-off. After that, the ES cell changes the TAU periods for the UE to the UE7, thereby reducing the TAU report periods from the UE1 to the UE7. Specifically, in Step ST8109, the ES cell changes the TAU period for the UE4. In Step ST8110, the ES cell changes the TAU period for the UE5.

In Step ST8111, the ES cell changes the TAU period for the UE3. In Step ST8112, the ES cell changes the TAU period for the UE6. In Step ST8113, the ES cell changes the TAU period for the UE2. In Step ST8114, the ES cell changes the TAU period for the UE7. In Step ST8115, the ES cell changes the TAU period for the UE1.

The UE1 to the UE7 periodically notify the MME of TAU via the serving cell (ES cell). Specifically, in Step ST8116, the UE4 periodically notifies the MME of TAU via the ES cell. In Step ST8117, the UE5 periodically notifies the MME of TAU via the ES cell. In Step ST8118, the UE3 periodically notifies the MME of TAU via the ES cell.

In Step ST8119, the UE6 periodically notifies the MME of TAU via the ES cell. In Step ST8120, the UE2 periodically notifies the MME of TAU via the ES cell. In Step ST8121, the UE7 periodically notifies the MME of TAU via the ES cell. In Step ST8122, the UE1 periodically notifies the MME of TAU via the ES cell.

In Step ST8123, the ES cell changes a "cellBarred" parameter of the broadcast information to "barred." Consequently, the ES cell enters the energy saving state. The UE1 to the UE7 each shift to the state in which the communication with the Comp cell 1 or the Comp cell 2 is connected, by handover or cell re-selection. That is to say, the UE1 to the UE7 change the serving cell to the Comp cell 1 or the Comp cell 2.

Specifically, in Step ST8125 of FIG. 33, the UE5 shifts to the state in which the communication with the Comp cell 1 is connected, that is, changes the serving cell to the Comp cell 1, by handover or cell re-selection. In Step ST8126, the UE4 shifts to the state in which the communication with the Comp cell 2 is connected, that is, changes the serving cell to the Comp cell 2, by handover or cell re-selection.

In Step ST8127, the UE3 shifts to the state in which the communication with the Comp cell 1 is connected, that is, changes the serving cell to the Comp cell 1, by handover or cell re-selection. In Step ST8128, the UE1 shifts to the state in which the communication with the Comp cell 2 is connected, that is, changes the serving cell to the Comp cell 2, by handover or cell re-selection.

In Step ST8129, the UE7 shifts to the state in which the communication with the Comp cell 2 is connected, that is, changes the serving cell to the Comp cell 2, by handover or cell re-selection. In Step ST8130, the UE6 shifts to the state in which the communication with the Comp cell 2 is connected, that is, changes the serving cell to the Comp cell 2, by handover or cell re-selection. In Step ST8131, the UE2 shifts to the state in which the communication with the Comp cell 1 is connected, that is, changes the serving cell to the Comp cell 1, by handover or cell re-selection.

In Steps ST8132 and ST8133, the UE2 and the UE6 are detached or are not in the coverage of any cell.

In Step ST8134, the UE4 notifies the MME of TAU via the Comp cell 2. In Step ST8135, the UE3 notifies the MME of TAU via the Comp cell 1. In Step ST8136, the UE1 notifies the MME of TAU via the Comp cell 2. In Step ST8137, the UE5 notifies the MME of TAU via the Comp cell 1. In Step ST8138, the UE7 notifies the MME of TAU via the Comp cell 2.

As described above, in Steps ST8134 to ST8138, the UE1, the UE3, the UE4, the UE5, and the UE7 notify the MME of TAU via the Comp cell 1 or the Comp cell 2, whereas the UE2 and the UE6 do not notify the MME of TAU via the Comp cell 1 or the Comp cell 2. It is accordingly estimated that a coverage hole has occurred at the positions of the UE2 and the UE6.

TAU may be or may not be detected from the UE2 or the UE6 for every period of transmission from the UE. At a high rate at which no TAU can be detected in any cell, it can be judged that a coverage hole has occurred. The sum of a count in which TAU cannot be detected and a count of TAU transmission periods can be increased in a shorter period of time as the period of location registration request (TAU) is shorter, leading to improved accuracy of a rate at which no TAU can be detected. In other words, the accuracy of determining a coverage hole can be increased.

When TAU is transmitted only to the serving cell, TAU is transmitted to another Comp cell in some cases. In such cases, whether a coverage hole has occurred may not be obtained.

The occurrence of a coverage hole can be judged by the MME or a concentrated control (management) node such as O&M, for example, OAM.

The MME needs to recognize whether TAU is before or after ES, and thus, notifies the MME of an "energy saving notification message" (S1 signaling) immediately after the serving cell (ES cell) changes to "barred."

The MME can therefore recognize whether TAU is before or after ES, and accordingly, even when the serving cell is changed, can recognize whether TAU is before or after ES. Therefore, whether a coverage hole has occurred can be judged accurately.

Eighth Embodiment

3GPP is studying that an ES cell in a dormant state transmits a discovery signal (DS) (see Non-Patent Document 15). 3GPP is proposing that the UE, which has received a DS, be allowed to synchronize with a cell that transmits the DS or to measure the received power or reception quality from the cell. The cell in the dormant state transmits the DS, thus allowing the UE to detect the cell in the dormant state.

In the case where the UE in the RRC_Idle state performs the cell re-selection process, however, the UE normally measures the CRS transmitted by the cell to detect a cell to be re-selected. The UE thus cannot detect the ES cell in the dormant state that transmits only the DS. Or, in the case where the UE in the RRC_Idle state measures not only the CRS but also the DS so as to detect the ES cell in the dormant state, the UE always has to measure both of the CRS and the DS. This leads to a problem of a prolonged measurement duration and a problem of an increased power consumption of the UE associated with the prolonged measurement duration.

The dormant state in which only the DS is transmitted leads to such a problem that the UE in the RRC_Idle state cannot receive the SIB and cannot receive paging.

It is therefore proposed that the ES cell that transmits only the DS in the dormant state not support the UE in the RRC_Idle state. This requires that the ES cell be operated in a manner of being overlaid with another cell in the normal operation in, for example, an overlaid scenario.

Meanwhile, a cell that is not overlaid (hereinafter, also referred to as a "non-overlaid cell") has to support the UEs in the RRC_Connected state and the RRC_Idle state, and thus needs to be always operated in the normal state. This will not reduce the power consumption of the cell.

When a large number of small cells are operated, for example, it is conceivable that a large number of non-overlaid cells will be deployed in a building or as a measure against a coverage hole. Therefore, non-overlaid cells are also desired to reduce their power consumption.

This embodiment will disclose the method of solving this problem. Disclosed first is a method of detecting and measuring an ES cell in the dormant state while minimizing an increase in power consumption of the UE.

The UE, which is out of range, detects and measures a DS. The UE may judge whether it is out of range based on whether it has successfully detected a cell by measuring a CRS. The UE may judge, as being out of range, the state in which it cannot detect a cell by measuring a CRS. As a specific method of activating the detection and measurement of a DS, the UE may start detecting and measuring a DS when the UE fails to detect a cell by measuring a CRS.

As a result, the UE does not need to always measure both of a CRS and a DS and may need to measure a DS only when the UE fails to detect a cell by measuring a CRS. This can minimize an increase in measurement duration by the UE and an increase in power consumption of the UE associated with the increase in measurement duration.

The UE may detect and measure a DS when performing a cell selection process. For example, during power-on of the UE, when the UE fails in RRC re-selection, when the UE leaves the RRC_Connected state, or when the UE causes an RLF or a HOF, the UE may detect and measure a DS. As described above, in performing a predetermined process, the UE activates the detection and measurement of a DS, thus eliminating the need for judging whether it is out of range. This simplifies the control of the UE.

Alternatively, the methods above may be combined. For example, the UE starts detecting and measuring a DS when the UE fails to detect a cell by measuring a CRS in performing a cell selection process. This limits the cases in which a DS is detected and measured, further minimizing the power consumption of the UE.

Disclosed below is a method for a UE in the RRC_Idle state to take an ES cell as a serving cell.

As described above, in the dormant state in which the ES cell transmits only a DS, the UE in the RRC_Idle state cannot receive the SIB or paging. The method of solving this problem will be disclosed.

When detecting an ES cell by detecting and measuring a DS, the UE transmits a wake-up signal to the ES cell.

The ES cell has a function of receiving a wake-up signal in the dormant state. The ES cell that has received the wake-up signal from the UE switches itself on to shift to the normal operation.

The UE may judge that it has detected an ES cell when the received power or reception quality of a DS is greater than or equal to a predetermined threshold or exceeds the above threshold. The UE may transmit a wake-up signal to a cell having the highest received power or a cell having the highest reception quality when it has detected a plurality of ES cells.

The configuration such as a period and a sequence of a wake-up signal may be determined in advance. This eliminates the need for a related cell to notify the UE of the configuration of the wake-up signal of the ES cell. This is accordingly effective when the ES cell is a non-overlaid cell.

The configuration of a wake-up signal may be defined in the specifications to be common to all the UEs. Alternatively, the configuration may be stored in a subscriber identity module (SIM). As a result, the configuration may be provided per operator.

The configuration of a wake-up signal may be provided per cell. Each cell can judge whether the configuration is transmitted to its own cell. As the method of providing the configuration of a wake-up signal per cell, the configuration may be derived with a cell identifier.

The configuration may be provided not per cell but per cell cluster. The configuration may be derived with a cell cluster identifier.

The timing at which the UE can transmit a wake-up signal may be after a lapse of a predetermined period from the DS reception timing. The units of the DS reception timing and the predetermined period may be, for example, subframes or radio frames.

The ES cell in the dormant state, which has received a wake-up signal from the UE, can switch itself on to shift to the normal operation. The ES cell that has shifted to the normal operation can transmit an SIB and a paging signal to the UE being served thereby. This allows the UE in the RRC_Idle state to take the ES cell as a serving cell.

When the ES cell is a non-overlaid cell, the ES cell may perform a normal operation when a UE in the RRC_Idle state is located while being served thereby.

The ES cell that supports only the UE in the RRC_Connected state normally shifts to the dormant state when no UE in the RRC_Connected state is located while being served by the ES cell. In this embodiment, even when UEs being served by the ES cell that is a non-overlaid cell are UEs in the RRC_Idle state, by preventing the cell from shifting to the dormant state, the UE in the RRC_Idle state which is being served by the cell can take the cell as a serving cell. That is to say, the cell can support the UE in the RRC_Idle state.

Disclosed below is a specific method for a cell to determine whether a UE in the RRC_Idle state is located while being served thereby.

The cell checks the presence of a UE. A specific example of the method for presence check will be disclosed.

A periodic TAU is used as the method for presence check. The cell causes the UE in the RRC_Idle state to transmit a periodic TAU. The cell may broadcast, to the UE being served thereby, the configuration for transmitting a periodic TAU in advance as the system information. Alternatively, the cell may configure the transmission in the TAU process that is performed when a tracking area code (TAC) differs, and then notify the UE of the configuration over dedicated signaling. The MME may configure the transmission of a periodic TAU for the UE being served by the ES cell that is a non-overlaid cell and cause the UE to transmit the periodic TAU. Alternatively, the ES cell that is a non-overlaid cell may configure the transmission of a periodic TAU for the UE being served thereby and then cause the UE to transmit the periodic TAU.

The cell may notify the UE being served thereby at least one of that its own cell is an ES cell and that the its own cell is a non-overlaid cell. As a result, whether the UE transmits a periodic TAU can be judged in accordance with at least one of whether the serving cell is an ES cell and whether the serving cell is a non-overlaid cell. The method used to configure the transmission of a periodic TAU is applicable as the method of notifying that its own cell is an ES cell and that its own cell is a non-overlaid cell.

Disclosed below is a method in which a cell recognizes whether a UE in the RRC_Idle state is present.

The ES cell that is a non-overlaid cell recognizes whether a UE in the RRC_Idle state is present based on whether it has received an RRC connection establishment request from the UE. The RRC connection establishment request from the UE is executed in the process of transmitting a periodic TAU. The ES cell that is a non-overlaid cell judges that a UE in the RRC_Idle state is present when having received an RRC connection establishment request from the UE within a predetermined period. The ES cell that is a non-overlaid cell judges that no UE in the RRC_Idle state is present when not having received an RRC connection establishment request from the UE within the predetermined period. The predetermined period may be a periodic TAU period or a period including a plurality of the periods.

The MME may judge whether a UE is present based on whether it has received a periodic TAU from the UE. When having received TAU from the UE within a predetermined period, the MME judges that a UE in the RRC_Idle state is present. When not having received TAU from the UE within the predetermined period, the MME judges that no UE in the RRC_Idle state is present. The predetermined period may be a periodic TAU period or a period including a plurality of the periods. The MME may notify the cell that has notified of TAU from the UE that a UE in the RRC_Idle state is present.

Although the method using a periodic TAU has been disclosed, alternatively, there may be provided a function in which a cell causes a UE in the RRC_Idle state being served thereby to execute uplink transmission. For example, the cell may provide the system information (SI) correct message with an indicator that causes a UE in the RRC_Idle state to execute PRACH transmission and then may broadcast the indicator. When receiving even one PRACH from the UE, the cell can judge that a UE in the RRC_Idle state is present.

Consequently, the ES cell that is a non-overlaid cell can judge whether a UE in the RRC_Idle state is located while being served thereby and, when such a UE is present, can perform a normal operation. Also, the UE can accordingly receive SIB and paging and can keep the RRC_Idle state state in the ES cell that is a non-overlaid cell.

The method disclosed in this embodiment allows the UE to detect and measure an ES cell that is a non-overlaid cell transmitting only a DS.

The UE is caused to transmit a wake-up signal to the ES cell when detecting an ES cell by detecting and measuring a DS. This allows the ES cell in the dormant state to switch itself on to shift to the normal operation when receiving a wake-up signal.

The ES cell being a non-overlaid cell, which has switched itself on to enter the normal operation, performs a normal operation when a UE in the RRC_Idle state is located while being served thereby. This allows the UE in the RRC_Idle state to receive the SIB and paging from the cell and keep the RRC_Idle state while being served by the cell.

A mechanism in which an ES cell shifts from the dormant state to the normal operation state is provided as described above, thus allowing the ES cell to shift to the dormant state when no UE in the RRC_Idle state is located while being served thereby. This reduces the power consumption of the ES cell.

Figure 35:
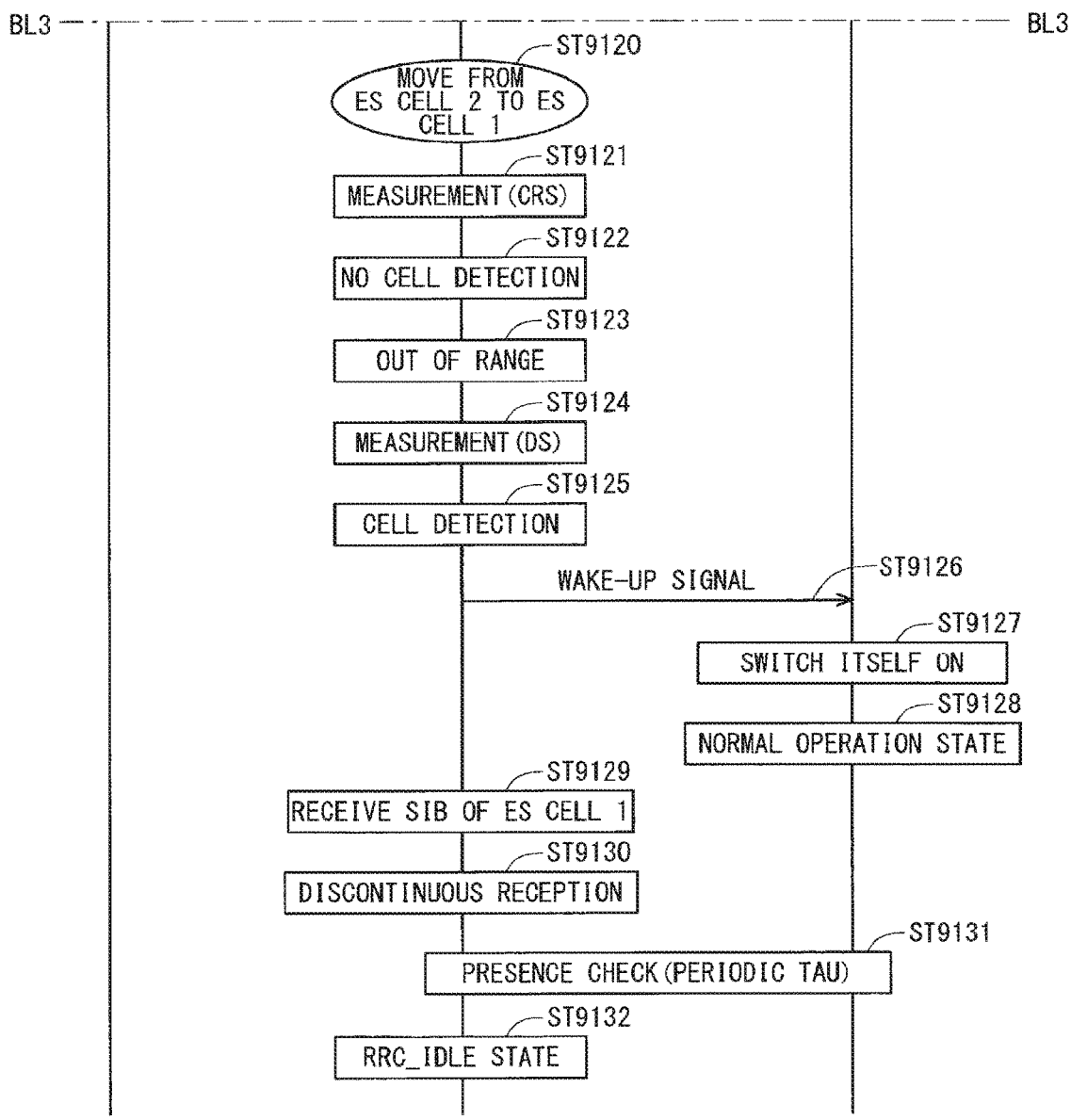
FIG. 35 shows the example of the sequence of the ES process in the communication system according to the eighth embodiment of the present invention.

FIGS. 34 and 35 show an example of the sequence of an ES process in a communication system according to an eighth embodiment of the present invention. FIG. 34 is continuous with FIG. 35 at a boundary BL3. The ES cell 1 and the ES cell 2 are cells that are not overlaid, namely non-overlaid cells. In the method disclosed in this embodiment, the ES cell 1 and the ES cell 2 may be cells within clusters that are not overlaid. The method is also applicable to cells within clusters that are not overlaid.

The ES cell 2 is in the normal operation state in Step ST9101, and the ES cell 1 is in the normal operation state in Step ST9103. In Step ST9102, the UE1 is in the RRC_Connected state with the ES cell 1.

In Step ST9104, the UE1 communicates with the ES cell 1. After the communication ends, in Step ST9105, the UE1 shifts to the RRC_Idle state.

In Step ST9106, the UE1 performs discontinuous reception for paging. In Step ST9107, to recognize whether a UE in the RRC_Idle state is present, the ES cell 1 checks the presence of the UE1. For example, the UE1 transmits a periodic TAU to the ES cell. When RRC connection is not required, in Step ST9108, the UE that has executed TAU enters the RRC_Idle state.

In Step ST9109, the UE1 moves from the ES cell 1 to the ES cell 2. In Step ST9110, the UE1 performs a CRS-based measurement. In this case, the UE1 measures the CRSs of the ES cell 1 and the ES cell 2. In Step ST9111, the UE1 performs a cell re-selection process based on the CRS measurement result in Step ST9110, thereby re-selecting the ES cell 2.

In Step ST9112, the UE1 receives the SIB of the ES cell 2. In Step ST9113, the UE1 enters the discontinuous reception state. Herein, the TAC on the SIB is the same between the ES cell 1 and the ES cell 2. That is to say, the ES cell 1 and the ES cell 2 are located in the same TA.

In Step ST9114, the ES cell 2 checks the presence of the UE1 to judge whether a UE in the RRC_Idle state is located while being served thereby. For example, the UE1 transmits a periodic TAU to the ES cell. In Step ST9115, the UE that has executed TAU returns to the RRC_Idle state.

In Step ST9116, meanwhile, the ES cell 1 judges whether a UE in the RRC_Connected state is located while being served thereby. When judging that a UE in the RRC_Connected state is present, the ES cell 1 keeps the normal operation state and performs the judgment process of Step ST9116 again. When judging that no UE in the RRC_Connected state is present, the ES cell 1 moves to Step ST9117.

In Step ST9117, the ES cell 1 judges whether a UE in the RRC_Idle state is located while being served thereby. The ES cell 1 makes this judgment based on whether it has received a periodic TAU from the UE. When having received the periodic TAU, the ES cell 1 judges that a UE in the RRC_Idle state is present, and then keeps the normal operation state and performs the judgment process of Step ST9117 again. When not having received a periodic TAU, the ES cell 1 judges that no UE in the RRC_Idle state is present and moves to Step ST9118.

In Step ST9118, the ES cell 1 performs switch-off. In Step ST9119, the ES cell 1 that has performed switch-off shifts to the dormant state. The ES cell 1 that has shifted to the dormant state transmits only a DS. The ES cell 1 also receives a wake-up signal.

In Step ST9120 of FIG. 35, the UE1 moves from the ES cell 2 to the ES cell 1. In Step ST9121, the UE1 performs a CRS-based measurement. Herein, the ES cell 1 is in the dormant state and transmits only a DS, and thus, the UE cannot detect the ES cell 1 even if it measures a CRS. In Step ST9122, thus, the UE1 detects no cell and, in Step ST9123, the UE1 is out of range.

In Step ST9124, the UE1, which has failed to detect a cell in the CRS-based measurement and has been out of range, detects and measures a cell based on the DS. The ES cell 1 has transmitted the DS, thus allowing the UE1 to detect and measure the ES cell 1.

In Step ST9125, the UE1 detects and selects the ES cell 1 as a cell suitable for the criterion of cell selection.

In Step ST9126, the UE1 transmits a wake-up signal to the ES cell 1.

In Step ST9127, the ES cell 1 that has received the wake-up signal transmitted to its own cell in Step ST9126 switches itself on. In Step ST9128, the ES cell 1 that has switched itself on shifts to the normal operation state. The ES cell 1, which has shifted to the normal operation state, transmits the CRS to the UE being served thereby in a predetermined subframe and broadcasts the system information, thereby enabling paging.

In Step ST9129, the UE1 can receive the SIB of the ES cell 1. The UE1 can accordingly obtain the system information of the ES cell 1.

In Step ST9130, the UE1 can receive paging from the ES cell 1, thereby performing discontinuous reception.

In Step ST9131, the UE1 performs presence check between the ES cell 1 and itself. For example, the UE1 transmits a periodic TAU to the ES cell. In Step ST9132, the UE1 that has ended the TAU process returns to the RRC_Idle state and performs the processes of Steps ST9129, ST9130, and ST9131 again.

Consequently, the UE1 in the RRC_Idle state can accordingly detect the ES cell 1 that is a non-overlaid cell, and further, can activate the ES cell 1 from the dormant state to the normal operation state. The UE1 in the RRC_Idle state can therefore take the ES cell 1 that is a non-overlaid cell as the serving cell.

The method disclosed in this embodiment can support the UE in the RRC_Idle state while minimizing an increase in power consumption of the UE even when an ES cell that is a non-overlaid cell is present. When no UEs in the RRC_Connected state and the RRC_Idle state are located while being served by the ES cell that is a non-overlaid cell, the cell can be shifted to the dormant state. This reduces the power consumption of the cell.

First Modification of Eighth Embodiment

The following three, (1) to (3), will be disclosed as specific examples of the method of enabling an ES cell that is an overlaid cell and an ES cell that is a non-overlaid cell to operate differently.

(1) An O&M notifies an ES cell whether the cell is an overlaid cell or a non-overlaid cell. Notification may be performed via the MME.

(2) An MME notifies an ES cell whether the cell is an overlaid cell or a non-overlaid cell.

(3) An ES cell judges whether its own cell is an overlaid cell or a non-overlaid cell. In a specific example of the judgment method, its own cell may perform neighbor cell search to judge whether a cell selectable or re-selectable by its own cell is present. The ES cell judges that the cell is an overlaid cell when such a cell is present or judges that the cell is a non-overlaid cell when such a cell is not present.

The ES cell judges whether its own cell is an overlaid cell or a non-overlaid cell and, when judging that its own cell is an overlaid cell, operates as the overlaid cell. When judging that its own cell is a non-overlaid cell, the ES cell operates as the non-overlaid cell. This method allows the ES cell to operate in accordance with the state of its own cell.

For example, the ES cell that is an overlaid cell supports only the UEs in the RRC_Connected state and does not support the UEs in the RRC_Idle state. When no UE in the RRC_Connected state is located while being served thereby, the ES cell operates to shift to the dormant state. The ES cell that is a non-overlaid cell supports both of the UEs in the RRC_Connected state and the UEs in the RRC_Idle state. When the UEs in the RRC_Connected state and the UEs in the RRC_Idle state are no longer located while being served thereby, the ES cell operates to shift to the dormant state.

The ES cell can accordingly perform a suitable ES process in accordance with the state of its own cell.

The embodiments and modifications are merely illustrations of the present invention, and the embodiments and modifications can be combined freely within the scope of the present invention. The components of the embodiments and modifications can be appropriately changed or omitted.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

1101 first coverage; 1102 second coverage; 1103 first eNB; 1104 second eNB; 1105 third eNB; 1106 fourth eNB; 1107 fifth eNB; 1108 sixth eNB; 1109 seventh eNB; 1110 third coverage; 1111 fourth coverage; 1112 fifth coverage; 1113 sixth coverage; 1114 seventh coverage; 1201 to 1203, 1205 to 1207 coverage; 1204 first macro eNB; 1208 second macro eNB; 1209 third macro eNB; 1210 fourth macro eNB; 7201, 7202 coverage of macro cell; 7203 to 7206, 7208 to 7211, 7213 to 7217, 7219, 7220 coverage of ES cell; and 7207, 7212, 7218 coverage of Comp cell.

The invention claimed is:

1. A communication system, comprising:
base station devices and a communication terminal device configured for radio communication with the base station devices, wherein
the base station devices include:
an energy saving base station device configuring an energy saving cell configured to switch between a normal operation state and an energy saving state with power consumption lower than that of the normal operation state, and
a compensating base station device configuring, when the energy saving cell is in the energy saving state, a compensation cell that compensates for a coverage being a range in which the energy saving cell is capable of communication; and
when switching from the normal operation state to the energy saving state is decided, the energy saving cell broadcasts, to the communication terminal device in a coverage of its own cell, broadcast information indicating that its own cell is not selectable as a cell targeted for communication.

2. The communication system according to claim 1, wherein when switching is made from the energy saving state to the normal operation state, the energy saving cell decides, in accordance with a criterion for deciding a priority of the communication terminal device that has requested connection, the priority of the communication terminal device and performs a process for connection with the communication terminal device in a descending order of the priority decided.

3. The communication system according to claim 1, wherein the energy saving base station device notifies the communication terminal device being connected with the energy saving cell of information about the compensation cell before the compensation cell starts compensating for the coverage.

* * * * *